United States Patent
Narayanaswamy et al.

(10) Patent No.: US 12,530,270 B2
(45) Date of Patent: Jan. 20, 2026

(54) FREQUENCY ADJUSTMENT FOR PROCESSORS

(71) Applicant: NVIDIA Corporation, Santa Clara, CA (US)

(72) Inventors: Sreedhar Narayanaswamy, Sunnyvale, CA (US); Benjamin D. Faulkner, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/903,959

(22) Filed: Sep. 6, 2022

(65) Prior Publication Data
US 2024/0095133 A1    Mar. 21, 2024

(51) Int. Cl.
*G06F 11/16* (2006.01)

(52) U.S. Cl.
CPC ................... *G06F 11/1629* (2013.01)

(58) Field of Classification Search
CPC .. G06F 11/1629; G06F 11/1641; G06F 1/329; G06F 8/41; Y02D 10/00
See application file for complete search history.

(56) References Cited

U.S. PATENT DOCUMENTS

| | | | | |
|---|---|---|---|---|
| 7,412,353 B2* | 8/2008 | Borkar | .................. | G06F 1/3203 702/186 |
| 10,429,919 B2* | 10/2019 | Rotem | ..................... | G06F 1/324 |
| 2005/0240810 A1* | 10/2005 | Safford | ............... | G06F 11/1641 714/10 |
| 2012/0233506 A1* | 9/2012 | Kameda | .............. | G06F 11/2236 714/E11.178 |
| 2021/0081016 A1* | 3/2021 | Hovis | .................... | G06F 1/3206 |

FOREIGN PATENT DOCUMENTS

EP    3493062 A2 *  6/2019

OTHER PUBLICATIONS

IEEE "IEEE Standard for Floating-Point Arithmetic", Microprocessor Standards Committee of the IEEE Computer Society, IEEE Std 754-2008, dated Jun. 12, 2008, 70 pages.

* cited by examiner

*Primary Examiner* — Michael Maskulinski
*Assistant Examiner* — Kayo Lisa Rusin
(74) *Attorney, Agent, or Firm* — Davis Wright Tremaine LLP

(57) ABSTRACT

Apparatuses, systems, and techniques adjust a frequency at which a processor operates. In at least one embodiment, a frequency at which a processor operates is adjusted based, at least in part, on different cores of the processor performing one or more identical instructions.

19 Claims, 42 Drawing Sheets

FREQUENCY ADJUSTMENT FOR PROCESSORS

FIELD

At least one embodiment pertains to adjusting an operating frequency of at least one processor. For example, at least one embodiment pertains to adjusting an operating frequency of one or more cores of at least one processor.

BACKGROUND

Adjusting an operating frequency of at least one processor or one or more cores of at least one processor can improve an operational performance or function of at least one processor or one or more cores of at least one processor. Techniques to adjust operating frequency of at least one processor or one or more cores of at least one processor can be improved.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

In at least one embodiment, one or more of the disclosed circuits, processors, systems can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 1:
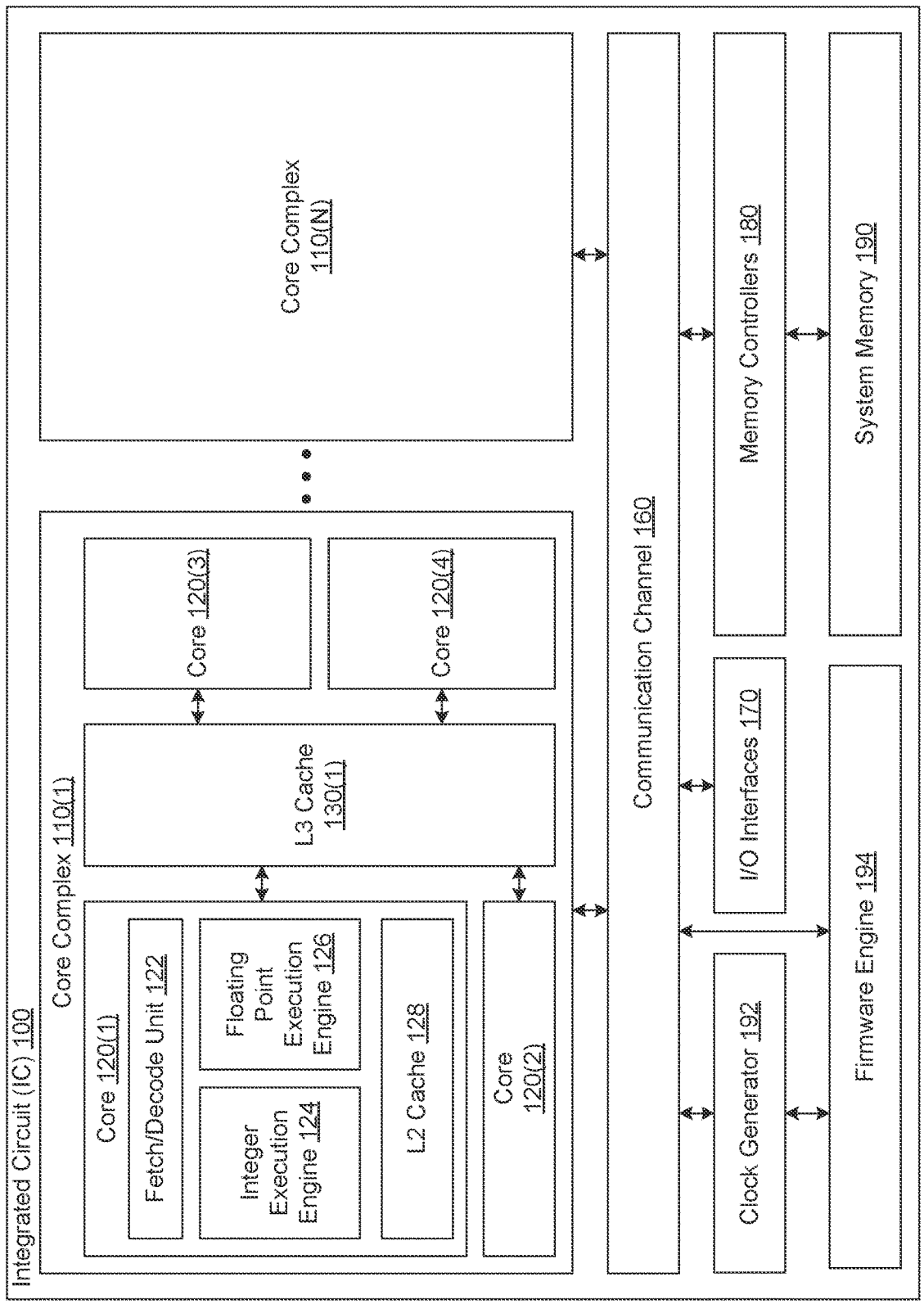
FIG. 1 illustrates an integrated circuit (IC), in accordance with at least one embodiment.

FIG. 1 illustrates an integrated circuit (IC) 100, in accordance with at least one embodiment. In at least one embodiment, the IC 100 is a processor. In at least one embodiment, the IC 100 is a CPU. In at least one embodiment, CPU is developed by AMD Corporation of Santa Clara, CA. In at least one embodiment, CPU is developed by Intel Corporation of Santa Clara, CA. In at least one embodiment, CPU can be configured to execute an application program. In at least one embodiment, CPU is configured to execute main control software, such as an operating system. In at least one embodiment, CPU issues commands that control the operation of an external GPU (not shown). In at least one embodiment, CPU can be configured to execute host executable code derived from CUDA source code, and an external GPU can be configured to execute device executable code derived from such CUDA source code. In at least one embodiment, CPU includes, without limitation, any number of core complexes 110, a communication channel 160, I/O interfaces 170, and memory controllers 180.

In at least one embodiment, core complex 110 includes, without limitation, cores 120(1)-120(4) and an L3 cache 130. In at least one embodiment, core complex 110 may include, without limitation, any number of cores 120 and any number and type of caches in any combination. In at least one embodiment, cores 120 are configured to execute instructions of a particular ISA. In at least one embodiment, each core 120 is a CPU core.

In at least one embodiment, each core 120 includes, without limitation, a fetch/decode unit 122, an integer execution engine 124, a floating point execution engine 126, and an L2 cache 128. In at least one embodiment, fetch/decode unit 122 fetches instructions, decodes such instructions, generates micro-operations, and dispatches separate micro-instructions to integer execution engine 124 and floating point execution engine 126. In at least one embodiment, fetch/decode unit 122 can concurrently dispatch one micro-instruction to integer execution engine 124 and another micro-instruction to floating point execution engine 126. In at least one embodiment, integer execution engine 124 executes, without limitation, integer and memory operations. In at least one embodiment, floating point engine 126 executes, without limitation, floating point and vector operations. In at least one embodiment, fetch-decode unit 122 dispatches micro-instructions to a single execution engine that replaces both integer execution engine 124 and floating point execution engine 126.

In at least one embodiment, each core 120($i$), where i is an integer representing a particular instance of core 120, may access L2 cache 128($i$) included in core 120($i$). In at least one embodiment, each core 120 included in core complex 110($j$), where j is an integer representing a particular instance of core complex 110, is connected to other cores 120 in core complex 110($j$) via L3 cache 130($j$) included in core complex 110($j$). In at least one embodiment, cores 120 included in core complex 110($j$), where j is an integer representing a particular instance of core complex 110, can access all of L3 cache 130($j$) included in core complex 110($j$). In at least one embodiment, L3 cache 130 may include, without limitation, any number of slices.

In at least one embodiment, communication channel 160 is a system interconnect that facilitates data and control transmissions across core complexes 110(1)-110(N) (where N is an integer greater than zero), I/O interfaces 170, and memory controllers 180. In at least one embodiment, IC 100 may include, without limitation, any amount and type of system interconnect in addition to or instead of communication channel 160 that facilitates data and control transmissions across any number and type of directly or indirectly linked components that may be internal or external to IC 100. In at least one embodiment, I/O interfaces 170 are representative of any number and type of I/O interfaces (e.g., PCI, PCI-X, PCIe, GBE, USB, etc.). In at least one embodiment, various types of peripheral devices are coupled to I/O interfaces 170 In at least one embodiment, peripheral devices that are coupled to I/O interfaces 170 may include, without limitation, displays, keyboards, mice, printers, scanners, joysticks or other types of game controllers, media recording devices, external storage devices, network interface cards, and so forth.

In at least one embodiment, memory controllers 180 facilitate data transfers between IC 100 and a system memory 190. In at least one embodiment, core complex 110 and graphics complex share system memory 190. In at least one embodiment, IC 100 implements a memory subsystem that includes, without limitation, any amount and type of memory controllers 180 and memory devices that may be dedicated to one component or shared among multiple components. In at least one embodiment, IC 100 implements a cache subsystem that includes, without limitation, one or more cache memories (e.g., L2 caches 128 and L3 caches 130) that may each be private to or shared between any number of components (e.g., cores 120 and core complexes 110).

In at least one embodiment, IC 100 can include a clock generator 192. Clock generator 192 can generate and/or manage a clock frequency of each core 120. In some embodiments, clock generator 192 can provide one or more clock frequencies between a pre-determined minimum allowable operating clock frequency and a pre-determined maximum clock operating frequency. In at least one embodiment, clock generator 192 can include a number of clock sources, e.g., phase-locked loops (PLLs), and so forth. A PLL is a closed-loop frequency-control system based on the phase difference between an input clock signal and a feedback clock signal of a controlled oscillator. The main blocks of the PLL can include a phase detector, a loop filter, and a voltage controlled oscillator (VCO). A PLL can also multiply a lower-frequency reference clock up to a higher operating frequency. A divider counter can be inserted in the feedback loop to increase the VCO frequency above the input reference frequency. The divider counter can be configured to provide different frequencies. Each of one or more PLLs of the clock generator 192 can be a programmable PLL that is programmed to provide a selected clock frequency. In some examples, clock generator 192 can include on-chip PLLs on the integrated circuit. In other examples, clock generator 192 can receive multiple clock signals from external clock generators, such as external PLLs. In at least one embodiment, clock generator can include has a selection circuit, such as a multiplexer, for coupling clock signals from clock sources to one or more of cores 120. In at least one embodiment, clock generator 192 can include logic, either internal or external, such as executable-instructions in system memory 190, to provide clock control signals for selecting the clock signals to one or more cores 120 and to adjust the frequency of the clock signals provided one or more cores 120.

In at least one embodiment, IC 100 can include a firmware engine 194. In at least one embodiment, firmware engine 194 can be implemented in software, hardware, and/or a combination of software and hardware of IC 100. In at least one embodiment, firmware engine 194 can interface with a first core, such as core 120(1) and a second core, such as second core 120(2). In at least one embodiment, firmware engine 194 can interface three or more cores 120. In at least one embodiment, firmware engine 194 can cause at least two cores 120 to each execute identical instructions. In at least one embodiment, firmware engine 194 can cause cores 120 to operate in lockstep mode in which cores 120 each synchronously execute the same set of instructions. In at least one embodiment, firmware engine 194 causes cores 120 to execute identical instructions and instructs clock generator 192 to increase an operating frequency of each of cores 120.

In general, lockset mode can group at least two cores 120 or processors to implement redundancy, thereby providing for the detection of an error occurring in one of the two cores 120. The two cores 120 can be initialized to the same state during system start-up and they receive the same inputs and execute the same instruction stream, at the same time, when they are operating in lockstep. So, during normal operation, the state of the two cores 120 is identical, clock-by-clock. Lockstep processing assumes that an error in either core 120 will result in a difference between the states of the two cores 120, which will eventually be manifested as a difference in the outputs of the cores 120. When an internal error occurs in one of the cores, the actions of the cores 120 will be different following the internal error, which may result in the cores 120 falling out of lockstep.

In at least one embodiment, in lockstep mode, which can be triggered by firmware engine 194 and/or an application executing in computer-implemented storage, such as system memory 190, output signals from at least two cores 120 are compared during a lockstep mode. When a fault is detected, cores 120 can be placed in a safe mode and a determination is made whether the fault is caused by a soft error or a hard error. While in the safe mode, cores 120 can be isolated from channel 160 of IC 100 after outstanding transactions are completed. The fault is analyzed by performing a memory built-in self-test (MBIST) of, for example, firmware engine 194, and a logic built-in self-test (LBIST) of, for example, core complex 110, firmware engine 194, or other logic of IC 100. A hard error is determined when MBIST or LBIST fails and a soft error is determined when MBIST and LBIST both pass. When a hard error is determined, fault analysis can identify which core is a faulty core.

In at least one embodiment, firmware engine 194 analyzes output data of each of cores 120 to determine if output data of each of cores 120 are equivalent, equal, or the same. When firmware engine 194 determines output data of each of cores 120 are not equivalent, equal, the same, and/or comprise one or more errors, firmware engine 194 can decrease an operating frequency of each of cores 120. In at least one embodiment, firmware engine 194 can incrementally decrease in operating frequency of each of cores 120 until output data of each of cores 120 are equivalent, equal, the same, and/or comprise no errors.

In at least one embodiment, IC 100 allocates a plurality of cores 120 to execute instructions of an application, such as an application executing in system memory 190 and/or other computer-implemented storage. In at least one embodiment, clock generator 192 references a lookup table to determine a frequency at which each plurality of cores 120 is to operate. In at least one embodiment, lookup table includes one or more entries identifying a value corresponding to a number of cores and an operating frequency for the number of cores.

In at least one embodiment, IC 100 receives or otherwise obtains a request from application executing in system memory 190 to increase frequency at which each plurality of cores 120 is to operate. In at least one embodiment, based at least on request from application executing in system memory 190 to increase frequency, IC 100 communicates request to firmware engine 194 to initiate or enable lockstep mode for plurality of cores 120 executing instructions of application.

In at least one embodiment, initiating lockstep mode for plurality of cores 120 executing instructions of application causes firmware engine 194 to allocate additional cores 120 to execute instructions of application. In at least one embodiment, initiating lockstep mode for plurality of cores 120 executing instructions of application causes firmware engine 194 to allocate additional cores 120 at least equaling plurality of cores 120 executing instructions of application. In at least one embodiment, subsequent to additional cores 120 been allocated to execute instructions of application, IC 100 communicates an instruction to clock generator 192 to cause clock generator 192 to increase frequency of each of plurality of cores 120 and additional cores 120.

In at least one embodiment, firmware engine 194 analyzes output data of each of plurality of cores 120 and additional cores 120 to determine if output data of each of plurality of cores 120 and additional cores 120 are equivalent, equal, or the same. When firmware engine 194 determines output data of each of plurality of cores 120 and additional cores 120 are not equivalent, equal, the same, and/or comprise one or more errors, firmware engine 194 can decrease an operating frequency of each of plurality of cores 120 and additional cores 120. In at least one embodiment, firmware engine 194 can incrementally decrease in operating frequency of each of plurality of cores 120 and additional cores 120 until output data of each of plurality of cores 120 and additional cores 120 are equivalent, equal, the same, and/or comprise no errors.

Figure 2:
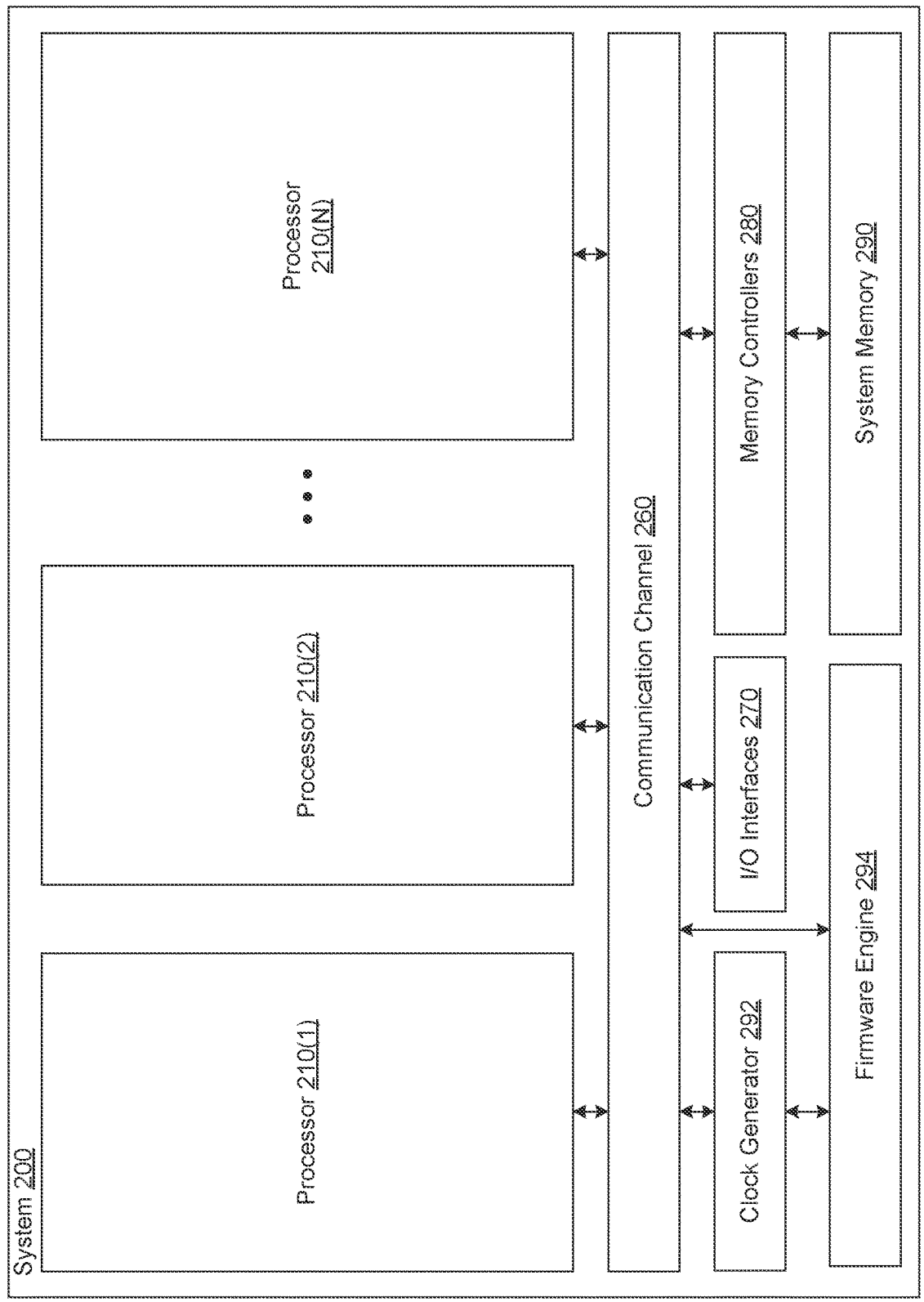
FIG. 2 illustrates a system, in accordance with at least one embodiment.

FIG. 2 illustrates system 200, in accordance with at least one embodiment. In at least one embodiment, system includes a plurality of processors 210(1)-210(N) (where N is an integer greater than zero). In at least one embodiment, one or more processors 210 are CPUs. In at least one embodiment, one or more processors 210 are GPUs. In at least one embodiment, one or more processors 210 are developed by AMD Corporation of Santa Clara, CA. In at least one embodiment, one or more processors 210 are configured to execute an application program. In at least one embodiment, one or more processors 210 are configured to execute main control software, such as an operating system. In at least one embodiment, one or more processors 210 are issue commands that control the operation of an external GPU (not shown). In at least one embodiment, one or more processors 210 are configured to execute host executable code derived from CUDA source code, and an external GPU can be configured to execute device executable code derived from such CUDA source code. In at least one embodiment, one or more of processors 210 includes, without limitation, any number of core complexes, communication channel, I/O interfaces, and memory controllers.

In at least one embodiment, communication channel 260 is a system interconnect that facilitates data and control transmissions across processors 210(1)-210(N), I/O interfaces 270, and memory controllers 280. In at least one embodiment, system 200 may include, without limitation, any amount and type of system interconnect in addition to or instead of communication channel 260 that facilitates data and control transmissions across any number and type of directly or indirectly linked components that may be internal or external to system 200. In at least one embodiment, I/O interfaces 270 are representative of any number and type of I/O interfaces (e.g., PCI, PCI-X, PCIe, GBE, USB, etc.). In at least one embodiment, various types of peripheral devices are coupled to I/O interfaces 270 In at least one embodiment, peripheral devices that are coupled to I/O interfaces 270 may include, without limitation, displays, keyboards, mice, printers, scanners, joysticks or other types of game controllers, media recording devices, external storage devices, network interface cards, and so forth.

In at least one embodiment, memory controllers 280 facilitate data transfers between system 200 and a system memory 290. In at least one embodiment, system 200 implements a memory subsystem that includes, without limitation, any amount and type of memory controllers 280 and memory devices that may be dedicated to one component or shared among multiple components. In at least one embodiment, system 200 implements a cache subsystem that includes, without limitation, one or more cache memories (e.g., L2 caches) that may each be private to or shared between any number of components (e.g., processors 210).

In at least one embodiment, system 200 can include a clock generator 292. Clock generator 292 can generate and/or manage a clock frequency of each of processors 210. In some embodiments, clock generator 292 can provide one or more clock frequencies between a pre-determined minimum allowable operating clock frequency and a pre-determined maximum clock operating frequency. In at least one embodiment, clock generator 292 can include a number of clock sources, e.g., PLLs, and so forth. A PLL is a closed-loop frequency-control system based on the phase difference between an input clock signal and a feedback clock signal of a controlled oscillator. The main blocks of the PLL can include a phase detector, a loop filter, and a VCO. A PLL can also multiply a lower-frequency reference clock up to a higher operating frequency. A divider counter can be inserted in the feedback loop to increase VCO frequency above the input reference frequency. The divider counter can be configured to provide different frequencies. Each of one or more PLLs of the clock generator 292 can be a programmable PLL that is programmed to provide a selected clock frequency. In some examples, clock generator 292 can include on-chip PLLs on the integrated circuit. In other examples, clock generator 292 can receive multiple clock signals from external clock generators, such as external PLLs. In at least one embodiment, clock generator 292 can include has a selection circuit, such as a multiplexer, for coupling clock signals from clock sources to one or more of processors 210. In at least one embodiment, clock generator 292 can include logic, either internal or external, such as executable-instructions in system memory 290, to provide clock control signals for selecting the clock signals to one or more processors 210 and to adjust the frequency of the clock signals provided one or more processors 210.

In at least one embodiment, system 200 can include a firmware engine 294. In at least one embodiment, firmware engine 294 can be implemented in software, hardware, and/or a combination of software and hardware of system 200. In at least one embodiment, firmware engine 294 can interface with a first processor, such as processor 210(1) and a second processor, such as second processor 210(2). In at least one embodiment, firmware engine 294 can interface three or more processors 210. In at least one embodiment, firmware engine 294 can cause processors 210 to each execute identical instructions. In at least one embodiment, firmware engine 294 can cause processors 210 to operate in lockstep mode, describe in detail in the foregoing, in which processors 210 each synchronously execute the same set of instructions. In at least one embodiment, firmware engine 294 causes processors 210 to execute identical instructions and instructs clock generator 292 to increase an operating frequency of each of processors 210.

In at least one embodiment, firmware engine 294 analyzes output data of each of processors 210 to determine if output data of each of processors 210 are equivalent, equal, or the same. When firmware engine 294 determines output data of each of processors 210 are not equivalent, equal, the same, and/or comprise one or more errors, firmware engine 294 can decrease an operating frequency of each of processors 210. In at least one embodiment, firmware engine 294 can incrementally decrease in operating frequency of each of processors 210 until output data of each of processors 210 are equivalent, equal, the same, and/or comprise no errors.

In at least one embodiment, system 200 allocates a plurality of processors 210 to execute instructions of an application, such as an application executing in system memory 190 and/or other computer-implemented storage. In at least one embodiment, clock generator 292 references a lookup table to determine a frequency at which each plurality of processors 210 is to operate. In at least one embodiment, lookup table includes one or more entries identifying a value corresponding to a number of cores and an operating frequency for the number of cores.

In at least one embodiment, system 200 receives or otherwise obtains a request from application executing in system memory 290 to increase frequency at which each plurality of processors 210 is to operate. In at least one embodiment, based at least on request from application executing in system memory 290 to increase frequency, system 200 communicates request to firmware engine 294 to initiate or enable lockstep mode for plurality of processors 210 executing instructions of application.

In at least one embodiment, initiating lockstep mode for plurality of processors 210 executing instructions of application causes firmware engine 294 to allocate additional processors 210 to execute instructions of application. In at least one embodiment, initiating lockstep mode for plurality of processors 210 executing instructions of application causes firmware engine 294 to allocate additional processors 210 at least equaling plurality of processors 210 executing instructions of application. In at least one embodiment, subsequent to additional processors 210 been allocated to execute instructions of application, system 200 or firmware engine 294 communicates an instruction to clock generator 292 to cause clock generator 292 to increase frequency of each of plurality of processors 210 and additional processors 210.

In at least one embodiment, firmware engine 294 analyzes output data of each of plurality of processors 210 and additional processors 210 to determine if output data of each of plurality of processors 210 and additional processors 210 are equivalent, equal, or the same. When firmware engine 194 determines output data of each of plurality of processors 210 and additional processors 210 are not equivalent, equal, the same, and/or comprise one or more errors, firmware engine 194 can decrease an operating frequency of each of plurality of processors 210 and additional processors 210. In at least one embodiment, firmware engine 294 can incrementally decrease in operating frequency of each of plurality of processors 210 and additional processors 210 until output data of each of plurality of processors 210 and additional processors 210 are equivalent, equal, the same, and/or comprise no errors.

Figure 3:
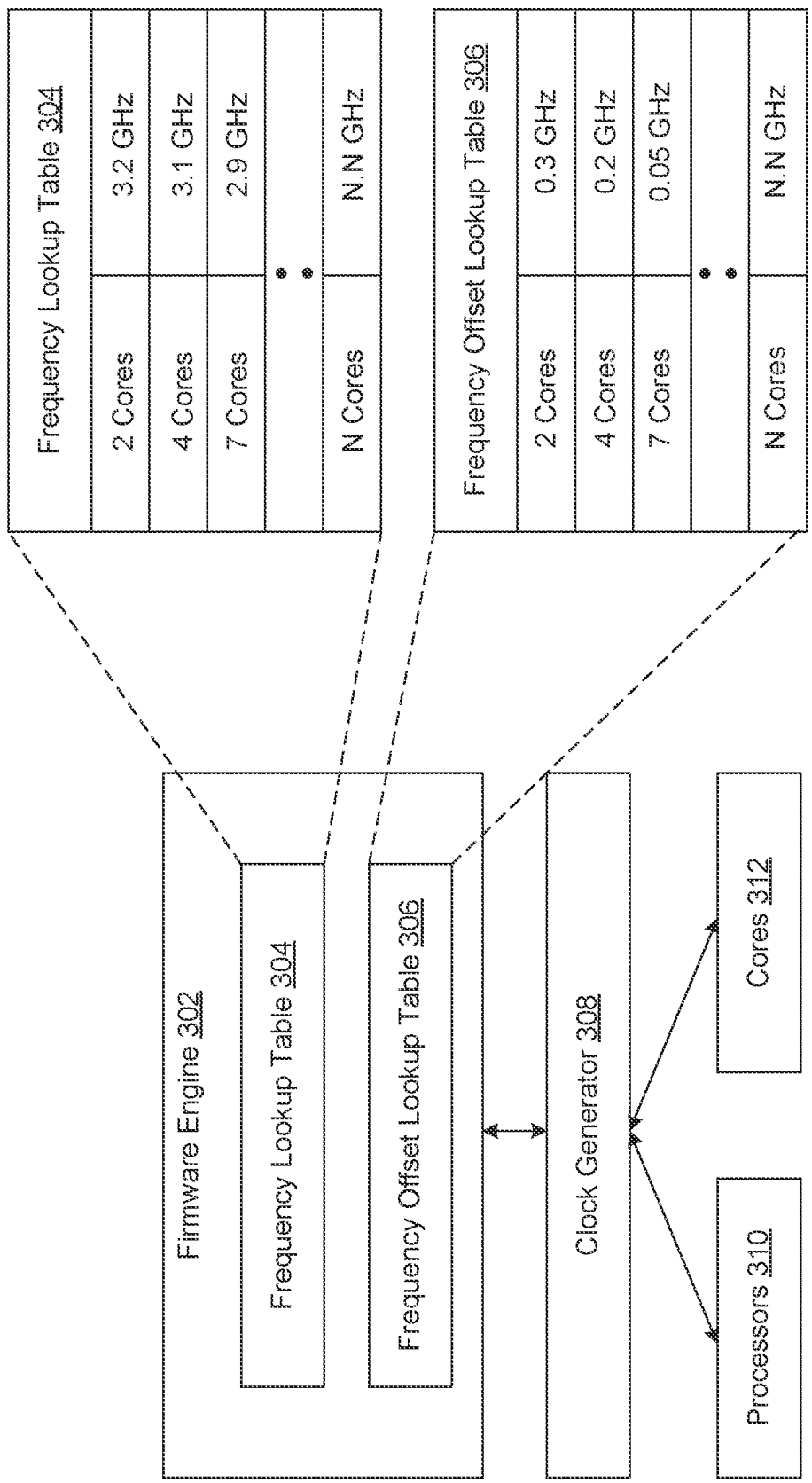
FIG. 3 illustrates a firmware engine, in accordance with at least one embodiment.

FIG. 3 illustrates a firmware engine 302, in accordance with at least one embodiment. In at least one embodiment, firmware engine 302 can be associated with IC 100 and/or system 200. In at least one embodiment, firmware engine 302 corresponds to firmware engine 194. In at least one embodiment, firmware engine 302 corresponds to firmware engine 294. Accordingly, in at least one embodiment, firmware engine 302 can access system memory, such as system memory 190 and/or system memory 290. In at least one embodiment, firmware engine 302 is embodied in hardware of a system, such as a processor. In at least one embodiment, firmware engine 302 is embodied in software, such as an operating system. In at least one embodiment, at least some of the functionalities of the firmware engine 302 can be executed by one or more applications interfacing, directly and/or indirectly, with firmware engine 302.

In at least one embodiment, firmware engine 302 can access other computer-implemented storage. In at least one embodiment, one or more applications, such as one or more applications associated with computer-executable instructions, can communicate with firmware engine 302, through data, to enable a performance mode to cause firmware engine 302 to increase in operational frequency of one or more cores and/or one or more processors, such as one or more cores 120 and/or one or more processors 210.

In at least one embodiment, firmware engine 302 comprises a frequency lookup table 304. As illustrated, frequency lookup table 304 can identify any number of cores and frequencies at which an identified number of cores is to operate. The following description referring to one or more cores applies likewise to one or more processors. For example, a system may comprise 8, 16, 32, 74, etc. available cores that can be allocated to one or more applications in order to process threads and/or instructions of those one or more applications. In at least one embodiment, as firmware engine 302 divides up the 16 available cores among one or more applications, firmware engine 302 references frequency lookup table 304 to a set the frequency at which the allocated number of cores are to operate. In general, as shown in frequency lookup table 304, as the number of cores allocated to one or more applications increases, firmware engine 302 reduces the operational frequency of those allocated cores. In at least one embodiment, reduction of the operating frequency of allocated cores can be necessary to maintain stringent voltage/frequency margins tied to the cores and/or one or more systems implementing the cores. In at least one embodiment, firmware engine 302 communicates with clock generator 308 to establish the appropriate clocking frequency, based on the frequency lookup table 304, for one or more processors 302 and/or one or more cores 312. In at least one embodiment, clock generator 308 corresponds to clock generator 192 or clock generator 292. In at least one embodiment, cores 312 correspond to one or more of cores 120 and processors 310 correspond to one or more of processors 210.

In at least one embodiment, firmware engine 302 can receive request, such as a message or other data, to increase a frequency setting of cores allocated to an application. In at least one embodiment, request can be delivered by an operating system or other software entity associated with cores. In at least one embodiment, request can be delivered by an application. In at least one embodiment, request can be delivered by an application currently allocated cores.

In at least one embodiment, in response to receiving request to increase a frequency setting of allocated cores, firmware engine 302 can determine a number of cores already allocated. In at least one embodiment, firmware engine 302 determines a number of cores allocated to an application requesting an increase in a frequency setting of allocated cores. In at least one embodiment, firmware engine 302 allocates additional cores based on request to increase the frequency setting of allocated cores.

In at least one embodiment, firmware engine 302 allocates additional cores to correspond to a number of already allocated cores. In at least one embodiment, firmware engine 302 allocates additional cores to application requesting an increase in a frequency setting of allocated cores.

In at least one embodiment, firmware engine 302 enables a diagnostic mode, such as lockstep mode, and allocates additional cores based on enabling diagnostic mode, such as lockstep mode. For example, in at least one embodiment, allocated cores can equal two cores. Upon receiving request to increase a frequency setting of allocated cores, firmware engine 302 can allocate an additional two cores. In at least one embodiment, these additional two cores can be provided to execute identical instructions of allocated cores. In at least one embodiment, a first of the additional two cores is to execute the same or identical instructions of one of the already allocated cores and a second of the additional two cores is to execute the same or identical instructions of another of the already allocated cores. It should be appreciated that any number of additional cores can be allocated based on enabling diagnostic mode. For example, when already allocated cores equals 8, firmware engine 302, based on a request to increase frequency of allocated cores, can allocated an additional 8 cores. In at least one embodiment, these additional 8 cores are allocated to execute identical instruction of already allocated 8 cores. For example, in at least one embodiment, a first of allocated additional 8 cores can execute identical instructions, thread, work, etc. of a first of already allocated 8 cores, a second of allocated additional 8 cores can execute identical instructions, threads, work, etc. of a second of already allocated 8 cores, and so forth.

In at least one embodiment, firmware engine 302 can increase a frequency of one or more of each core allocated. In at least one embodiment, firmware engine 302 can increase a frequency of one or more of each core allocated in response to enabling a diagnostic mode, such as lockstep mode. In at least one embodiment, firmware engine 302 can increase a frequency of one or more of each core allocated before enabling a diagnostic mode, such as lockstep mode, and can correspondingly increase a frequency of one or more of each additional core allocated based on enabling a diagnostic mode, such as lockstep mode.

In at least one embodiment, firmware engine 302 determines a total number of cores allocated to an application, where the total number of cores can include a number of cores allocated to application before enabling diagnostic mode and a number of cores allocated to application based on enabling diagnostic mode. In at least one embodiment, firmware engine 302 references frequency offset lookup table 306 to identify a frequency value, in megahertz, gigahertz, etc., based on the determined total number of cores allocated to application. For example, if the application is allocated a total number of 7 cores, frequency value based on a frequency offset lookup table 306 equals 0.05 GHz. In at least one embodiment, firmware engine 302 instructs clock generator 308 to increase the clocking frequency of one or more of allocated cores based on the frequency value identified in frequency offset lookup table 306.

In at least one embodiment, firmware engine 302 enables diagnostic mode, such as lockstep mode, not because of a diagnostic request from application or operating system, rather firmware engine 302 enables diagnostic mode in order to boost or increase a clocking frequency of one or more allocated cores, where one or more allocated cores can include cores allocated prior to enabling diagnostic mode and/or cores allocated subsequent to enabling diagnostic mode.

In at least one embodiment, firmware engine 302 can monitor and/or evaluate output data from allocated cores to confirm output data of cores executing same or identical instructions, threads, processes, etc., are equal and/or equivalent. In at least one embodiment, when output data of cores executing same or identical instructions, threads, processes, etc., are not equal and/or equivalent, firmware engine 302 can reduce or decrease a clocking frequency of one or more allocated cores, where one or more allocated cores can include cores allocated prior to enabling diagnostic mode and/or cores allocated subsequent to enabling diagnostic mode. At regular intervals, such as intervals of seconds or less, firmware engine 302 can monitor and/or evaluate output data from allocated cores to confirm output data of cores executing same or identical instructions, threads, processes, etc., are equal and/or equivalent. In at least one embodiment, firmware engine 302 can incrementally reduce or decrease a clocking frequency of one or more allocated cores until such a time that output data of cores executing same or identical instructions are equal and/or equivalent.

Figure 4:
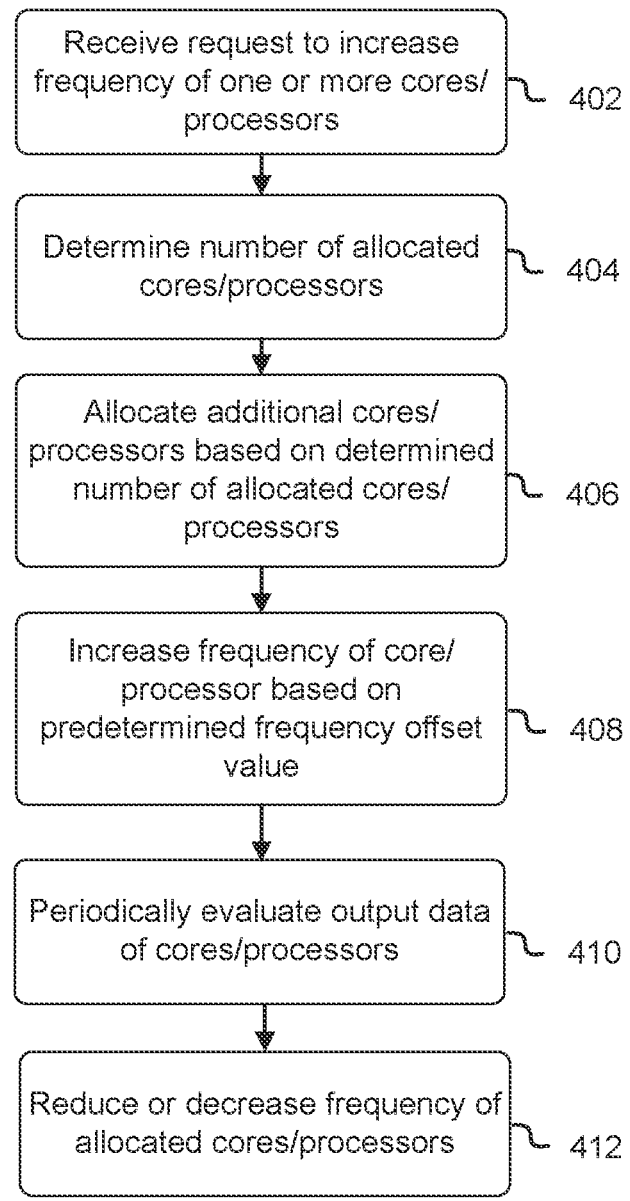
FIG. 4 illustrates an example flow diagram that may be associated with one or more of the described systems to increase a frequency of one or more cores or processors, according to at least one embodiment.

FIG. 4 illustrates an example flow diagram 400 that may be associated with one or more of the described systems to increase a frequency of one or more cores and/or processors, according to at least one embodiment. In some implementations, the acts of the flow diagram 400 are executed by one or more computing devices of the example systems described herein, such as one or more systems described with reference to FIGS. 1-3 and 5-36. The example systems may execute computer-executable instructions incorporating at least some of the processing acts of the flow diagram 400 to increase a frequency of one or more cores and/or processors, according to at least one embodiment.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and one or more systems described with reference to FIGS. 1-3 and 5-36, and the like.

Thus, it should be appreciated that the logical operations described herein are implemented (1) as a sequence of computer-implemented acts or program modules running on a computing system and/or (2) as interconnected machine logic circuits or circuit modules within the computing system, and/or one or more systems described with reference to FIGS. 1-3 and 5-36, and the like. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 402, a request is received to increase the frequency of one or more cores. In at least one embodiment, request is received by a hardware, software, or hardware and software elements of a system. In at least one embodiment, system can be firmware or an operating system. In at least one embodiment, request is received by a processor comprising cores. In at least one embodiment, request is received by a system hosting processors. In at least one embodiment, request is generated by an application. In at least one embodiment, request is generated by an application based on an optional performance mode of application. In at least one embodiment, request is generated by an application already allocated one or more cores to perform instructions, threads, work, etc., of application. In at least one embodiment, firmware engine 194, firmware engine 294, or firmware engine 302 receive request to increase frequency of one or more cores.

At 404, a number of already allocated cores is determined. In at least one embodiment, number of already allocated cores is determined by hardware, software, or hardware and software elements of system. In at least one embodiment, number of already allocated cores or allocated cores of an application, where allocated cores are allocated to process instructions, threads, work, etc., of application. In at least one embodiment, firmware engine 194, firmware engine 294, or firmware engine 302 determine number of already allocated cores.

At 406, one or more additional cores are allocated. In at least one embodiment, a number of allocated one or more additional cores at least equals number of already allocated cores. In at least one embodiment, one or more additional cores are allocated based on enabling a diagnostic mode, such as a lockstep mode. In at least one embodiment, one or more of additional cores are allocated to process instructions, threads, work, etc., allocated to already or previously allocated cores. For example, in at least one embodiment, a first core of a previously allocated cores can be allocated to process a first set of instructions, threads, work, etc. In at least one embodiment, a first core/processor of the additional cores allocated can be allocated to process the same first set of instructions, threads, work, etc. as first core of previously allocated cores. In at least one embodiment, the foregoing allocation strategy is repeated for additional or all already allocated cores.

At 408, a frequency of each of previously allocated cores and one or more additional cores is increased by a predetermined frequency offset value. In at least one embodiment, predetermined frequency offset value is determined based on reference to a frequency offset lookup table. In at least one embodiment, firmware engine in association with clock generator increase frequency of each of previously allocated cores and one or more additional cores. In at least one embodiment, firmware engine 194/clock generator 192, firmware engine 294/clock generator 292, and/or firmware engine 302/clock generator 308 increase frequency of each of previously allocated cores and one or more additional cores.

At 410, periodically evaluate output data of cores processing same or identical instructions, threads, work, etc. In at least one embodiment, software, hardware, or a combination of software and hardware can perform evaluation of output data. In at least one embodiment, firmware engine can perform evaluation of output data. In at least one embodiment, application requesting additional cores and/or requesting enabling of a performance mode can perform evaluation of output data. In at least one embodiment, firmware engine 194, firmware engine 294, and/or firmware engine 302 can it perform evaluation of output data. In at least one embodiment, operating system leveraging or using cores can perform evaluation of output data.

At 410, based on evaluation of output data of cores, a frequency associated with one or more allocated cores can be reduced or decreased. In at least one embodiment, frequency associated with one or more allocated cores can be reduced or decreased when output data of a cores is not consistent or the same for cores executing identical instructions, identical work, identical threads, etc. In at least one embodiment, firmware engine 194, firmware engine 294, and/or firmware engine 302 can cause frequency associated with one or more allocated cores to be reduced or decreased. In at least one embodiment, operating system leveraging or using cores can perform evaluation of output data can cause frequency associated with one or more allocated cores to be reduced or decreased.

Data Center

Figure 5:
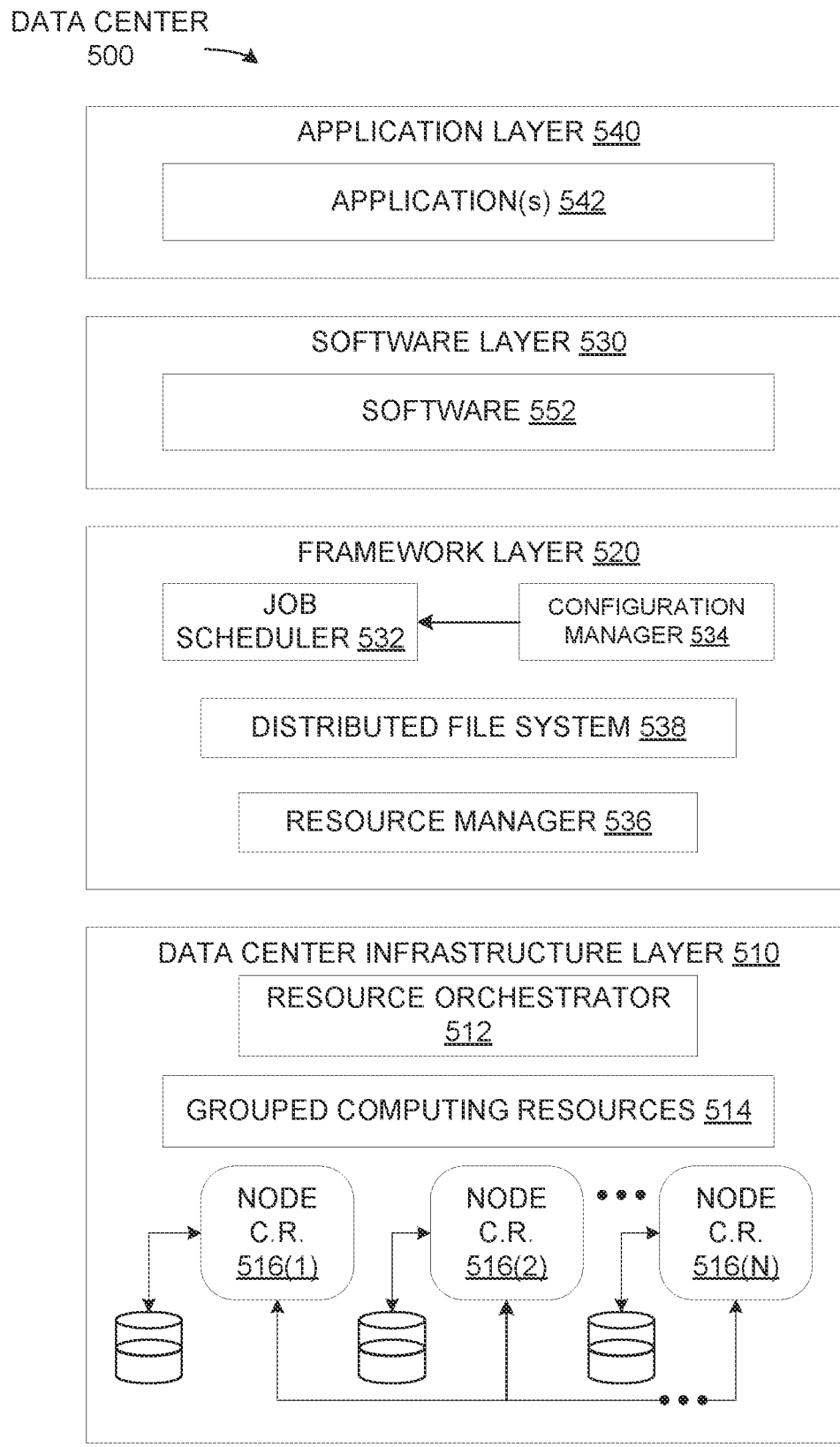
FIG. 5 illustrates an exemplary data center, in accordance with at least one embodiment.

FIG. 5 illustrates an exemplary data center 500, in accordance with at least one embodiment. In at least one embodiment, data center 500 includes, without limitation, a data center infrastructure layer 510, a framework layer 520, a software layer 530 and an application layer 540.

In at least one embodiment, as shown in FIG. 5, data center infrastructure layer 510 may include a resource orchestrator 512, grouped computing resources 514, and node computing resources ("node C.R.s") 516(1)-516(N), where "N" represents any whole, positive integer. In at least one embodiment, node C.R.s 516(1)-516(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 516(1)-516(N) may be a server having one or more of above-mentioned computing resources.

In at least one embodiment, grouped computing resources 514 may include separate groupings of node C.R.s housed within one or more racks (not shown), or many racks housed in data centers at various geographical locations (also not shown). Separate groupings of node C.R.s within grouped computing resources 514 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 512 may configure or otherwise control one or more node C.R.s 516(1)-516(N) and/or grouped computing resources 514. In at least one embodiment, resource orchestrator 512 may include a software design infrastructure ("SDI") management entity for data center 500. In at least one embodiment, resource orchestrator 512 may include hardware, software or some combination thereof.

In at least one embodiment, as shown in FIG. 5, framework layer 520 includes, without limitation, a job scheduler 532, a configuration manager 534, a resource manager 536 and a distributed file system 538. In at least one embodiment, framework layer 520 may include a framework to support software 552 of software layer 530 and/or one or more application(s) 542 of application layer 540. In at least one embodiment, software 552 or application(s) 542 may respectively include web-based service software or applications, such as those provided by Amazon Web Services, Google Cloud and Microsoft Azure. In at least one embodiment, framework layer 520 may be, but is not limited to, a type of free and open-source software web application framework such as Apache Spark™ (hereinafter "Spark") that may utilize distributed file system 538 for large-scale data processing (e.g., "big data"). In at least one embodiment, job scheduler 532 may include a Spark driver to facilitate scheduling of workloads supported by various layers of data center 500. In at least one embodiment, configuration manager 534 may be capable of configuring different layers such as software layer 530 and framework layer 520, including Spark and distributed file system 538 for supporting large-scale data processing. In at least one embodiment, resource manager 536 may be capable of managing clustered or grouped computing resources mapped to or allocated for support of distributed file system 538 and job scheduler 532. In at least one embodiment, clustered or grouped computing resources may include grouped computing resource 514 at data center infrastructure layer 510. In at least one embodiment, resource manager 536 may coordinate with resource orchestrator 512 to manage these mapped or allocated computing resources.

In at least one embodiment, software 552 included in software layer 530 may include software used by at least portions of node C.R.s 516(1)-516(N), grouped computing resources 514, and/or distributed file system 538 of framework layer 520. One or more types of software may include, but are not limited to, Internet web page search software, e-mail virus scan software, database software, and streaming video content software.

In at least one embodiment, application(s) 542 included in application layer 540 may include one or more types of applications used by at least portions of node C.R.s 516(1)-516(N), grouped computing resources 514, and/or distributed file system 538 of framework layer 520. In at least one or more types of applications may include, without limitation, CUDA applications.

In at least one embodiment, any of configuration manager 534, resource manager 536, and resource orchestrator 512 may implement any number and type of self-modifying actions based on any amount and type of data acquired in any technically feasible fashion. In at least one embodiment, self-modifying actions may relieve a data center operator of data center 500 from making possibly bad configuration decisions and possibly avoiding underutilized and/or poor performing portions of a data center.

In at least one embodiment, one or more components of exemplary data center 500 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Computer-Based Systems

The following figures set forth, without limitation, exemplary computer-based systems that can be used to implement at least one embodiment.

Figure 6:
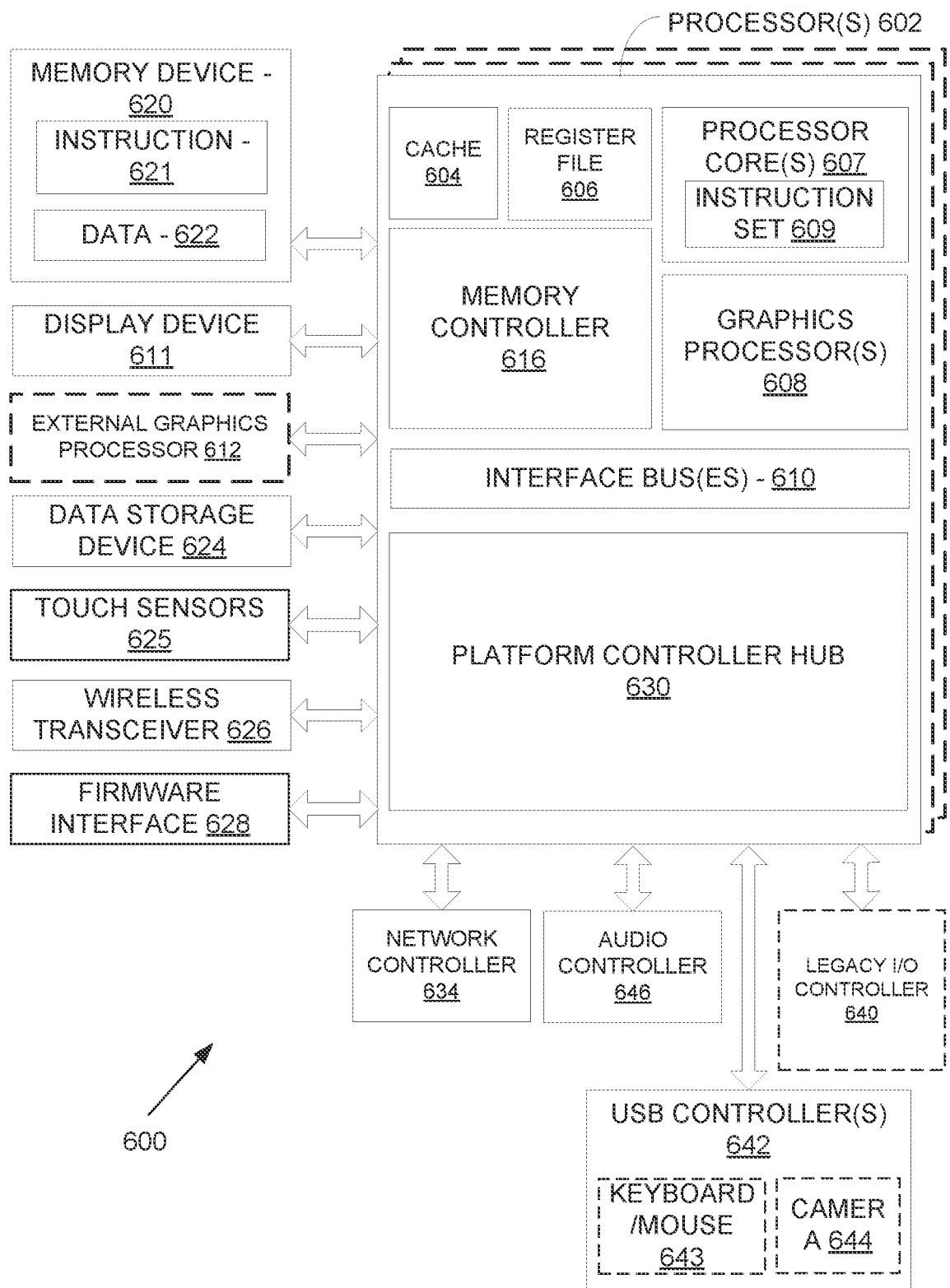
FIG. 6 illustrates a processing system, in accordance with at least one embodiment.

FIG. 6 illustrates a processing system 600, in accordance with at least one embodiment. In at least one embodiment, processing system 600 includes one or more processors 602 and one or more graphics processors 608, and may be a single processor desktop system, a multiprocessor workstation system, or a server system having a large number of processors 602 or processor cores 607. In at least one embodiment, processing system 600 is a processing platform incorporated within a system-on-a-chip ("SoC") integrated circuit for use in mobile, handheld, or embedded devices. In at least one embodiment, a processors core 607 is referred to as a computing unit or compute unit.

In at least one embodiment, processing system 600 can include, or be incorporated within a server-based gaming platform, a game console, a media console, a mobile gaming console, a handheld game console, or an online game console. In at least one embodiment, processing system 600 is a mobile phone, smart phone, tablet computing device or mobile Internet device. In at least one embodiment, processing system 600 can also include, couple with, or be integrated within a wearable device, such as a smart watch wearable device, smart eyewear device, augmented reality device, or virtual reality device. In at least one embodiment, processing system 600 is a television or set top box device having one or more processors 602 and a graphical interface generated by one or more graphics processors 608.

In at least one embodiment, one or more processors 602 each include one or more processor cores 607 to process instructions which, when executed, perform operations for system and user software. In at least one embodiment, each of one or more processor cores 607 is configured to process a specific instruction set 609. In at least one embodiment, instruction set 609 may facilitate Complex Instruction Set Computing ("CISC"), Reduced Instruction Set Computing ("RISC"), or computing via a Very Long Instruction Word ("VLIW"). In at least one embodiment, processor cores 607 may each process a different instruction set 609, which may include instructions to facilitate emulation of other instruction sets. In at least one embodiment, processor core 607 may also include other processing devices, such as a digital signal processor ("DSP").

In at least one embodiment, processor 602 includes cache memory ('cache") 604. In at least one embodiment, processor 602 can have a single internal cache or multiple levels of internal cache. In at least one embodiment, cache memory is shared among various components of processor 602. In at least one embodiment, processor 602 also uses an external cache (e.g., a Level 3 ("L3") cache or Last Level Cache ("LLC")) (not shown), which may be shared among processor cores 607 using known cache coherency techniques. In at least one embodiment, register file 606 is additionally included in processor 602 which may include different types of registers for storing different types of data (e.g., integer registers, floating point registers, status registers, and an instruction pointer register). In at least one embodiment, register file 606 may include general-purpose registers or other registers.

In at least one embodiment, one or more processor(s) 602 are coupled with one or more interface bus(es) 610 to transmit communication signals such as address, data, or control signals between processor 602 and other components in processing system 600. In at least one embodiment interface bus 610, in one embodiment, can be a processor bus, such as a version of a Direct Media Interface ("DMI") bus. In at least one embodiment, interface bus 610 is not limited to a DMI bus, and may include one or more Peripheral Component Interconnect buses (e.g., "PCI," PCI Express ("PCIe")), memory buses, or other types of interface buses. In at least one embodiment processor(s) 602 include an integrated memory controller 616 and a platform controller hub 630. In at least one embodiment, memory controller 616 facilitates communication between a memory device and other components of processing system 600, while platform controller hub ("PCH") 630 provides connections to Input/Output ("I/O") devices via a local I/O bus.

In at least one embodiment, memory device 620 can be a dynamic random access memory ("DRAM") device, a static random access memory ("SRAM") device, flash memory device, phase-change memory device, or some other memory device having suitable performance to serve as processor memory. In at least one embodiment memory device 620 can operate as system memory for processing system 600, to store data 622 and instructions 621 for use when one or more processors 602 executes an application or process. In at least one embodiment, memory controller 616 also couples with an optional external graphics processor 612, which may communicate with one or more graphics processors 608 in processors 602 to perform graphics and media operations. In at least one embodiment, a display device 611 can connect to processor(s) 602. In at least one embodiment display device 611 can include one or more of an internal display device, as in a mobile electronic device or a laptop device or an external display device attached via a display interface (e.g., DisplayPort, etc.). In at least one embodiment, display device 611 can include a head mounted display ("HMD") such as a stereoscopic display device for use in virtual reality ("VR") applications or augmented reality ("AR") applications.

In at least one embodiment, platform controller hub 630 enables peripherals to connect to memory device 620 and processor 602 via a high-speed I/O bus. In at least one embodiment, I/O peripherals include, but are not limited to, an audio controller 646, a network controller 634, a firmware interface 628, a wireless transceiver 626, touch sensors 625, a data storage device 624 (e.g., hard disk drive, flash memory, etc.). In at least one embodiment, data storage device 624 can connect via a storage interface (e.g., SATA) or via a peripheral bus, such as PCI, or PCIe. In at least one embodiment, touch sensors 625 can include touch screen sensors, pressure sensors, or fingerprint sensors. In at least one embodiment, wireless transceiver 626 can be a Wi-Fi transceiver, a Bluetooth transceiver, or a mobile network transceiver such as a 3G, 4G, or Long Term Evolution ("LTE") transceiver. In at least one embodiment, firmware interface 628 enables communication with system firmware, and can be, for example, a unified extensible firmware interface ("UEFI"). In at least one embodiment, network controller 634 can enable a network connection to a wired network. In at least one embodiment, a high-performance network controller (not shown) couples with interface bus 610. In at least one embodiment, audio controller 646 is a multi-channel high definition audio controller. In at least one embodiment, processing system 600 includes an optional legacy I/O controller 640 for coupling legacy (e.g., Personal System 2 ("PS/2")) devices to processing system 600. In at least one embodiment, platform controller hub 630 can also connect to one or more Universal Serial Bus ("USB") controllers 642 connect input devices, such as keyboard and mouse 643 combinations, a camera 644, or other USB input devices.

In at least one embodiment, an instance of memory controller 616 and platform controller hub 630 may be integrated into a discreet external graphics processor, such as external graphics processor 612. In at least one embodiment, platform controller hub 630 and/or memory controller 616 may be external to one or more processor(s) 602. For example, in at least one embodiment, processing system 600 can include an external memory controller 616 and platform controller hub 630, which may be configured as a memory controller hub and peripheral controller hub within a system chipset that is in communication with processor(s) 602.

In at least one embodiment, one or more components of processing system 600 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 7:
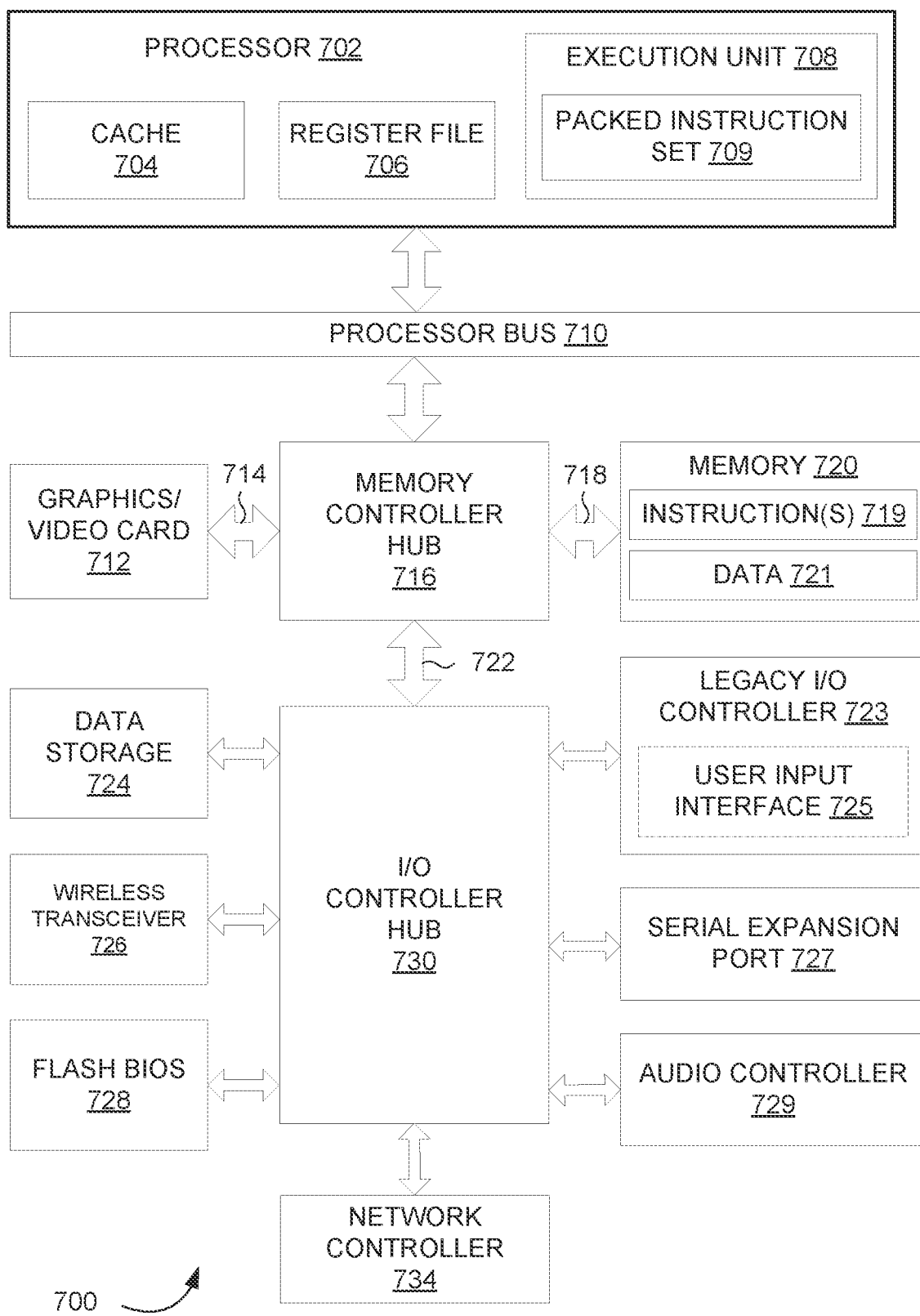
FIG. 7 illustrates a computer system, in accordance with at least one embodiment.

FIG. 7 illustrates a computer system 700, in accordance with at least one embodiment. In at least one embodiment, computer system 700 may be a system with interconnected devices and components, an SOC, or some combination. In at least on embodiment, computer system 700 is formed with a processor 702 that may include execution units to execute an instruction. In at least one embodiment, computer system 700 may include, without limitation, a component, such as processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 700 may include, without limitation, processor 702 that may include, without limitation, one or more execution units 708 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 708, including, without limitation, logic to perform integer and floating point operations, also resides in processor 702. Processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, a chipset, and processor 702. Examples may include, without limitation, an audio controller 729, a firmware hub ("flash BIOS") 728, a wireless transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips." In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof. In at least one embodiment, one or more components of system 700 are interconnected using compute express link ("CXL") interconnects.

In at least one embodiment, one or more components of system 700 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 8:
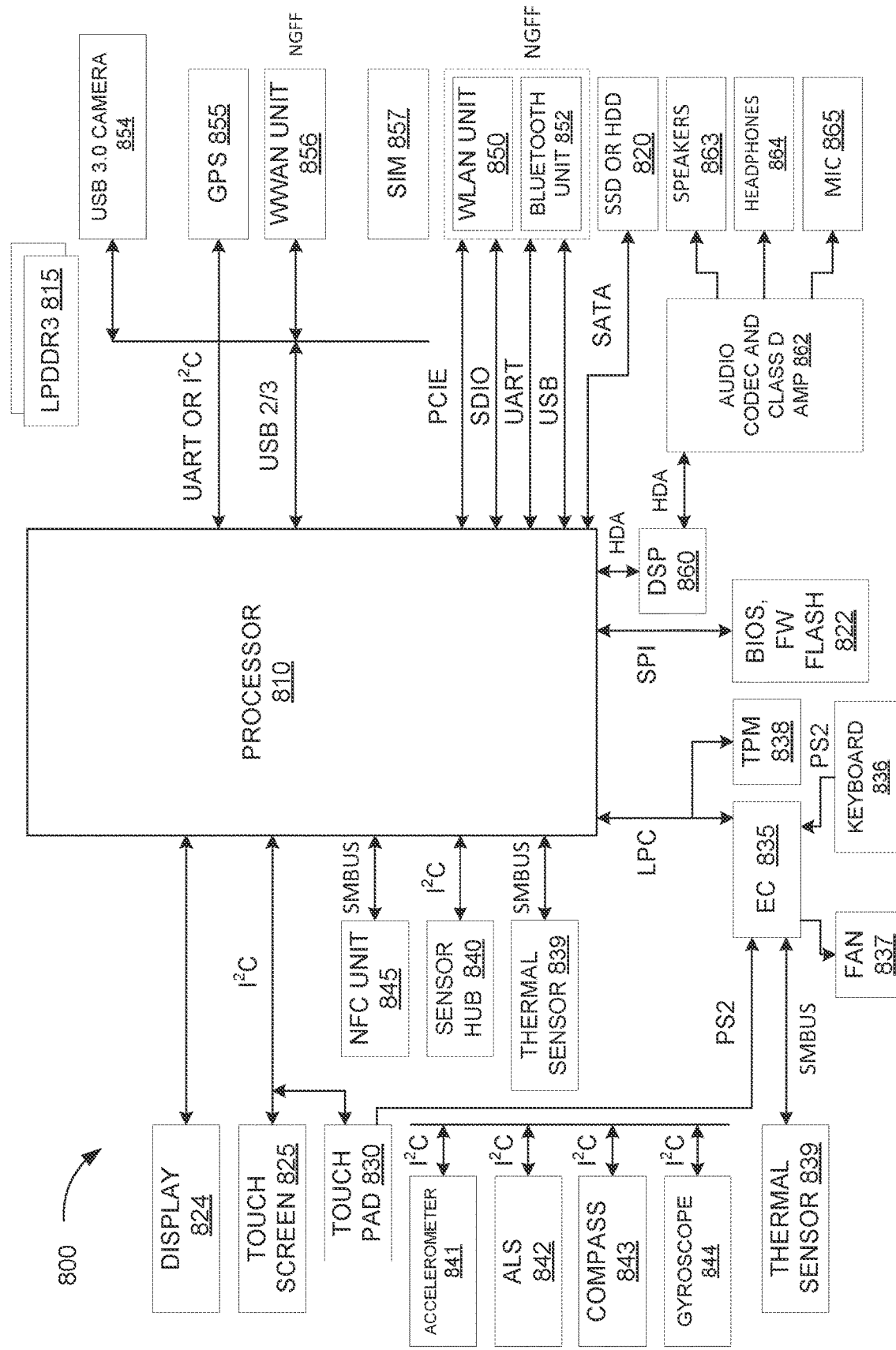
FIG. 8 illustrates a system, in accordance with at least one embodiment.

FIG. 8 illustrates a system 800, in accordance with at least one embodiment. In at least one embodiment, system 800 is an electronic device that utilizes a processor 810. In at least one embodiment, system 800 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 800 may include, without limitation, processor 810 communicatively coupled to any suitable number or kind of components, peripherals, modules, or devices. In at least one embodiment, processor 810 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 8 illustrates a system which includes interconnected hardware devices or "chips." In at least one embodiment, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using CXL interconnects.

In at least one embodiment, FIG. 8 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a Solid State Disk ("SSD") or Hard Disk Drive ("HDD") 820, a wireless local area network unit ("WLAN") 850, a Bluetooth unit 852, a Wireless Wide Area Network unit ("WWAN") 856, a Global Positioning System ("GPS") 855, a camera ("USB 3.0 camera") 854 such as a USB 3.0 camera, or a Low Power Double Data Rate ("LPDDR") memory unit ("LPDDR3") 815 implemented in, for example, LPDDR3 standard. These components may each be implemented in any suitable manner.

In at least one embodiment, other components may be communicatively coupled to processor 810 through components discussed above. In at least one embodiment, an accelerometer 841, an Ambient Light Sensor ("ALS") 842, a compass 843, and a gyroscope 844 may be communicatively coupled to sensor hub 840. In at least one embodiment, a thermal sensor 839, a fan 837, a keyboard 836, and a touch pad 830 may be communicatively coupled to EC 835. In at least one embodiment, a speaker 863, a headphones 864, and a microphone ("mic") 865 may be communicatively coupled to an audio unit ("audio codec and class d amp") 862, which may in turn be communicatively coupled to DSP 860. In at least one embodiment, audio unit 862 may include, for example and without limitation, an audio coder/decoder ("codec") and a class D amplifier. In at least one embodiment, a SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

In at least one embodiment, one or more components of system 800 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 9:
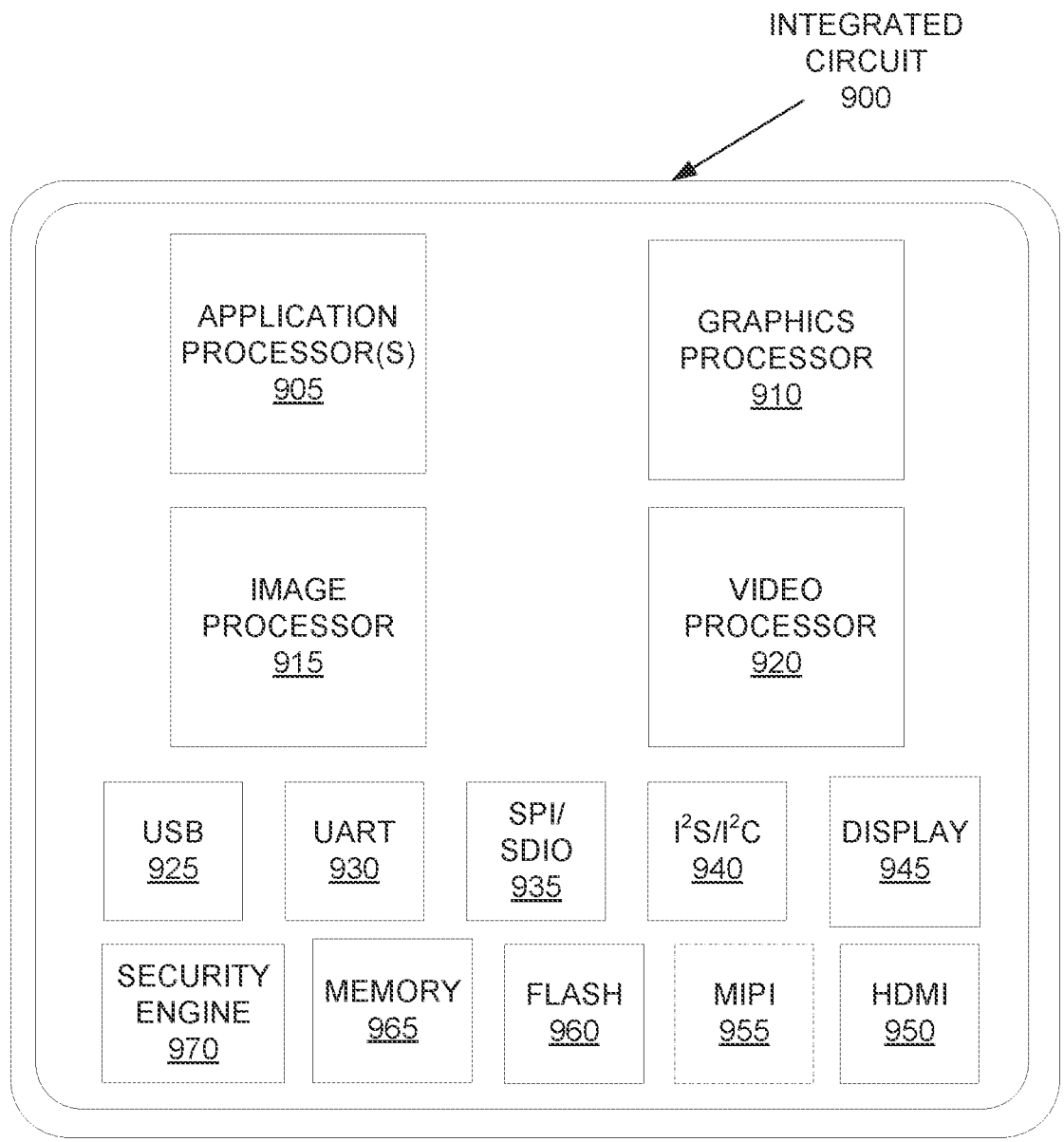
FIG. 9 illustrates an exemplary integrated circuit, in accordance with at least one embodiment.

FIG. 9 illustrates an exemplary integrated circuit 900, in accordance with at least one embodiment. In at least one embodiment, exemplary integrated circuit 900 is an SoC that may be fabricated using one or more IP cores. In at least one embodiment, integrated circuit 900 includes one or more application processor(s) 905 (e.g., CPUs, DPUs), at least one graphics processor 910, and may additionally include an image processor 915 and/or a video processor 920, any of which may be a modular IP core. In at least one embodiment, integrated circuit 900 includes peripheral or bus logic including a USB controller 925, a UART controller 930, an SPI/SDIO controller 935, and an I²S/I²C controller 940. In at least one embodiment, integrated circuit 900 can include a display device 945 coupled to one or more of a high-definition multimedia interface ("HDMI") controller 950 and a mobile industry processor interface ("MIPI") display interface 955. In at least one embodiment, storage may be provided by a flash memory subsystem 960 including flash memory and a flash memory controller. In at least one embodiment, a memory interface may be provided via a memory controller 965 for access to SDRAM or SRAM memory devices. In at least one embodiment, some integrated circuits additionally include an embedded security engine 970.

In at least one embodiment, one or more components of exemplary IC 900 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 10:
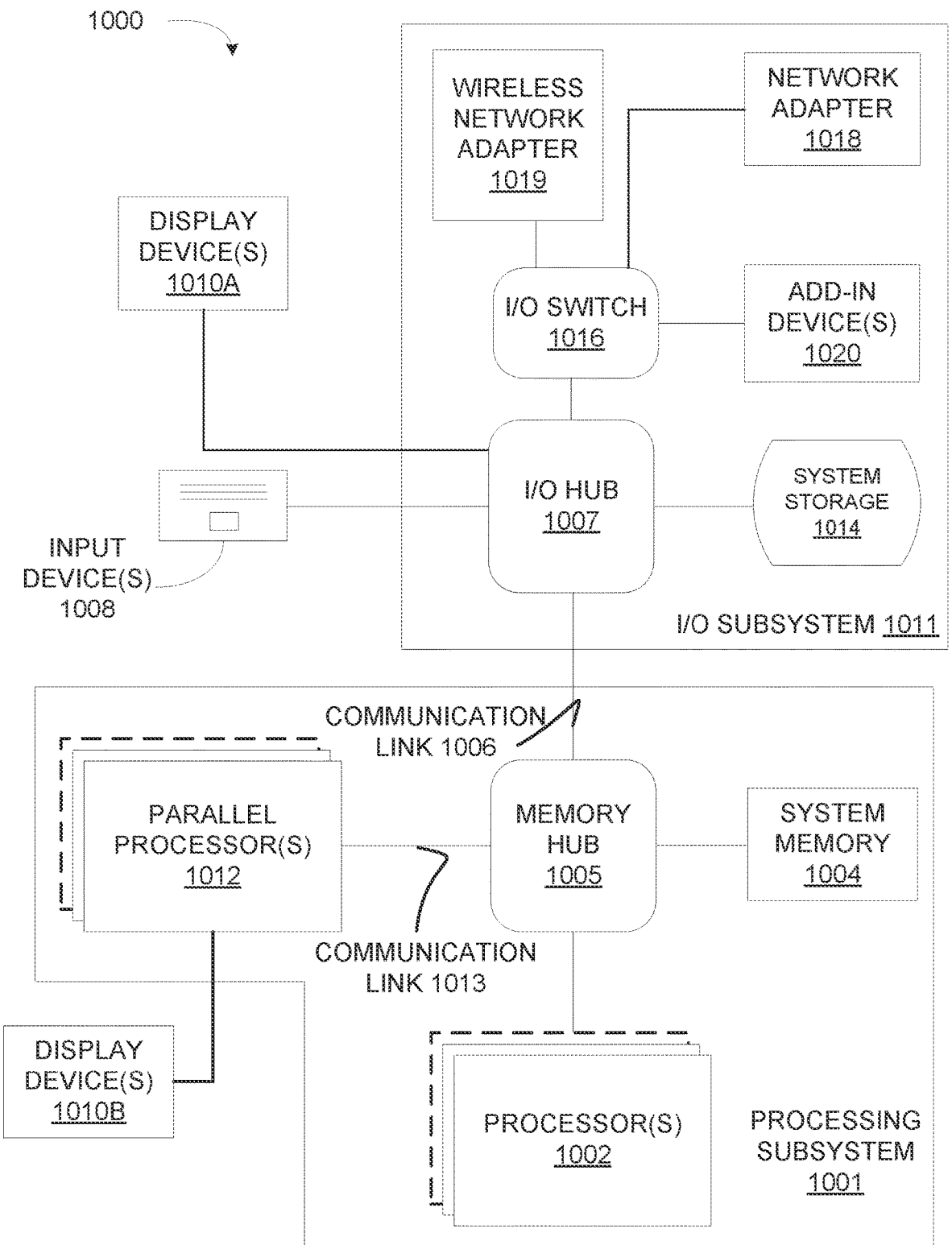
FIG. 10 illustrates a computing system, according to at least one embodiment.

FIG. 10 illustrates a computing system 1000, according to at least one embodiment; In at least one embodiment, computing system 1000 includes a processing subsystem 1001 having one or more processor(s) 1002 and a system memory 1004 communicating via an interconnection path that may include a memory hub 1005. In at least one embodiment, memory hub 1005 may be a separate component within a chipset component or may be integrated within one or more processor(s) 1002. In at least one embodiment, memory hub 1005 couples with an I/O subsystem 1011 via a communication link 1006. In at least one embodiment, I/O subsystem 1011 includes an I/O hub 1007 that can enable computing system 1000 to receive input from one or more input device(s) 1008. In at least one embodiment, I/O hub 1007 can enable a display controller, which may be included in one or more processor(s) 1002, to provide outputs to one or more display device(s) 1010A. In at least one embodiment, one or more display device(s) 1010A coupled with I/O hub 1007 can include a local, internal, or embedded display device.

In at least one embodiment, processing subsystem 1001 includes one or more parallel processor(s) 1012 coupled to memory hub 1005 via a bus or other communication link 1013. In at least one embodiment, communication link 1013 may be one of any number of standards based communication link technologies or protocols, such as, but not limited to PCIe, or may be a vendor specific communications interface or communications fabric. In at least one embodiment, one or more parallel processor(s) 1012 form a computationally focused parallel or vector processing system that can include a large number of processing cores and/or processing clusters, such as a many integrated core processor or compute units. In at least one embodiment, one or more parallel processor(s) 1012 form a graphics processing subsystem that can output pixels to one of one or more display device(s) 1010A coupled via I/O Hub 1007. In at least one embodiment, one or more parallel processor(s) 1012 can also include a display controller and display interface (not shown) to enable a direct connection to one or more display device(s) 1010B.

In at least one embodiment, a system storage unit 1014 can connect to I/O hub 1007 to provide a storage mechanism for computing system 1000. In at least one embodiment, an I/O switch 1016 can be used to provide an interface mechanism to enable connections between I/O hub 1007 and other components, such as a network adapter 1018 and/or wireless network adapter 1019 that may be integrated into a platform, and various other devices that can be added via one or more add-in device(s) 1020. In at least one embodiment, network adapter 1018 can be an Ethernet adapter or another wired network adapter. In at least one embodiment, wireless network adapter 1019 can include one or more of a Wi-Fi, Bluetooth, NFC, or other network device that includes one or more wireless radios.

In at least one embodiment, computing system 1000 can include other components not explicitly shown, including USB or other port connections, optical storage drives, video capture devices, and the like, that may also be connected to I/O hub 1007. In at least one embodiment, communication paths interconnecting various components in FIG. 10 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1012 incorporate circuitry optimized for graphics and video processing, including, for example, video output circuitry, and constitutes a graphics processing unit ("GPU"). In at least one embodiment, one or more parallel processor(s) 1012 incorporate circuitry optimized for general purpose processing. In at least embodiment, components of computing system 1000 may be integrated with one or more other system elements on a single integrated circuit. For example, in at least one embodiment, one or more parallel processor(s) 1012, memory hub 1005, processor(s) 1002, and I/O hub 1007 can be integrated into an SoC integrated circuit. In at least one embodiment, components of computing system 1000 can be integrated into a single package to form a system in package ("SIP") configuration. In at least one embodiment, at least a portion of the components of computing system 1000 can be integrated into a multi-chip module ("MCM"), which can be interconnected with other multi-chip modules into a modular computing system. In at least one embodiment, I/O subsystem 1011 and display devices 1010B are omitted from computing system 1000.

In at least one embodiment, one or more components of system 1000 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Processing Systems

The following figures set forth, without limitation, exemplary processing systems that can be used to implement at least one embodiment.

Figure 11:
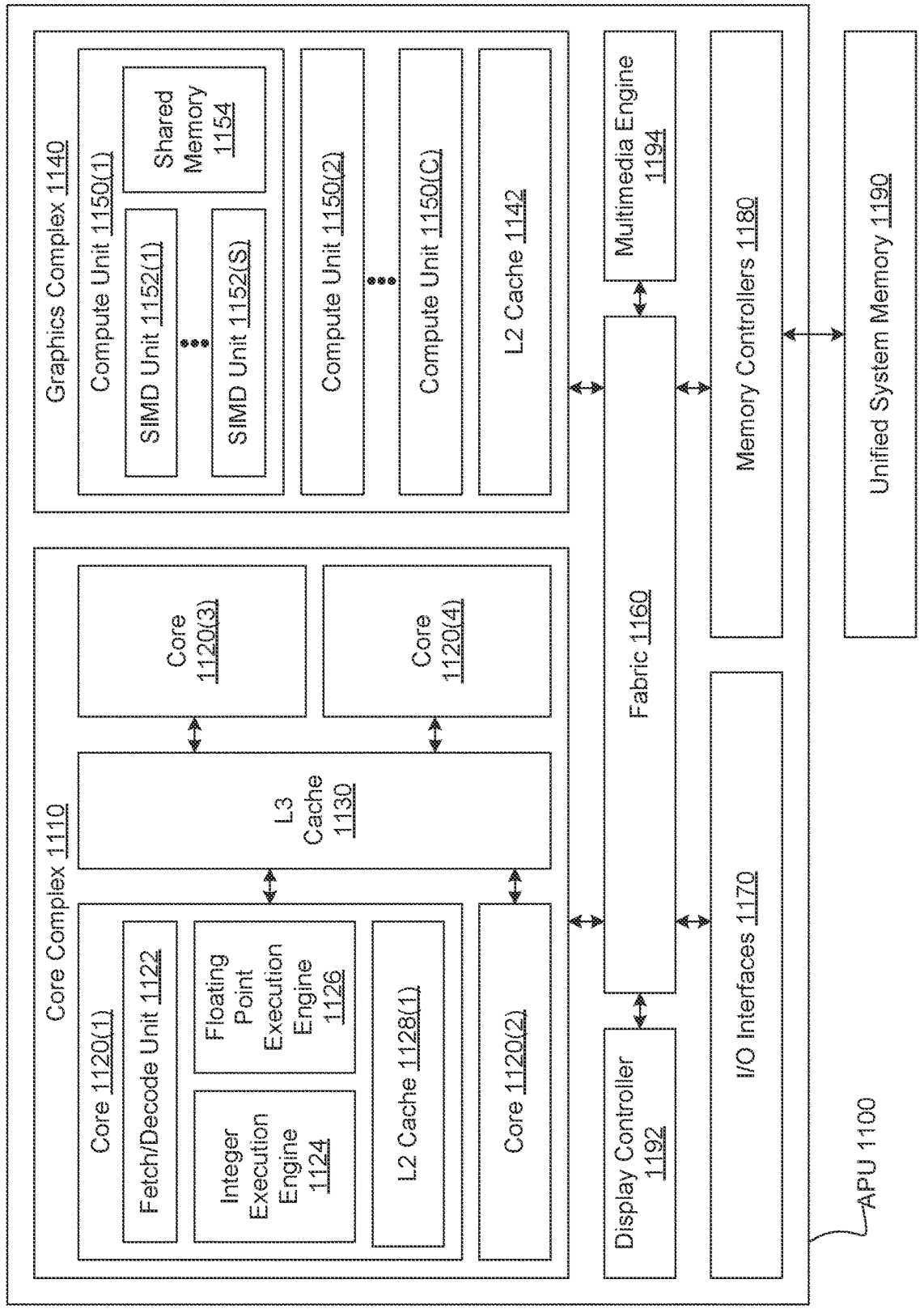
FIG. 11 illustrates an APU, in accordance with at least one embodiment.

FIG. 11 illustrates an accelerated processing unit ("APU") 1100, in accordance with at least one embodiment. In at least one embodiment, APU 1100 is developed by AMD Corporation of Santa Clara, CA. In at least one embodiment, APU 1100 can be configured to execute an application program, such as a CUDA program. In at least one embodiment, APU 1100 includes, without limitation, a core complex 1110, a graphics complex 1140, fabric 1160, I/O interfaces 1170, memory controllers 1180, a display controller 1192, and a multimedia engine 1194. In at least one embodiment, APU 1100 may include, without limitation, any number of core complexes 1110, any number of graphics complexes 1150, any number of display controllers 1192, and any number of multimedia engines 1194 in any combination. For explanatory purposes, multiple instances of like objects are denoted herein with reference numbers identifying the object and parenthetical numbers identifying the instance where needed.

In at least one embodiment, core complex 1110 is a CPU, graphics complex 1140 is a GPU, and APU 1100 is a processing unit that integrates, without limitation, 1110 and 1140 onto a single chip. In at least one embodiment, some tasks may be assigned to core complex 1110 and other tasks may be assigned to graphics complex 1140. In at least one embodiment, core complex 1110 is configured to execute main control software associated with APU 1100, such as an operating system. In at least one embodiment, core complex 1110 is the master processor of APU 1100, controlling and coordinating operations of other processors. In at least one embodiment, core complex 1110 issues commands that control the operation of graphics complex 1140. In at least one embodiment, core complex 1110 can be configured to execute host executable code derived from CUDA source code, and graphics complex 1140 can be configured to execute device executable code derived from CUDA source code.

In at least one embodiment, core complex 1110 includes, without limitation, cores 1120(1)-1120(4) and an L3 cache 1130. In at least one embodiment, core complex 1110 may include, without limitation, any number of cores 1120 and any number and type of caches in any combination. In at least one embodiment, cores 1120 are configured to execute instructions of a particular instruction set architecture ("ISA"). In at least one embodiment, each core 1120 is a CPU core. In at least one embodiment, core 1120 is referred to as a computing unit or compute unit.

In at least one embodiment, each core 1120 includes, without limitation, a fetch/decode unit 1122, an integer execution engine 1124, a floating point execution engine 1126, and an L2 cache 1128. In at least one embodiment, fetch/decode unit 1122 fetches instructions, decodes such instructions, generates micro-operations, and dispatches separate micro-instructions to integer execution engine 1124 and floating point execution engine 1126. In at least one embodiment, fetch/decode unit 1122 can concurrently dispatch one micro-instruction to integer execution engine 1124 and another micro-instruction to floating point execution engine 1126. In at least one embodiment, integer execution engine 1124 executes, without limitation, integer and memory operations. In at least one embodiment, floating point engine 1126 executes, without limitation, floating point and vector operations. In at least one embodiment, fetch-decode unit 1122 dispatches micro-instructions to a single execution engine that replaces both integer execution engine 1124 and floating point execution engine 1126.

In at least one embodiment, each core 1120($i$), where i is an integer representing a particular instance of core 1120, may access L2 cache 1128($i$) included in core 1120($i$). In at least one embodiment, each core 1120 included in core complex 1110($j$), where j is an integer representing a particular instance of core complex 1110, is connected to other cores 1120 included in core complex 1110($j$) via L3 cache 1130($j$) included in core complex 1110($j$). In at least one embodiment, cores 1120 included in core complex 1110($j$), where j is an integer representing a particular instance of core complex 1110, can access all of L3 cache 1130($j$) included in core complex 1110($j$). In at least one embodiment, L3 cache 1130 may include, without limitation, any number of slices.

In at least one embodiment, graphics complex 1140 can be configured to perform compute operations in a highly-parallel fashion. In at least one embodiment, graphics complex 1140 is configured to execute graphics pipeline operations such as draw commands, pixel operations, geometric computations, and other operations associated with rendering an image to a display. In at least one embodiment, graphics complex 1140 is configured to execute operations unrelated to graphics. In at least one embodiment, graphics complex 1140 is configured to execute both operations related to graphics and operations unrelated to graphics.

In at least one embodiment, graphics complex 1140 includes, without limitation, any number of compute units 1150 and an L2 cache 1142. In at least one embodiment, compute units 1150 share L2 cache 1142. In at least one embodiment, L2 cache 1142 is partitioned. In at least one embodiment, graphics complex 1140 includes, without limitation, any number of compute units 1150 and any number (including zero) and type of caches. In at least one embodiment, graphics complex 1140 includes, without limitation, any amount of dedicated graphics hardware.

In at least one embodiment, each compute unit 1150 includes, without limitation, any number of SIMD units 1152 and a shared memory 1154. In at least one embodiment, each SIMD unit 1152 implements a SIMD architecture and is configured to perform operations in parallel. In at least one embodiment, each compute unit 1150 may execute any number of thread blocks, but each thread block executes on a single compute unit 1150. In at least one embodiment, a thread block includes, without limitation, any number of threads of execution. In at least one embodiment, a workgroup is a thread block. In at least one embodiment, each SIMD unit 1152 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1154.

In at least one embodiment, fabric 1160 is a system interconnect that facilitates data and control transmissions across core complex 1110, graphics complex 1140, I/O interfaces 1170, memory controllers 1180, display controller 1192, and multimedia engine 1194. In at least one embodiment, APU 1100 may include, without limitation, any amount and type of system interconnect in addition to or instead of fabric 1160 that facilitates data and control transmissions across any number and type of directly or indirectly linked components that may be internal or external to APU 1100. In at least one embodiment, I/O interfaces 1170 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1170 In at least one embodiment, peripheral devices that are coupled to I/O interfaces 1170 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 1194 includes, without limitation, any amount and type of circuitry that is related to multimedia, such as a video decoder, a video encoder, an image signal processor, etc. In at least one embodiment, memory controllers 1180 facilitate data transfers between APU 1100 and a unified system memory 1190. In at least one embodiment, core complex 1110 and graphics complex 1140 share unified system memory 1190.

In at least one embodiment, APU 1100 implements a memory subsystem that includes, without limitation, any amount and type of memory controllers 1180 and memory devices (e.g., shared memory 1154) that may be dedicated to one component or shared among multiple components. In at least one embodiment, APU 1100 implements a cache subsystem that includes, without limitation, one or more cache memories (e.g., L2 caches 1228, L3 cache 1130, and L2 cache 1142) that may each be private to or shared between any number of components (e.g., cores 1120, core complex 1110, SIMD units 1152, compute units 1150, and graphics complex 1140).

In at least one embodiment, one or more components of exemplary APU 1100 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 12:
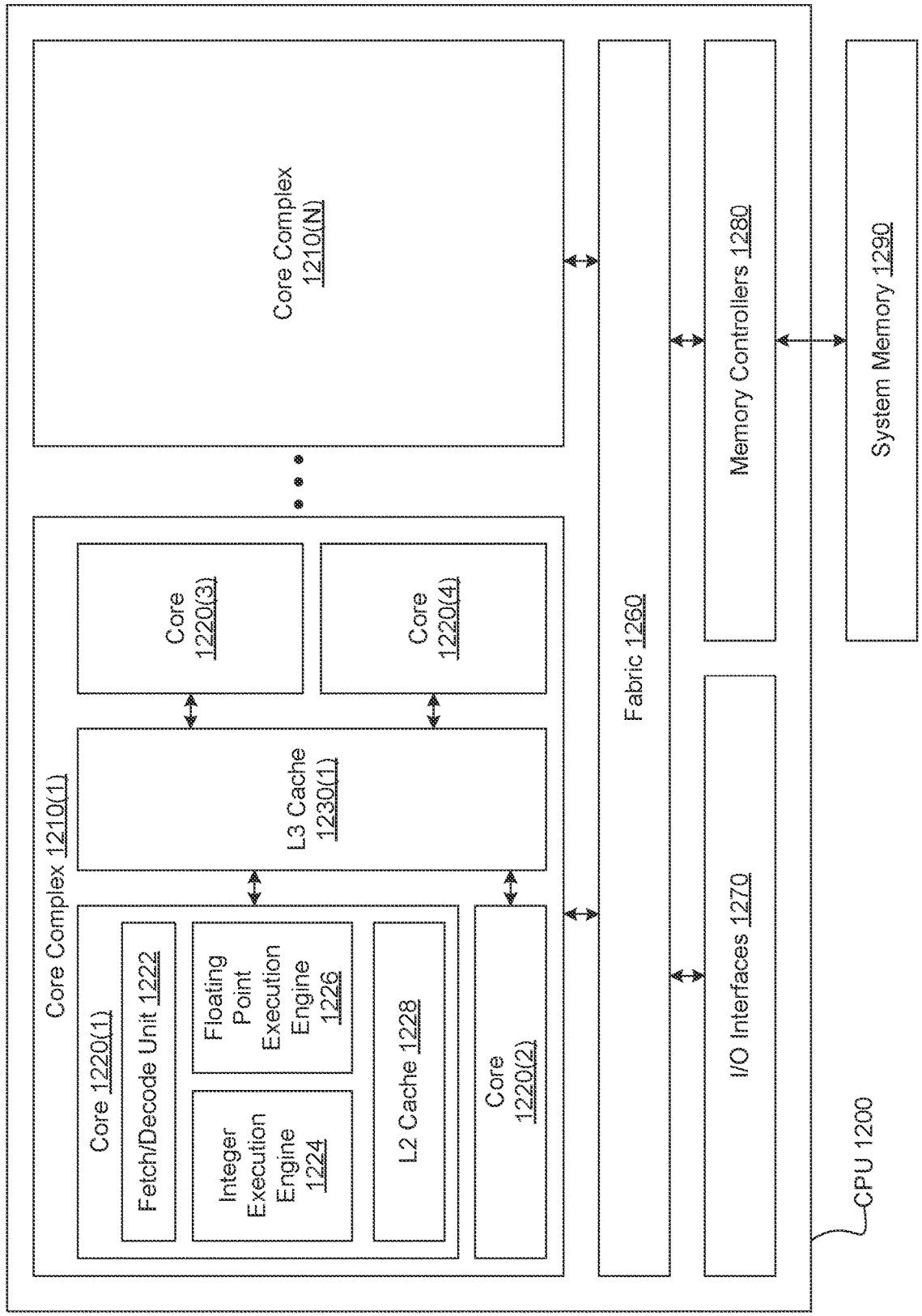
FIG. 12 illustrates a CPU, in accordance with at least one embodiment.

FIG. 12 illustrates a CPU 1200, in accordance with at least one embodiment. In at least one embodiment, CPU 1200 is developed by AMD Corporation of Santa Clara, CA. In at least one embodiment, CPU 1200 can be configured to execute an application program. In at least one embodiment, CPU 1200 is configured to execute main control software, such as an operating system. In at least one embodiment, CPU 1200 issues commands that control the operation of an external GPU (not shown). In at least one embodiment, CPU 1200 can be configured to execute host executable code derived from CUDA source code, and an external GPU can be configured to execute device executable code derived from such CUDA source code. In at least one embodiment, CPU 1200 includes, without limitation, any number of core complexes 1210, fabric 1260, I/O interfaces 1270, and memory controllers 1280.

In at least one embodiment, core complex 1210 includes, without limitation, cores 1220(1)-1220(4) and an L3 cache 1230. In at least one embodiment, core complex 1210 may include, without limitation, any number of cores 1220 and any number and type of caches in any combination. In at least one embodiment, cores 1220 are configured to execute instructions of a particular ISA. In at least one embodiment, each core 1220 is a CPU core.

In at least one embodiment, each core 1220 includes, without limitation, a fetch/decode unit 1222, an integer execution engine 1224, a floating point execution engine 1226, and an L2 cache 1228. In at least one embodiment, fetch/decode unit 1222 fetches instructions, decodes such instructions, generates micro-operations, and dispatches separate micro-instructions to integer execution engine 1224 and floating point execution engine 1226. In at least one embodiment, fetch/decode unit 1222 can concurrently dispatch one micro-instruction to integer execution engine 1224 and another micro-instruction to floating point execution engine 1226. In at least one embodiment, integer execution engine 1224 executes, without limitation, integer and memory operations. In at least one embodiment, floating point engine 1226 executes, without limitation, floating point and vector operations. In at least one embodiment, fetch-decode unit 1222 dispatches micro-instructions to a single execution engine that replaces both integer execution engine 1224 and floating point execution engine 1226.

In at least one embodiment, each core 1220($i$), where i is an integer representing a particular instance of core 1220, may access L2 cache 1228($i$) included in core 1220($i$). In at least one embodiment, each core 1220 included in core complex 1210($j$), where j is an integer representing a particular instance of core complex 1210, is connected to other cores 1220 in core complex 1210($j$) via L3 cache 1230($j$)

included in core complex 1210(j). In at least one embodiment, cores 1220 included in core complex 1210(j), where j is an integer representing a particular instance of core complex 1210, can access all of L3 cache 1230(j) included in core complex 1210(j). In at least one embodiment, L3 cache 1230 may include, without limitation, any number of slices.

In at least one embodiment, fabric 1260 is a system interconnect that facilitates data and control transmissions across core complexes 1210(1)-1210(N) (where N is an integer greater than zero), I/O interfaces 1270, and memory controllers 1280. In at least one embodiment, CPU 1200 may include, without limitation, any amount and type of system interconnect in addition to or instead of fabric 1260 that facilitates data and control transmissions across any number and type of directly or indirectly linked components that may be internal or external to CPU 1200. In at least one embodiment, I/O interfaces 1270 are representative of any number and type of I/O interfaces (e.g., PCI, PCI-X, PCIe, GBE, USB, etc.). In at least one embodiment, various types of peripheral devices are coupled to I/O interfaces 1270 In at least one embodiment, peripheral devices that are coupled to I/O interfaces 1270 may include, without limitation, displays, keyboards, mice, printers, scanners, joysticks or other types of game controllers, media recording devices, external storage devices, network interface cards, and so forth.

In at least one embodiment, memory controllers 1280 facilitate data transfers between CPU 1200 and a system memory 1290. In at least one embodiment, core complex 1210 and graphics complex 1240 share system memory 1290. In at least one embodiment, CPU 1200 implements a memory subsystem that includes, without limitation, any amount and type of memory controllers 1280 and memory devices that may be dedicated to one component or shared among multiple components. In at least one embodiment, CPU 1200 implements a cache subsystem that includes, without limitation, one or more cache memories (e.g., L2 caches 1228 and L3 caches 1230) that may each be private to or shared between any number of components (e.g., cores 1220 and core complexes 1210).

In at least one embodiment, one or more components of exemplary CPU 1200 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 13:
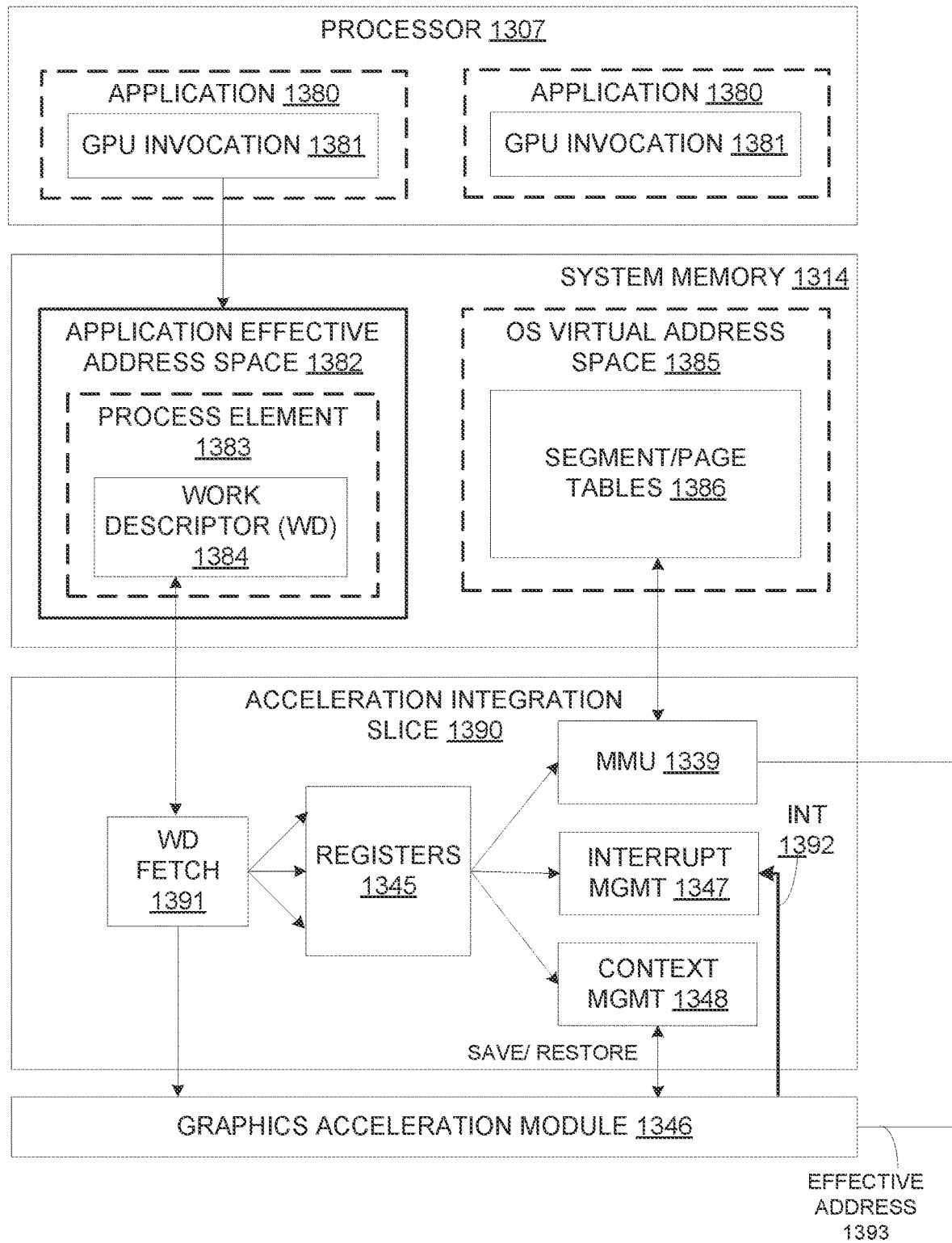
FIG. 13 illustrates an exemplary accelerator integration slice, in accordance with at least one embodiment.

FIG. 13 illustrates an exemplary accelerator integration slice 1390, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 1382 within system memory 1314 stores process elements 1383. In one embodiment, process elements 1383 are stored in response to GPU invocations 1381 from applications 1380 executed on processor 1307. A process element 1383 contains process state for corresponding application 1380. A work descriptor ("WD") 1384 contained in process element 1383 can be a single job requested by an application or may contain a pointer to a queue of jobs. In at least one embodiment, WD 1384 is a pointer to a job request queue in application effective address space 1382.

Graphics acceleration module 1346 and/or individual graphics processing engines can be shared by all or a subset of processes in a system. In at least one embodiment, an infrastructure for setting up process state and sending WD 1384 to graphics acceleration module 1346 to start a job in a virtualized environment may be included.

In at least one embodiment, a dedicated-process programming model is implementation-specific. In this model, a single process owns graphics acceleration module 1346 or an individual graphics processing engine. Because graphics acceleration module 1346 is owned by a single process, a hypervisor initializes an accelerator integration circuit for an owning partition and an operating system initializes accelerator integration circuit for an owning process when graphics acceleration module 1346 is assigned.

In operation, a WD fetch unit 1391 in accelerator integration slice 1390 fetches next WD 1384 which includes an indication of work to be done by one or more graphics processing engines of graphics acceleration module 1346. Data from WD 1384 may be stored in registers 1345 and used by a memory management unit ("MMU") 1339, interrupt management circuit 1347 and/or context management circuit 1348 as illustrated. For example, one embodiment of MMU 1339 includes segment/page walk circuitry for accessing segment/page tables 1386 within OS virtual address space 1385. Interrupt management circuit 1347 may process interrupt events ("INT") 1392 received from graphics acceleration module 1346. When performing graphics operations, an effective address 1393 generated by a graphics processing engine is translated to a real address by MMU 1339.

In one embodiment, a same set of registers 1345 are duplicated for each graphics processing engine and/or graphics acceleration module 1346 and may be initialized by a hypervisor or operating system. Each of these duplicated registers may be included in accelerator integration slice 1390. Exemplary registers that may be initialized by a hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 1384 is specific to a particular graphics acceleration module 1346 and/or a particular graphics processing engine. It contains all information required by a graphics processing engine to do work or it can be a pointer to a memory location where an application has set up a command queue of work to be completed.

Figure 14A:
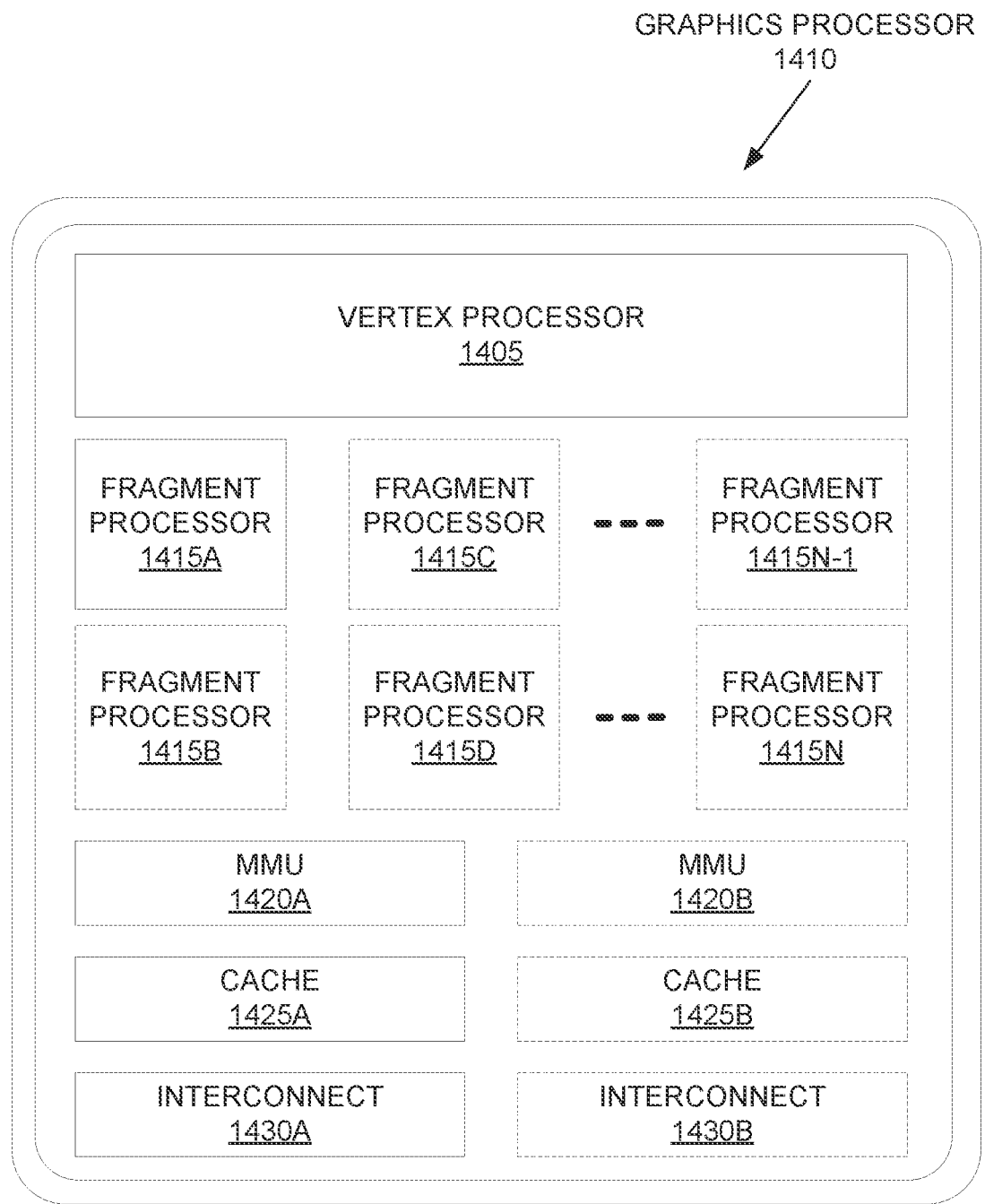
FIGS. 14A-14B illustrate exemplary graphics processors, in accordance with at least one embodiment.
Figure 14B:
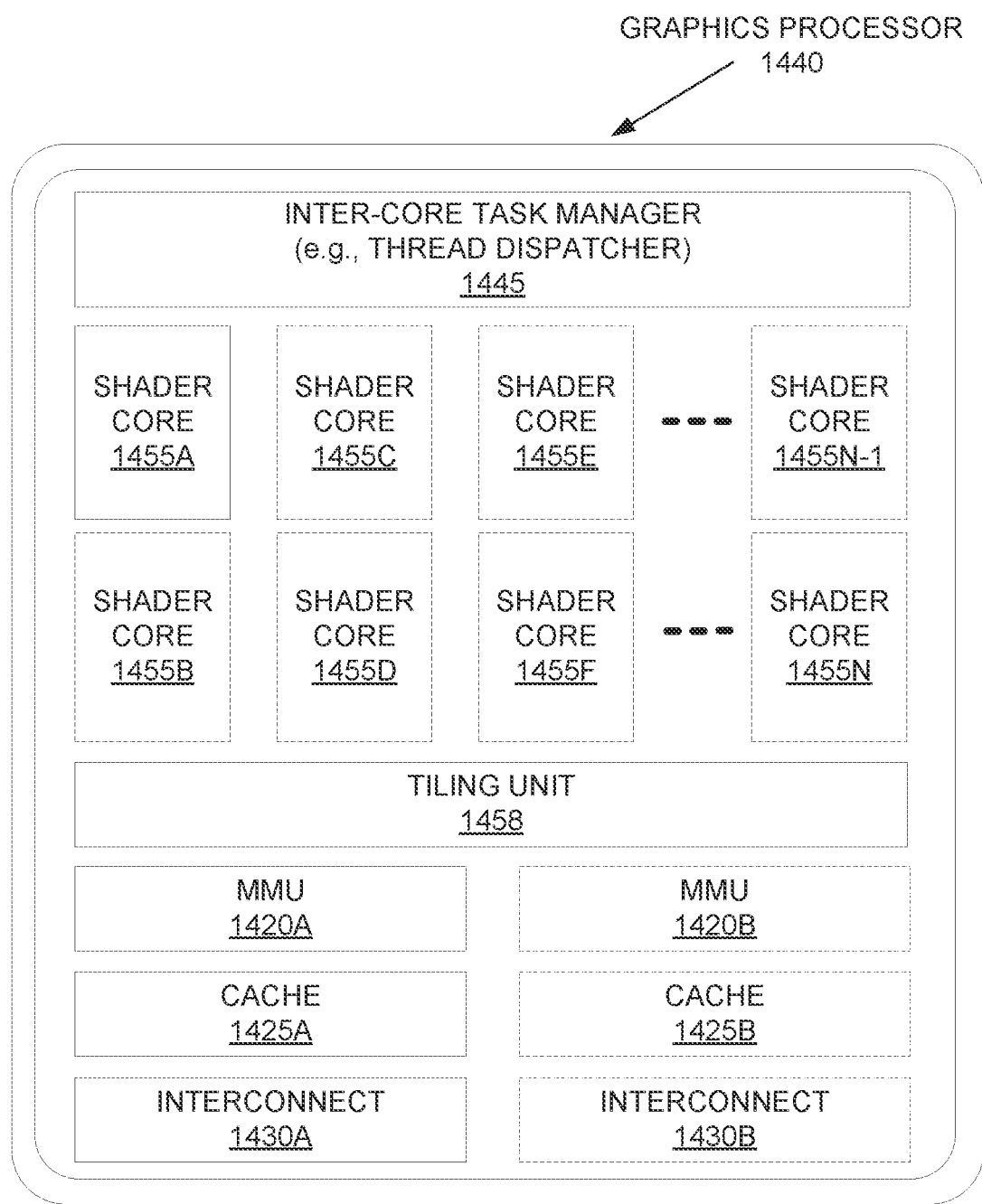

FIGS. 14A-14B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 14A illustrates an exemplary graphics processor 1410 of an SoC integrated circuit that may be fabricated using one or more IP cores, in accordance with at least one embodiment. FIG. 14B illustrates an additional exemplary graphics processor 1440 of an SoC integrated circuit that may be fabricated using one or more IP cores, in accordance with at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of graphics processor 910 of FIG. 9.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more MMU(s) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within a system, including one or more MMUs associated with one or more application processor(s) 905, image processors 915, and/or video processors 920 of FIG. 9, such that each processor 905-920 can participate in a shared or unified virtual memory system. In at least one embodiment, one or more circuit interconnect(s) 1430A-1430B enable graphics processor 1410 to interface with other IP cores within an SoC, either via an internal bus of the SoC or via a direct connection.

In at least one embodiment, graphics processor 1440 includes one or more MMU(s) 1420A-1420B, caches 1425A-1425B, and circuit interconnects 1430A-1430B of graphics processor 1410 of FIG. 14A. In at least one embodiment, graphics processor 1440 includes one or more shader core(s) 1455A-1455N (e.g., 1455A, 1455B, 1455C, 1455D, 1455E, 1455F, through 1455N-1, and 1455N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

In at least one embodiment, one or more components of exemplary graphics processors can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 15A:
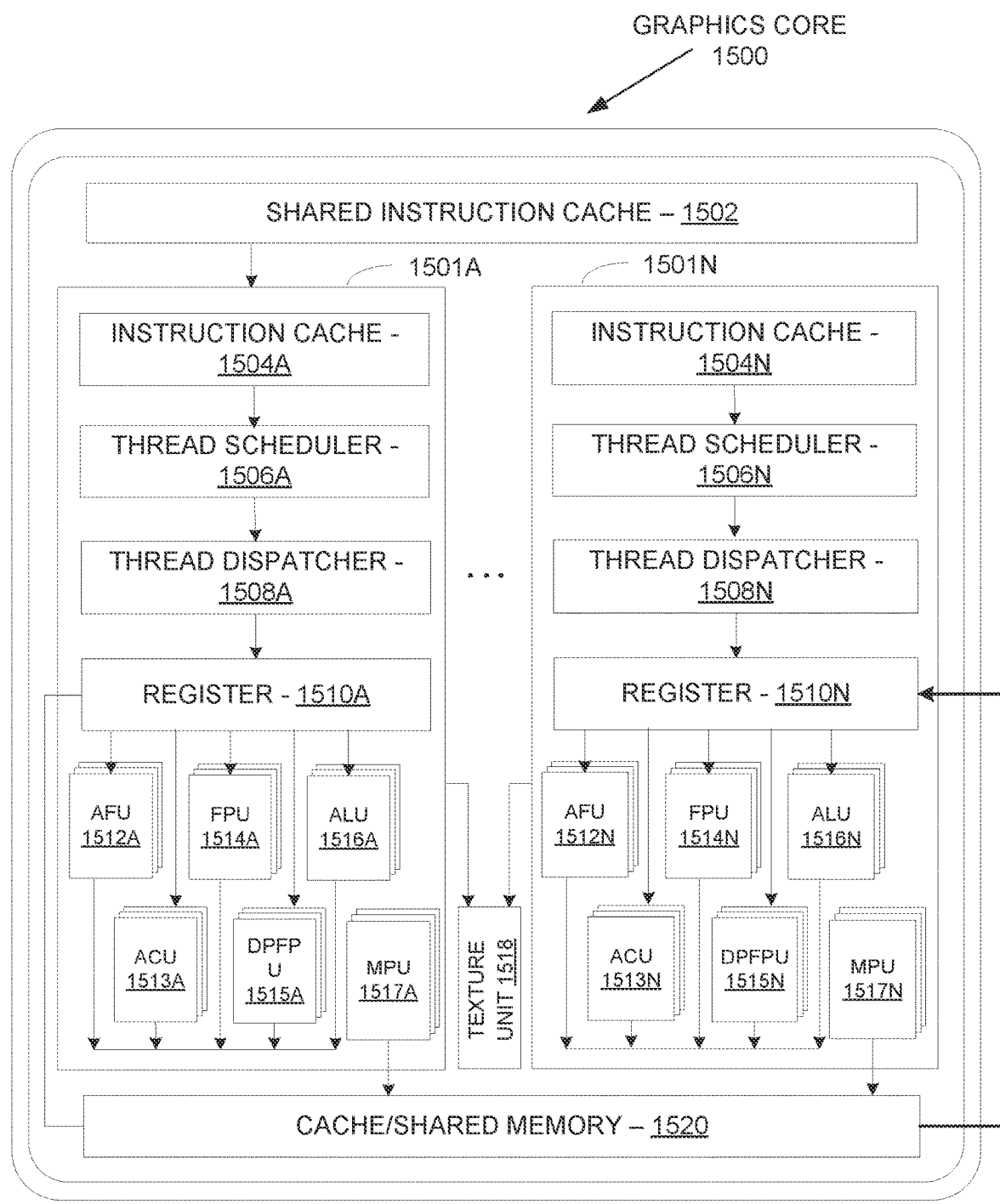
FIG. 15A illustrates a graphics core, in accordance with at least one embodiment.

FIG. 15A illustrates a graphics core 1500, in accordance with at least one embodiment. In at least one embodiment, graphics core 1500 may be included within graphics processor 910 of FIG. 9. In at least one embodiment, graphics core 1500 may be a unified shader core 1455A-1455N as in FIG. 14B. In at least one embodiment, graphics core 1500 includes a shared instruction cache 1502, a texture unit 1518, and a cache/shared memory 1520 that are common to execution resources within graphics core 1500. In at least one embodiment, graphics core 1500 can include multiple slices 1501A-1501N or partition for each core, and a graphics processor can include multiple instances of graphics core 1500. Slices 1501A-1501N can include support logic including a local instruction cache 1504A-1504N, a thread scheduler 1506A-1506N, a thread dispatcher 1508A-1508N, and a set of registers 1510A-1510N. In at least one embodiment, slices 1501A-1501N can include a set of additional function units ("AFUs") 1512A-1512N, floating-point units ("FPUs") 1514A-1514N, integer arithmetic logic units ("ALUs") 1516-1516N, address computational units ("ACUs") 1513A-1513N, double-precision floating-point units ("DPFPUs") 1515A-1515N, and matrix processing units ("MPUs") 1517A-1517N. In at least one embodiment, a graphics core 1500 is referred to as a compute unit or computing unit.

In at least one embodiment, FPUs 1514A-1514N can perform single-precision (32-bit) and half-precision (16-bit) floating point operations, while DPFPUs 1515A-1515N perform double precision (64-bit) floating point operations. In at least one embodiment, ALUs 1516A-1516N can perform variable precision integer operations at 8-bit, 16-bit, and 32-bit precision, and can be configured for mixed precision operations. In at least one embodiment, MPUs 1517A-1517N can also be configured for mixed precision matrix operations, including half-precision floating point and 8-bit integer operations. In at least one embodiment, MPUs 1517-1517N can perform a variety of matrix operations to accelerate CUDA programs, including enabling support for accelerated general matrix to matrix multiplication ("GEMM"). In at least one embodiment, AFUs 1512A-1512N can perform additional logic operations not supported by floating-point or integer units, including trigonometric operations (e.g., Sine, Cosine, etc.).

In at least one embodiment, one or more components of graphics core 1500 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 15B:
FIG. 15B illustrates a GPGPU, in accordance with at least one embodiment.

FIG. 15B illustrates a general-purpose graphics processing unit ("GPGPU") 1530, in accordance with at least one embodiment. In at least one embodiment, GPGPU 1530 is highly-parallel and suitable for deployment on a multi-chip module. In at least one embodiment, GPGPU 1530 can be configured to enable highly-parallel compute operations to be performed by an array of GPUs. In at least one embodiment, GPGPU 1530 can be linked directly to other instances of GPGPU 1530 to create a multi-GPU cluster to improve execution time for CUDA programs. In at least one embodiment, GPGPU 1530 includes a host interface 1532 to enable a connection with a host processor. In at least one embodiment, host interface 1532 is a PCIe interface. In at least one embodiment, host interface 1532 can be a vendor specific communications interface or communications fabric. In at least one embodiment, GPGPU 1530 receives commands from a host processor and uses a global scheduler 1534 to distribute execution threads associated with those commands to a set of compute clusters 1536A-1536H. In at least one embodiment, compute clusters 1536A-1536H share a cache memory 1538. In at least one embodiment, cache memory 1538 can serve as a higher-level cache for cache memories within compute clusters 1536A-1536H.

In at least one embodiment, GPGPU 1530 includes memory 1544A-1544B coupled with compute clusters 1536A-1536H via a set of memory controllers 1542A-1542B. In at least one embodiment, memory 1544A-1544B can include various types of memory devices including DRAM or graphics random access memory, such as synchronous graphics random access memory ("SGRAM"), including graphics double data rate ("GDDR") memory.

In at least one embodiment, compute clusters 1536A-1536H each include a set of graphics cores, such as graphics core 1500 of FIG. 15A, which can include multiple types of integer and floating point logic units that can perform computational operations at a range of precisions including suited for computations associated with CUDA programs. For example, in at least one embodiment, at least a subset of floating point units in each of compute clusters 1536A-1536H can be configured to perform 16-bit or 32-bit floating point operations, while a different subset of floating point units can be configured to perform 64-bit floating point operations.

In at least one embodiment, multiple instances of GPGPU 1530 can be configured to operate as a compute cluster. Compute clusters 1536A-1536H may implement any technically feasible communication techniques for synchronization and data exchange. In at least one embodiment, multiple instances of GPGPU 1530 communicate over host interface 1532. In at least one embodiment, GPGPU 1530 includes an I/O hub 1539 that couples GPGPU 1530 with a GPU link 1540 that enables a direct connection to other instances of GPGPU 1530. In at least one embodiment, GPU link 1540 is coupled to a dedicated GPU-to-GPU bridge that enables communication and synchronization between multiple instances of GPGPU 1530. In at least one embodiment GPU link 1540 couples with a high speed interconnect to transmit and receive data to other GPGPUs 1530 or parallel processors. In at least one embodiment, multiple instances of GPGPU 1530 are located in separate data processing systems and communicate via a network device that is accessible via host interface 1532. In at least one embodiment GPU link 1540 can be configured to enable a connection to a host processor in addition to or as an alternative to host interface 1532. In at least one embodiment, GPGPU 1530 can be configured to execute a CUDA program.

In at least one embodiment, one or more components of GPGPU 1530 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 16A:
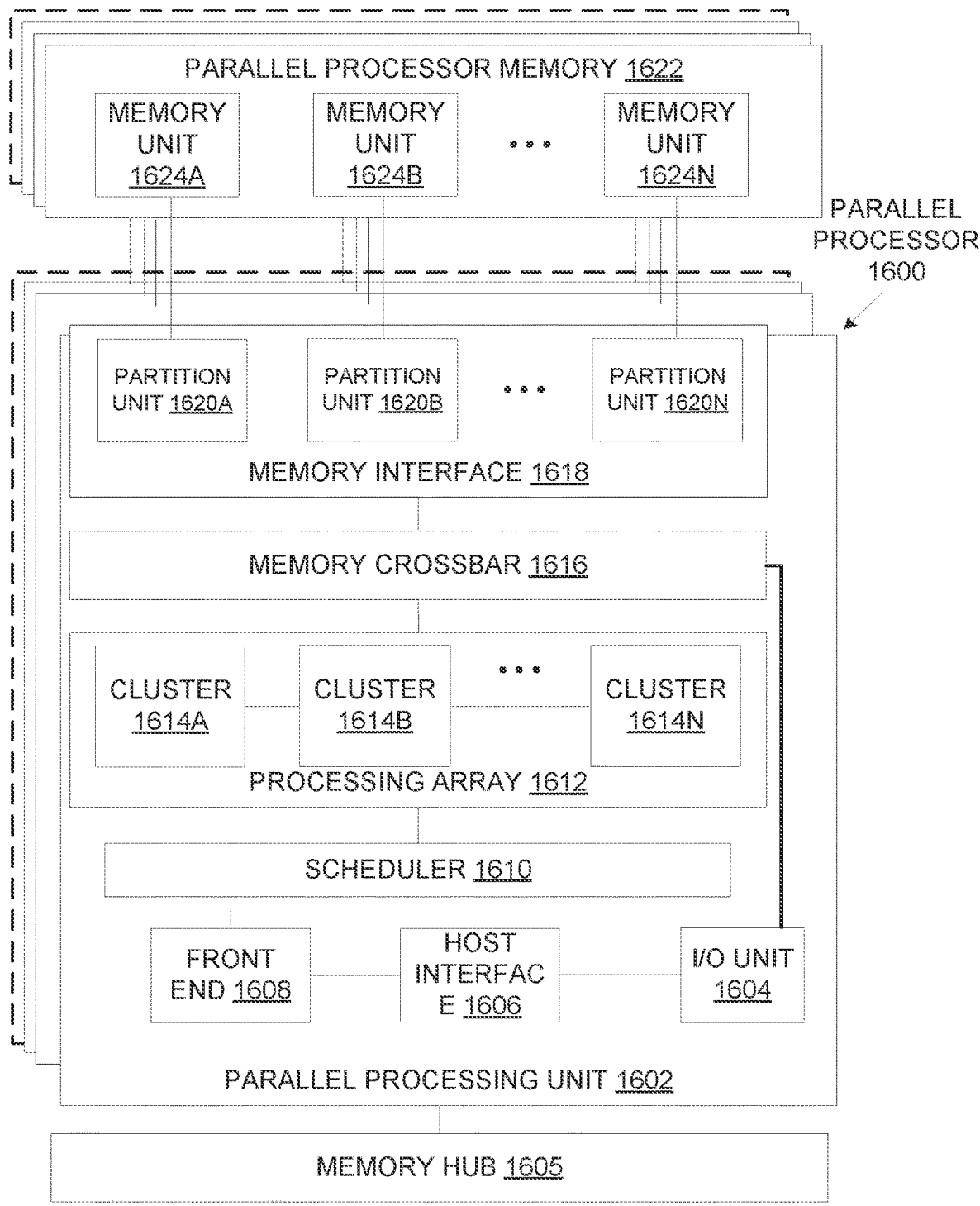
FIG. 16A illustrates a parallel processor, in accordance with at least one embodiment.

FIG. 16A illustrates a parallel processor 1600, in accordance with at least one embodiment. In at least one embodiment, various components of parallel processor 1600 may be implemented using one or more integrated circuit devices, such as programmable processors, application specific integrated circuits ("ASICs"), or FPGAs.

In at least one embodiment, parallel processor 1600 includes a parallel processing unit 1602. In at least one embodiment, parallel processing unit 1602 includes an I/O unit 1604 that enables communication with other devices, including other instances of parallel processing unit 1602. In at least one embodiment, I/O unit 1604 may be directly connected to other devices. In at least one embodiment, I/O unit 1604 connects with other devices via use of a hub or switch interface, such as memory hub 1605. In at least one embodiment, connections between memory hub 1605 and I/O unit 1604 form a communication link. In at least one embodiment, I/O unit 1604 connects with a host interface 1606 and a memory crossbar 1616, where host interface 1606 receives commands directed to performing processing operations and memory crossbar 1616 receives commands directed to performing memory operations.

In at least one embodiment, when host interface 1606 receives a command buffer via I/O unit 1604, host interface 1606 can direct work operations to perform those commands to a front end 1608. In at least one embodiment, front end 1608 couples with a scheduler 1610, which is configured to distribute commands or other work items to a processing array 1612. In at least one embodiment, scheduler 1610 ensures that processing array 1612 is properly configured and in a valid state before tasks are distributed to processing array 1612. In at least one embodiment, scheduler 1610 is implemented via firmware logic executing on a microcontroller. In at least one embodiment, microcontroller implemented scheduler 1610 is configurable to perform complex scheduling and work distribution operations at coarse and fine granularity, enabling rapid preemption and context switching of threads executing on processing array 1612. In at least one embodiment, host software can prove workloads for scheduling on processing array 1612 via one of multiple graphics processing doorbells. In at least one embodiment, workloads can then be automatically distributed across processing array 1612 by scheduler 1610 logic within a microcontroller including scheduler 1610.

In at least one embodiment, processing array 1612 can include up to "N" clusters (e.g., cluster 1614A, cluster 1614B, through cluster 1614N). In at least one embodiment, each cluster 1614A-1614N of processing array 1612 can execute a large number of concurrent threads. In at least one embodiment, scheduler 1610 can allocate work to clusters 1614A-1614N of processing array 1612 using various scheduling and/or work distribution algorithms, which may vary depending on the workload arising for each type of program or computation. In at least one embodiment, scheduling can be handled dynamically by scheduler 1610, or can be assisted in part by compiler logic during compilation of program logic configured for execution by processing array 1612. In at least one embodiment, different clusters 1614A-1614N of processing array 1612 can be allocated for processing different types of programs or for performing different types of computations.

In at least one embodiment, processing array 1612 can be configured to perform various types of parallel processing operations. In at least one embodiment, processing array 1612 is configured to perform general-purpose parallel compute operations. For example, in at least one embodiment, processing array 1612 can include logic to execute processing tasks including filtering of video and/or audio data, performing modeling operations, including physics operations, and performing data transformations.

In at least one embodiment, processing array 1612 is configured to perform parallel graphics processing operations. In at least one embodiment, processing array 1612 can include additional logic to support execution of such graphics processing operations, including, but not limited to texture sampling logic to perform texture operations, as well as tessellation logic and other vertex processing logic. In at least one embodiment, processing array 1612 can be configured to execute graphics processing related shader programs such as, but not limited to vertex shaders, tessellation shaders, geometry shaders, and pixel shaders. In at least one embodiment, parallel processing unit 1602 can transfer data from system memory via I/O unit 1604 for processing. In at least one embodiment, during processing, transferred data can be stored to on-chip memory (e.g., a parallel processor memory 1622) during processing, then written back to system memory.

In at least one embodiment, when parallel processing unit 1602 is used to perform graphics processing, scheduler 1610 can be configured to divide a processing workload into approximately equal sized tasks, to better enable distribution of graphics processing operations to multiple clusters 1614A-1614N of processing array 1612. In at least one embodiment, portions of processing array 1612 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1614A-1614N may be stored in buffers to allow intermediate data to be transmitted between clusters 1614A-1614N for further processing.

In at least one embodiment, processing array 1612 can receive processing tasks to be executed via scheduler 1610, which receives commands defining processing tasks from front end 1608. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1610 may be configured to fetch indices corresponding to tasks or may receive indices from front end 1608. In at least one embodiment, front end 1608 can be configured to ensure processing array 1612 is configured to a valid state before a workload specified by incoming command buffers (e.g., batch-buffers, push buffers, etc.) is initiated.

In at least one embodiment, each of one or more instances of parallel processing unit 1602 can couple with parallel processor memory 1622. In at least one embodiment, parallel processor memory 1622 can be accessed via memory crossbar 1616, which can receive memory requests from processing array 1612 as well as I/O unit 1604. In at least one embodiment, memory crossbar 1616 can access parallel processor memory 1622 via a memory interface 1618. In at least one embodiment, memory interface 1618 can include multiple partition units (e.g., a partition unit 1620A, partition unit 1620B, through partition unit 1620N) that can each couple to a portion (e.g., memory unit) of parallel processor memory 1622. In at least one embodiment, a number of partition units 1620A-1620N is configured to be equal to a number of memory units, such that a first partition unit 1620A has a corresponding first memory unit 1624A, a second partition unit 1620B has a corresponding memory unit 1624B, and an Nth partition unit 1620N has a corresponding Nth memory unit 1624N. In at least one embodiment, a number of partition units 1620A-1620N may not be equal to a number of memory devices.

In at least one embodiment, memory units 1624A-1624N can include various types of memory devices, including DRAM or graphics random access memory, such as SGRAM, including GDDR memory. In at least one embodiment, memory units 1624A-1624N may also include 3D stacked memory, including but not limited to high bandwidth memory ("HBM"). In at least one embodiment, render targets, such as frame buffers or texture maps may be stored across memory units 1624A-1624N, allowing partition units 1620A-1620N to write portions of each render target in parallel to efficiently use available bandwidth of parallel processor memory 1622. In at least one embodiment, a local instance of parallel processor memory 1622 may be excluded in favor of a unified memory design that utilizes system memory in conjunction with local cache memory.

In at least one embodiment, any one of clusters 1614A-1614N of processing array 1612 can process data that will be written to any of memory units 1624A-1624N within parallel processor memory 1622. In at least one embodiment, memory crossbar 1616 can be configured to transfer an output of each cluster 1614A-1614N to any partition unit 1620A-1620N or to another cluster 1614A-1614N, which can perform additional processing operations on an output. In at least one embodiment, each cluster 1614A-1614N can communicate with memory interface 1618 through memory crossbar 1616 to read from or write to various external memory devices. In at least one embodiment, memory crossbar 1616 has a connection to memory interface 1618 to communicate with I/O unit 1604, as well as a connection to a local instance of parallel processor memory 1622, enabling processing units within different clusters 1614A-1614N to communicate with system memory or other memory that is not local to parallel processing unit 1602. In at least one embodiment, memory crossbar 1616 can use virtual channels to separate traffic streams between clusters 1614A-1614N and partition units 1620A-1620N.

In at least one embodiment, multiple instances of parallel processing unit 1602 can be provided on a single add-in card, or multiple add-in cards can be interconnected. In at least one embodiment, different instances of parallel processing unit 1602 can be configured to interoperate even if different instances have different numbers of processing cores, different amounts of local parallel processor memory, and/or other configuration differences. For example, in at least one embodiment, some instances of parallel processing unit 1602 can include higher precision floating point units relative to other instances. In at least one embodiment, systems incorporating one or more instances of parallel processing unit 1602 or parallel processor 1600 can be implemented in a variety of configurations and form factors, including but not limited to desktop, laptop, or handheld personal computers, servers, workstations, game consoles, and/or embedded systems.

In at least one embodiment, one or more components of parallel processor 1600 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions.

In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 16B:
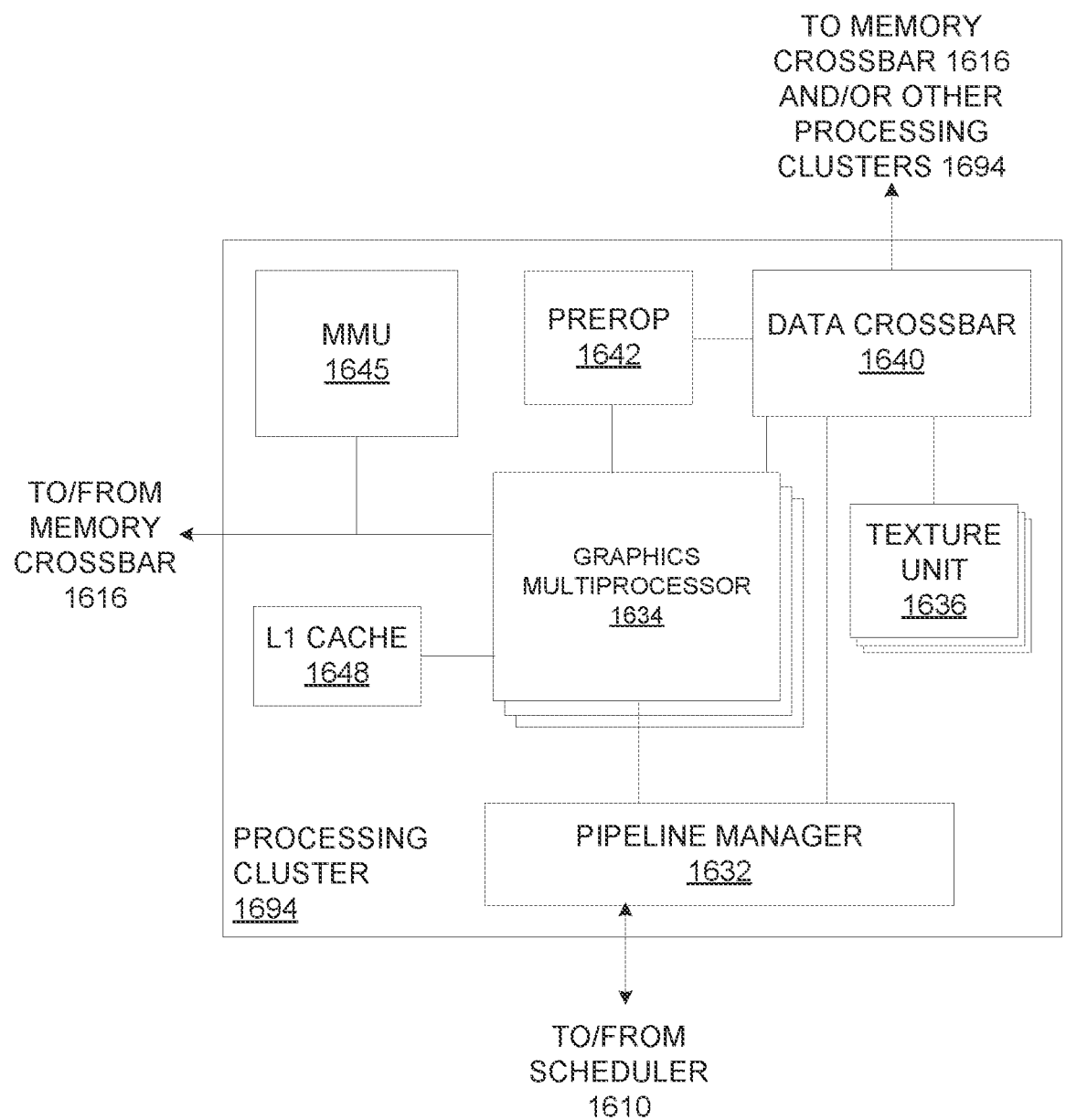
FIG. 16B illustrates a processing cluster, in accordance with at least one embodiment.

FIG. 16B illustrates a processing cluster 1694, in accordance with at least one embodiment. In at least one embodiment, processing cluster 1694 is included within a parallel processing unit. In at least one embodiment, processing cluster 1694 is one of processing clusters 1614A-1614N of FIG. 16. In at least one embodiment, processing cluster 1694 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 1694.

In at least one embodiment, operation of processing cluster 1694 can be controlled via a pipeline manager 1632 that distributes processing tasks to SIMT parallel processors. In at least one embodiment, pipeline manager 1632 receives instructions from scheduler 1610 of FIG. 16 and manages execution of those instructions via a graphics multiprocessor 1634 and/or a texture unit 1636. In at least one embodiment, graphics multiprocessor 1634 is an exemplary instance of a SIMT parallel processor. However, in at least one embodiment, various types of SIMT parallel processors of differing architectures may be included within processing cluster 1694. In at least one embodiment, one or more instances of graphics multiprocessor 1634 can be included within processing cluster 1694. In at least one embodiment, graphics multiprocessor 1634 can process data and a data crossbar 1640 can be used to distribute processed data to one of multiple possible destinations, including other shader units. In at least one embodiment, pipeline manager 1632 can facilitate distribution of processed data by specifying destinations for processed data to be distributed via data crossbar 1640.

In at least one embodiment, each graphics multiprocessor 1634 within processing cluster 1694 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1694 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 1634. In at least one embodiment, a thread group may include fewer threads than a number of processing engines within graphics multiprocessor 1634. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 1634. In at least one embodiment, when a thread group includes more threads than the number of processing engines within graphics multiprocessor 1634, processing can be performed over consecutive clock cycles. In at least one embodiment, multiple thread groups can be executed concurrently on graphics multiprocessor 1634.

In at least one embodiment, graphics multiprocessor 1634 includes an internal cache memory to perform load and store operations. In at least one embodiment, graphics multiprocessor 1634 can forego an internal cache and use a cache memory (e.g., L1 cache 1648) within processing cluster 1694. In at least one embodiment, each graphics multiprocessor 1634 also has access to Level 2 ("L2") caches within partition units (e.g., partition units 1620A-1620N of FIG. 16A) that are shared among all processing clusters 1694 and may be used to transfer data between threads. In at least one embodiment, graphics multiprocessor 1634 may also access off-chip global memory, which can include one or more of local parallel processor memory and/or system memory. In at least one embodiment, any memory external to parallel processing unit 1602 may be used as global memory. In at least one embodiment, processing cluster 1694 includes multiple instances of graphics multiprocessor 1634 that can share common instructions and data, which may be stored in L1 cache 1648.

In at least one embodiment, each processing cluster 1694 may include an MMU 1645 that is configured to map virtual addresses into physical addresses. In at least one embodiment, one or more instances of MMU 1645 may reside within memory interface 1618 of FIG. 16. In at least one embodiment, MMU 1645 includes a set of page table entries ("PTEs") used to map a virtual address to a physical address of a tile and optionally a cache line index. In at least one embodiment, MMU 1645 may include address translation lookaside buffers ("TLBs") or caches that may reside within graphics multiprocessor 1634 or L1 cache 1648 or processing cluster 1694. In at least one embodiment, a physical address is processed to distribute surface data access locality to allow efficient request interleaving among partition units.

In at least one embodiment, a cache line index may be used to determine whether a request for a cache line is a hit or miss.

In at least one embodiment, processing cluster 1694 may be configured such that each graphics multiprocessor 1634 is coupled to a texture unit 1636 for performing texture mapping operations, e.g., determining texture sample positions, reading texture data, and filtering texture data. In at least one embodiment, texture data is read from an internal texture L1 cache (not shown) or from an L1 cache within graphics multiprocessor 1634 and is fetched from an L2 cache, local parallel processor memory, or system memory, as needed. In at least one embodiment, each graphics multiprocessor 1634 outputs a processed task to data crossbar 1640 to provide the processed task to another processing cluster 1694 for further processing or to store the processed task in an L2 cache, a local parallel processor memory, or a system memory via memory crossbar 1616. In at least one embodiment, a pre-raster operations unit ("preROP") 1642 is configured to receive data from graphics multiprocessor 1634, direct data to ROP units, which may be located with partition units as described herein (e.g., partition units 1620A-1620N of FIG. 16). In at least one embodiment, PreROP 1642 can perform optimizations for color blending, organize pixel color data, and perform address translations.

Figure 16C:
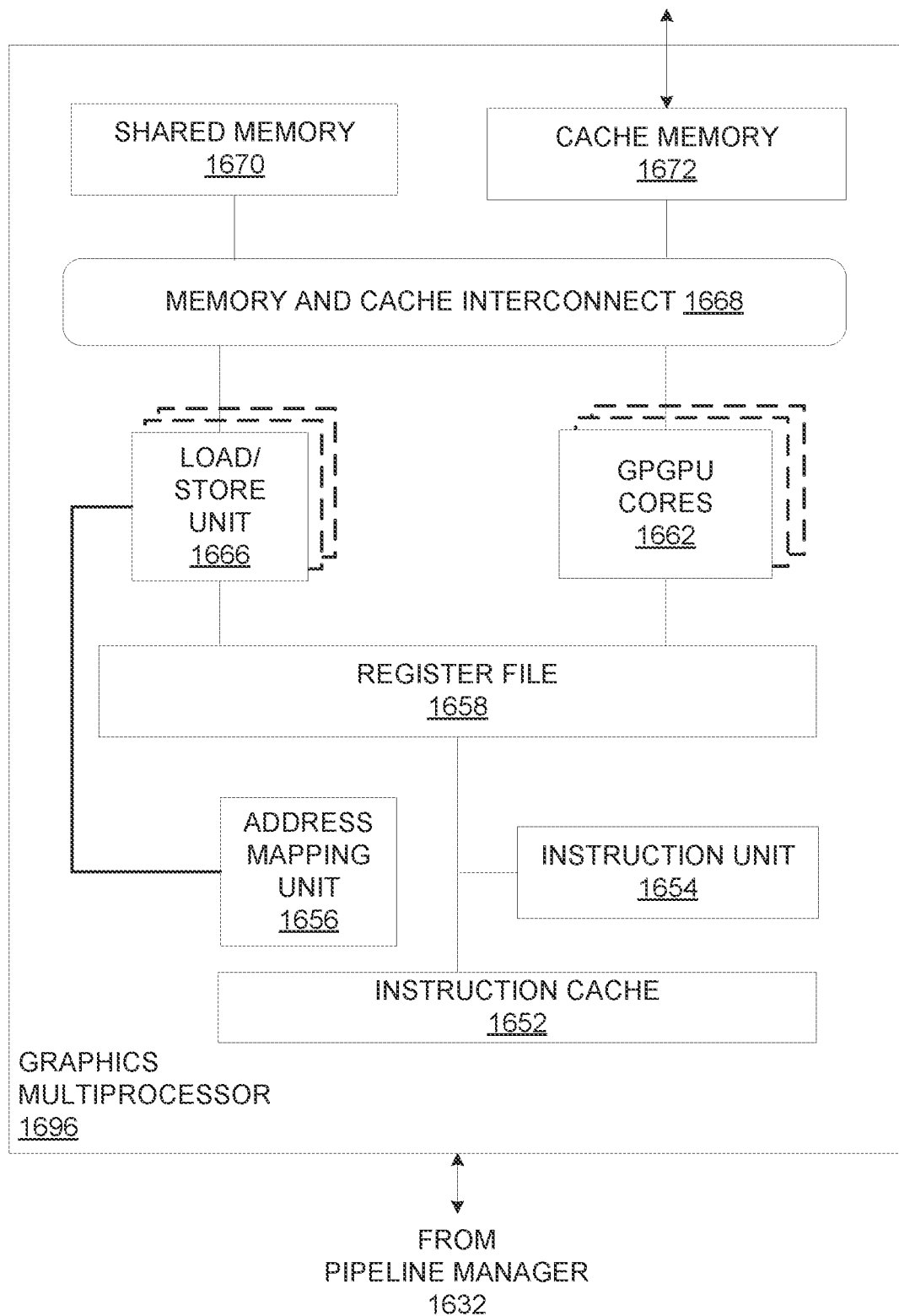
FIG. 16C illustrates a graphics multiprocessor, in accordance with at least one embodiment.

FIG. 16C illustrates a graphics multiprocessor 1696, in accordance with at least one embodiment. In at least one embodiment, graphics multiprocessor 1696 is graphics multiprocessor 1634 of FIG. 16B. In at least one embodiment, graphics multiprocessor 1696 couples with pipeline manager 1632 of processing cluster 1694. In at least one embodiment, graphics multiprocessor 1696 has an execution pipeline including but not limited to an instruction cache 1652, an instruction unit 1654, an address mapping unit 1656, a register file 1658, one or more GPGPU cores 1662, and one or more LSUs 1666. GPGPU cores 1662 and LSUs 1666 are coupled with cache memory 1672 and shared memory 1670 via a memory and cache interconnect 1668.

In at least one embodiment, instruction cache 1652 receives a stream of instructions to execute from pipeline manager 1632. In at least one embodiment, instructions are cached in instruction cache 1652 and dispatched for execution by instruction unit 1654. In at least one embodiment, instruction unit 1654 can dispatch instructions as thread groups (e.g., warps), with each thread of a thread group assigned to a different execution unit within GPGPU core 1662. In at least one embodiment, an instruction can access any of a local, shared, or global address space by specifying an address within a unified address space. In at least one embodiment, address mapping unit 1656 can be used to translate addresses in a unified address space into a distinct memory address that can be accessed by LSUs 1666.

In at least one embodiment, register file 1658 provides a set of registers for functional units of graphics multiprocessor 1696. In at least one embodiment, register file 1658 provides temporary storage for operands connected to data paths of functional units (e.g., GPGPU cores 1662, LSUs 1666) of graphics multiprocessor 1696. In at least one embodiment, register file 1658 is divided between each of functional units such that each functional unit is allocated a dedicated portion of register file 1658. In at least one embodiment, register file 1658 is divided between different thread groups being executed by graphics multiprocessor 1696.

In at least one embodiment, GPGPU cores 1662 can each include FPUs and/or integer ALUs that are used to execute instructions of graphics multiprocessor 1696. GPGPU cores 1662 can be similar in architecture or can differ in architecture. In at least one embodiment, a first portion of GPGPU cores 1662 include a single precision FPU and an integer ALU while a second portion of GPGPU cores 1662 include a double precision FPU. In at least one embodiment, FPUs can implement IEEE 754-2008 standard for floating point arithmetic or enable variable precision floating point arithmetic. In at least one embodiment, graphics multiprocessor 1696 can additionally include one or more fixed function or special function units to perform specific functions such as copy rectangle or pixel blending operations. In at least one embodiment one or more of GPGPU cores 1662 can also include fixed or special function logic.

In at least one embodiment, GPGPU cores 1662 include SIMD logic capable of performing a single instruction on multiple sets of data. In at least one embodiment GPGPU cores 1662 can physically execute SIMD4, SIMD8, and SIMD16 instructions and logically execute SIMD1, SIMD2, and SIMD32 instructions. In at least one embodiment, SIMD instructions for GPGPU cores 1662 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 1668 is an interconnect network that connects each functional unit of graphics multiprocessor 1696 to register file 1658 and to shared memory 1670. In at least one embodiment, memory and cache interconnect 1668 is a crossbar interconnect that allows LSU 1666 to implement load and store operations between shared memory 1670 and register file 1658. In at least one embodiment, register file 1658 can operate at a same frequency as GPGPU cores 1662, thus data transfer between GPGPU cores 1662 and register file 1658 is very low latency. In at least one embodiment, shared memory 1670 can be used to enable communication between threads that execute on functional units within graphics multiprocessor 1696. In at least one embodiment, cache memory 1672 can be used as a data cache for example, to cache texture data communicated between functional units and texture unit 1636. In at least one embodiment, shared memory 1670 can also be used as a program managed cached. In at least one embodiment, threads executing on GPGPU cores 1662 can programmatically store data within shared memory in addition to automatically cached data that is stored within cache memory 1672.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

In at least one embodiment, one or more components in the foregoing can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 17:
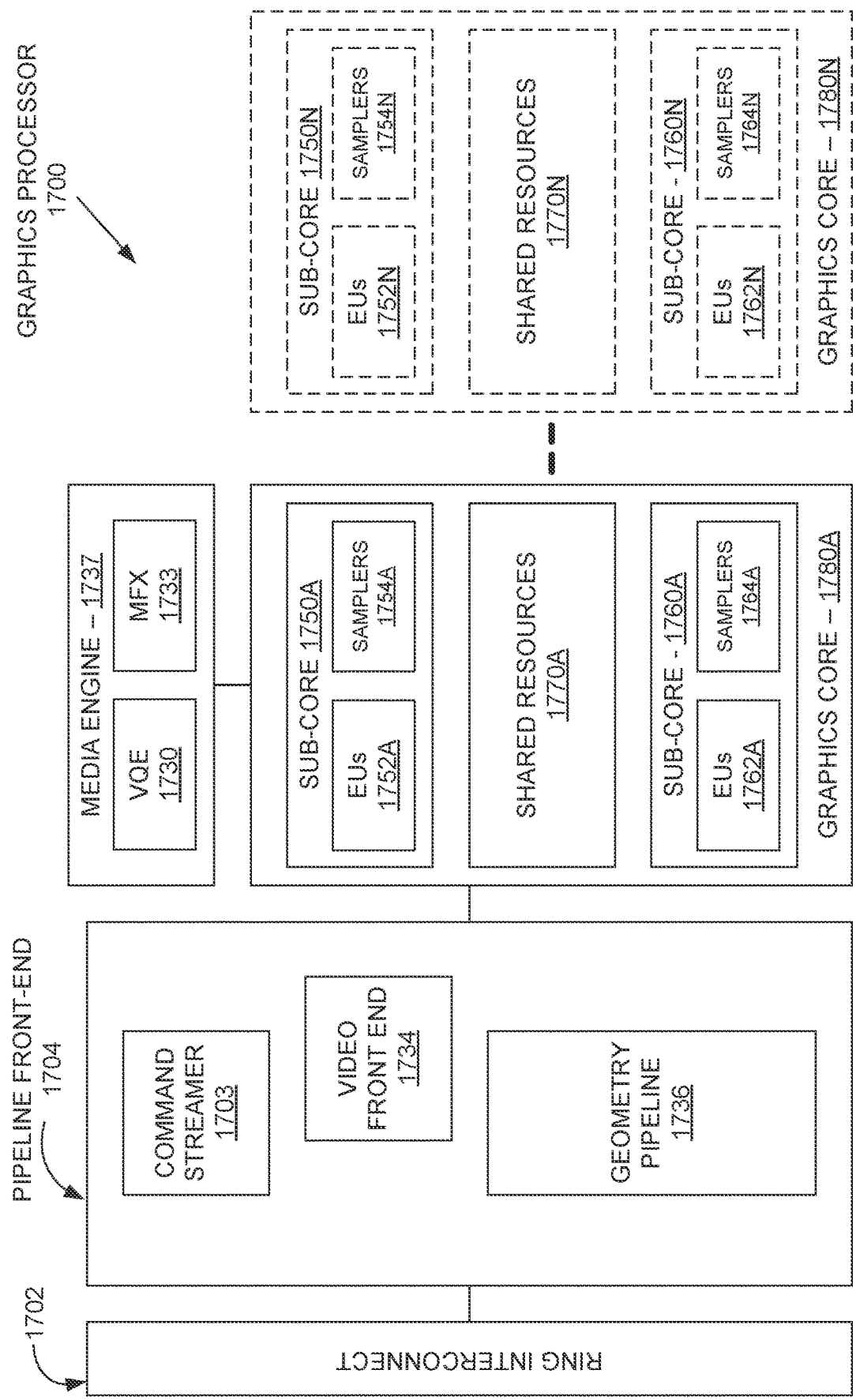
FIG. 17 illustrates a graphics processor, in accordance with at least one embodiment.

FIG. 17 illustrates a graphics processor 1700, in accordance with at least one embodiment. In at least one embodiment, graphics processor 1700 includes a ring interconnect 1702, a pipeline front-end 1704, a media engine 1737, and graphics cores 1780A-1780N. In at least one embodiment, ring interconnect 1702 couples graphics processor 1700 to other processing units, including other graphics processors or one or more general-purpose processor cores. In at least one embodiment, graphics processor 1700 is one of many processors integrated within a multi-core processing system.

In at least one embodiment, graphics processor 1700 receives batches of commands via ring interconnect 1702. In at least one embodiment, incoming commands are interpreted by a command streamer 1703 in pipeline front-end 1704. In at least one embodiment, graphics processor 1700 includes scalable execution logic to perform 3D geometry processing and media processing via graphics core(s) 1780A-1780N. In at least one embodiment, for 3D geometry processing commands, command streamer 1703 supplies commands to geometry pipeline 1736. In at least one embodiment, for at least some media processing commands, command streamer 1703 supplies commands to a video front end 1734, which couples with a media engine 1737. In at least one embodiment, media engine 1737 includes a Video Quality Engine ("VQE") 1730 for video and image post-processing and a multi-format encode/decode ("MFX") engine 1733 to provide hardware-accelerated media data encode and decode. In at least one embodiment, geometry pipeline 1736 and media engine 1737 each generate execution threads for thread execution resources provided by at least one graphics core 1780A.

In at least one embodiment, graphics processor 1700 includes scalable thread execution resources featuring modular graphics cores 1780A-1780N (sometimes referred to as core slices), each having multiple sub-cores 1750A-550N, 1760A-1760N (sometimes referred to as core sub-slices). In at least one embodiment, graphics processor 1700 can have any number of graphics cores 1780A through 1780N. In at least one embodiment, graphics processor 1700 includes a graphics core 1780A having at least a first sub-core 1750A and a second sub-core 1760A. In at least one embodiment, graphics processor 1700 is a low power processor with a single sub-core (e.g., sub-core 1750A). In at least one embodiment, graphics processor 1700 includes multiple graphics cores 1780A-1780N, each including a set of first sub-cores 1750A-1750N and a set of second sub-cores 1760A-1760N. In at least one embodiment, each sub-core in first sub-cores 1750A-1750N includes at least a first set of execution units ("EUs") 1752A-1752N and media/texture samplers 1754A-1754N. In at least one embodiment, each sub-core in second sub-cores 1760A-1760N includes at least a second set of execution units 1762A-1762N and samplers 1764A-1764N. In at least one embodiment, each sub-core 1750A-1750N, 1760A-1760N shares a set of shared resources 1770A-1770N. In at least one embodiment, shared resources 1770 include shared cache memory and pixel operation logic.

In at least one embodiment, one or more components of graphics processor 1700 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 18:
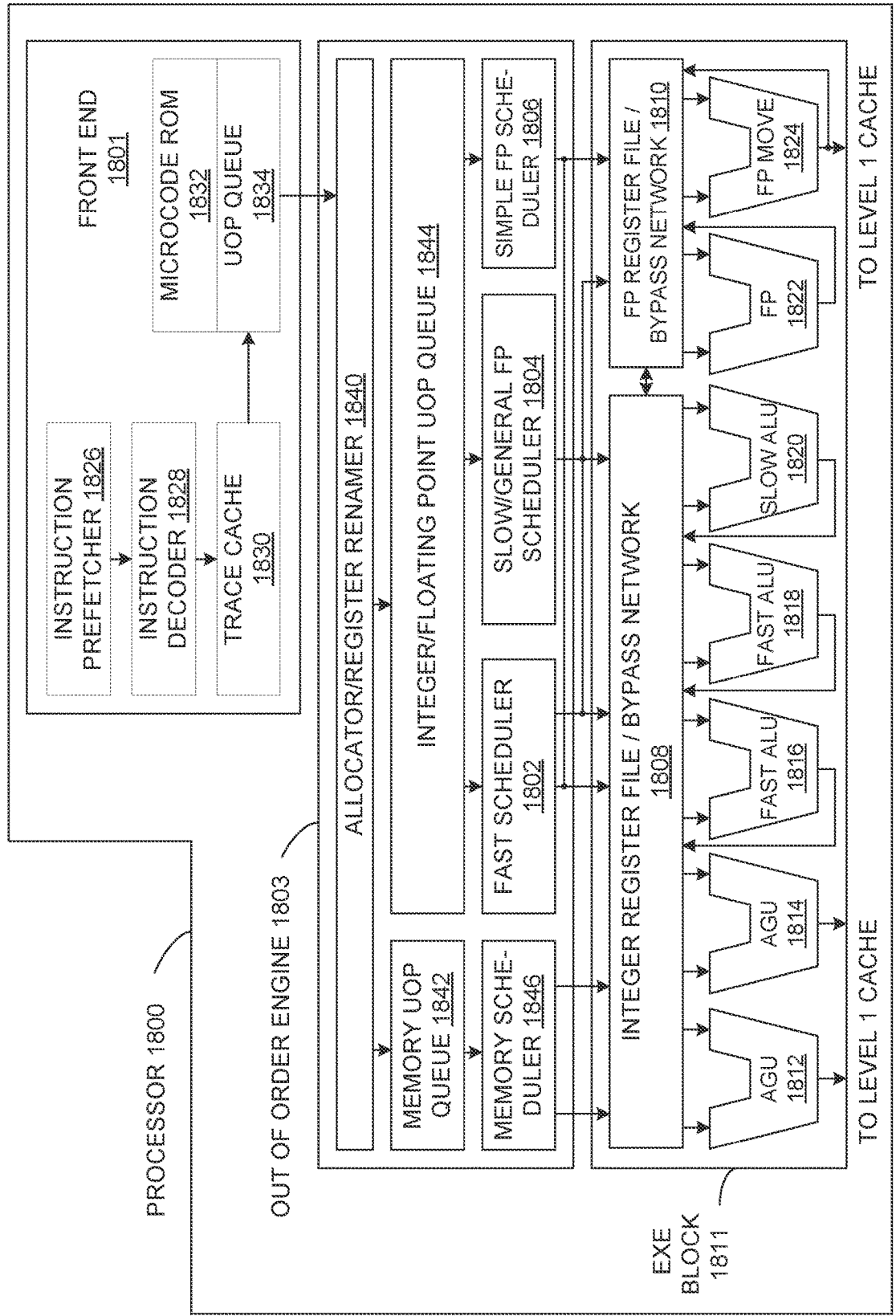
FIG. 18 illustrates a processor, in accordance with at least one embodiment.

FIG. 18 illustrates a processor 1800, in accordance with at least one embodiment. In at least one embodiment, processor 1800 may include, without limitation, logic circuits to perform instructions. In at least one embodiment, processor 1800 may perform instructions, including x86 instructions, ARM instructions, specialized instructions for ASICs, etc. In at least one embodiment, processor 1810 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 1810 may perform instructions to accelerate CUDA programs.

In at least one embodiment, processor 1800 includes an in-order front end ("front end") 1801 to fetch instructions to be executed and prepare instructions to be used later in processor pipeline. In at least one embodiment, front end 1801 may include several units. In at least one embodiment, an instruction prefetcher 1826 fetches instructions from memory and feeds instructions to an instruction decoder 1828 which in turn decodes or interprets instructions. For example, in at least one embodiment, instruction decoder 1828 decodes a received instruction into one or more operations called "micro-instructions" or "micro-operations" (also called "micro ops" or "uops") for execution. In at least one embodiment, instruction decoder 1828 parses instruction into an opcode and corresponding data and control fields that may be used by micro-architecture to perform operations. In at least one embodiment, a trace cache 1830 may assemble decoded uops into program ordered sequences or traces in a uop queue 1834 for execution. In at least one embodiment, when trace cache 1830 encounters a complex instruction, a microcode ROM 1832 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 1828 may access microcode ROM 1832 to perform instruction. In at least one embodiment, an instruction may be decoded into a small number of micro-ops for processing at instruction decoder 1828. In at least one embodiment, an instruction may be stored within microcode ROM 1832 should a number of micro-ops be needed to accomplish operation. In at least one embodiment, trace cache 1830 refers to an entry point programmable logic array ("PLA") to determine a correct micro-instruction pointer for reading microcode sequences to complete one or more instructions from microcode ROM 1832. In at least one embodiment, after microcode ROM 1832 finishes sequencing micro-ops for an instruction, front end 1801 of machine may resume fetching micro-ops from trace cache 1830.

In at least one embodiment, out-of-order execution engine ("out of order engine") 1803 may prepare instructions for execution. In at least one embodiment, out-of-order execution logic has a number of buffers to smooth out and re-order the flow of instructions to optimize performance as they go down a pipeline and get scheduled for execution. Out-of-order execution engine 1803 includes, without limitation, an allocator/register renamer 1840, a memory uop queue 1842, an integer/floating point uop queue 1844, a memory scheduler 1846, a fast scheduler 1802, a slow/general floating point scheduler ("slow/general FP scheduler") 1804, and a simple floating point scheduler ("simple FP scheduler") 1806. In at least one embodiment, fast schedule 1802, slow/general floating point scheduler 1804, and simple floating point scheduler 1806 are also collectively referred to herein as "uop schedulers 1802, 1804, 1806." Allocator/register renamer 1840 allocates machine buffers and resources that each uop needs in order to execute. In at least one embodiment, allocator/register renamer 1840 renames logic registers onto entries in a register file. In at least one embodiment, allocator/register renamer 1840 also allocates an entry for each uop in one of two uop queues, memory uop queue 1842 for memory operations and integer/floating point uop queue 1844 for non-memory operations, in front of memory scheduler 1846 and uop schedulers 1802, 1804, 1806. In at least one embodiment, uop schedulers 1802, 1804, 1806, determine when a uop is ready to execute based on readiness of their dependent input register operand sources and availability of execution resources uops need to complete their operation. In at least one embodiment, fast scheduler 1802 of at least one embodiment may schedule on each half of main clock cycle while slow/general floating point scheduler 1804 and simple floating point scheduler 1806 may schedule once per main processor clock cycle. In at least one embodiment, uop schedulers 1802, 1804, 1806 arbitrate for dispatch ports to schedule uops for execution.

In at least one embodiment, execution block 1811 includes, without limitation, an integer register file/bypass network 1808, a floating point register file/bypass network ("FP register file/bypass network") 1810, address generation units ("AGUs") 1812 and 1814, fast ALUs 1816 and 1818, a slow ALU 1820, a floating point ALU ("FP") 1822, and a floating point move unit ("FP move") 1824. In at least one embodiment, integer register file/bypass network 1808 and floating point register file/bypass network 1810 are also referred to herein as "register files 1808, 1810." In at least one embodiment, AGUSs 1812 and 1814, fast ALUs 1816 and 1818, slow ALU 1820, floating point ALU 1822, and floating point move unit 1824 are also referred to herein as "execution units 1812, 1814, 1816, 1818, 1820, 1822, and 1824." In at least one embodiment, an execution block may include, without limitation, any number (including zero) and type of register files, bypass networks, address generation units, and execution units, in any combination.

In at least one embodiment, register files 1808, 1810 may be arranged between uop schedulers 1802, 1804, 1806, and execution units 1812, 1814, 1816, 1818, 1820, 1822, and 1824. In at least one embodiment, integer register file/bypass network 1808 performs integer operations. In at least one embodiment, floating point register file/bypass network 1810 performs floating point operations. In at least one embodiment, each of register files 1808, 1810 may include, without limitation, a bypass network that may bypass or forward just completed results that have not yet been written into register file to new dependent uops. In at least one embodiment, register files 1808, 1810 may communicate data with each other. In at least one embodiment, integer register file/bypass network 1808 may include, without limitation, two separate register files, one register file for low-order thirty-two bits of data and a second register file for high order thirty-two bits of data. In at least one embodiment, floating point register file/bypass network 1810 may include, without limitation, 128-bit wide entries because floating point instructions typically have operands from 64 to 128 bits in width.

In at least one embodiment, execution units 1812, 1814, 1816, 1818, 1820, 1822, 1824 may execute instructions. In at least one embodiment, register files 1808, 1810 store integer and floating point data operand values that micro-instructions need to execute. In at least one embodiment, processor 1800 may include, without limitation, any number and combination of execution units 1812, 1814, 1816, 1818, 1820, 1822, 1824. In at least one embodiment, floating point ALU 1822 and floating point move unit 1824 may execute floating point, MMX, SIMD, AVX and SSE, or other operations. In at least one embodiment, floating point ALU 1822 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 1816, 1818. In at least one embodiment, fast ALUS 1816, 1818 may execute fast operations with an effective latency of half a clock cycle. In at least one embodiment, most complex integer operations go to slow ALU 1820 as slow ALU 1820 may include, without limitation, integer execution hardware for long-latency type of operations, such as a multiplier, shifts, flag logic, and branch processing. In at least one embodiment, memory load/store operations may be executed by AGUs 1812, 1814. In at least one embodiment, fast ALU 1816, fast ALU 1818, and slow ALU 1820 may perform integer operations on 64-bit data operands. In at least one embodiment, fast ALU 1816, fast ALU 1818, and slow ALU 1820 may be implemented to support a variety of data bit sizes including sixteen, thirty-two, 128, 256, etc. In at least one embodiment, floating point ALU 1822 and floating point move unit 1824 may be implemented to support a range of operands having bits of various widths. In at least one embodiment, floating point ALU 1822 and floating point move unit 1824 may operate on 128-bit wide packed data operands in conjunction with SIMD and multimedia instructions.

In at least one embodiment, uop schedulers 1802, 1804, 1806 dispatch dependent operations before parent load has finished executing. In at least one embodiment, as uops may be speculatively scheduled and executed in processor 1800, processor 1800 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 19:
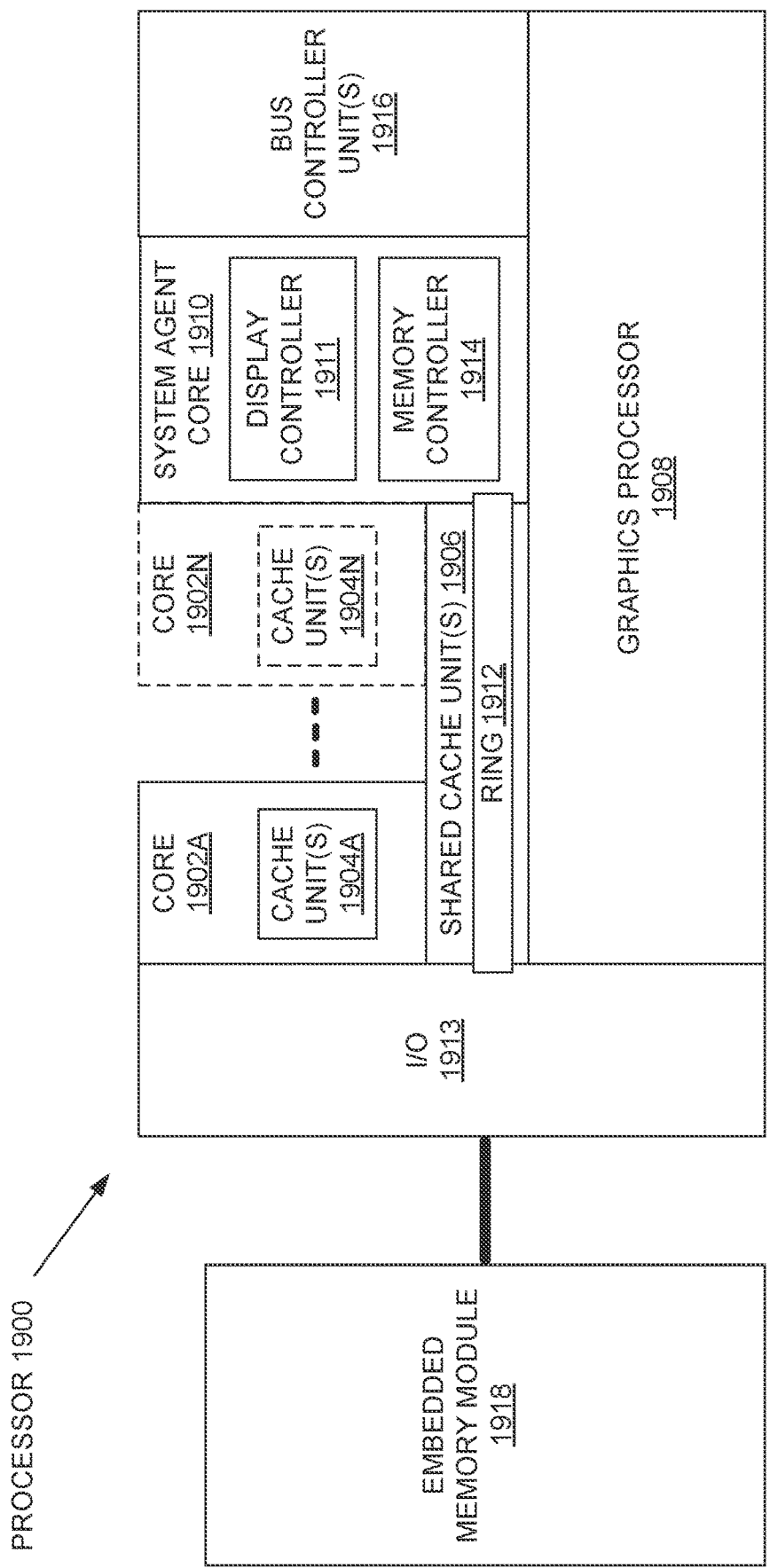
FIG. 19 illustrates a processor, in accordance with at least one embodiment.

FIG. 19 illustrates a processor 1900, in accordance with at least one embodiment. In at least one embodiment, processor 1900 includes, without limitation, one or more processor cores ("cores") 1902A-1902N, an integrated memory controller 1914, and an integrated graphics processor 1908. In at least one embodiment, processor 1900 can include additional cores up to and including additional processor core 1902N represented by dashed lined boxes. In at least one embodiment, each of processor cores 1902A-1902N includes one or more internal cache units 1904A-1904N. In at least one embodiment, each processor core also has access to one or more shared cached units 1906. In at least one embodiment, one or more processor cores 1902A-1902N are referred to as one or more compute units or computing units.

In at least one embodiment, internal cache units 1904A-1904N and shared cache units 1906 represent a cache memory hierarchy within processor 1900. In at least one embodiment, cache memory units 1904A-1904N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 1906 and 1904A-1904N.

In at least one embodiment, processor 1900 may also include a set of one or more bus controller units 1916 and a system agent core 1910. In at least one embodiment, one or more bus controller units 1916 manage a set of peripheral buses, such as one or more PCI or PCI express buses. In at least one embodiment, system agent core 1910 provides management functionality for various processor components. In at least one embodiment, system agent core 1910 includes one or more integrated memory controllers 1914 to manage access to various external memory devices (not shown).

In at least one embodiment, one or more of processor cores 1902A-1902N include support for simultaneous multi-threading. In at least one embodiment, system agent core 1910 includes components for coordinating and operating processor cores 1902A-1902N during multi-threaded processing. In at least one embodiment, system agent core 1910 may additionally include a power control unit ("PCU"), which includes logic and components to regulate one or more power states of processor cores 1902A-1902N and graphics processor 1908.

In at least one embodiment, processor 1900 additionally includes graphics processor 1908 to execute graphics processing operations. In at least one embodiment, graphics processor 1908 couples with shared cache units 1906, and system agent core 1910, including one or more integrated memory controllers 1914. In at least one embodiment, system agent core 1910 also includes a display controller 1911 to drive graphics processor output to one or more coupled displays. In at least one embodiment, display controller 1911 may also be a separate module coupled with graphics processor 1908 via at least one interconnect, or may be integrated within graphics processor 1908.

In at least one embodiment, a ring based interconnect unit 1912 is used to couple internal components of processor 1900. In at least one embodiment, an alternative interconnect unit may be used, such as a point-to-point interconnect, a switched interconnect, or other techniques. In at least one embodiment, graphics processor 1908 couples with ring interconnect 1912 via an I/O link 1913.

In at least one embodiment, I/O link 1913 represents at least one of multiple varieties of I/O interconnects, including an on package I/O interconnect which facilitates communication between various processor components and a high-performance embedded memory module 1918, such as an eDRAM module. In at least one embodiment, each of processor cores 1902A-1902N and graphics processor 1908 use embedded memory modules 1918 as a shared LLC.

In at least one embodiment, processor cores 1902A-1902N are homogeneous cores executing a common instruction set architecture. In at least one embodiment, processor cores 1902A-1902N are heterogeneous in terms of ISA, where one or more of processor cores 1902A-1902N execute a common instruction set, while one or more other cores of processor cores 1902A-19-02N executes a subset of a common instruction set or a different instruction set. In at least one embodiment, processor cores 1902A-1902N are heterogeneous in terms of microarchitecture, where one or more cores having a relatively higher power consumption couple with one or more cores having a lower power consumption. In at least one embodiment, processor 1900 can be implemented on one or more chips or as an SoC integrated circuit.

In at least one embodiment, one or more components of processors 1700 and/or 1800 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 20:
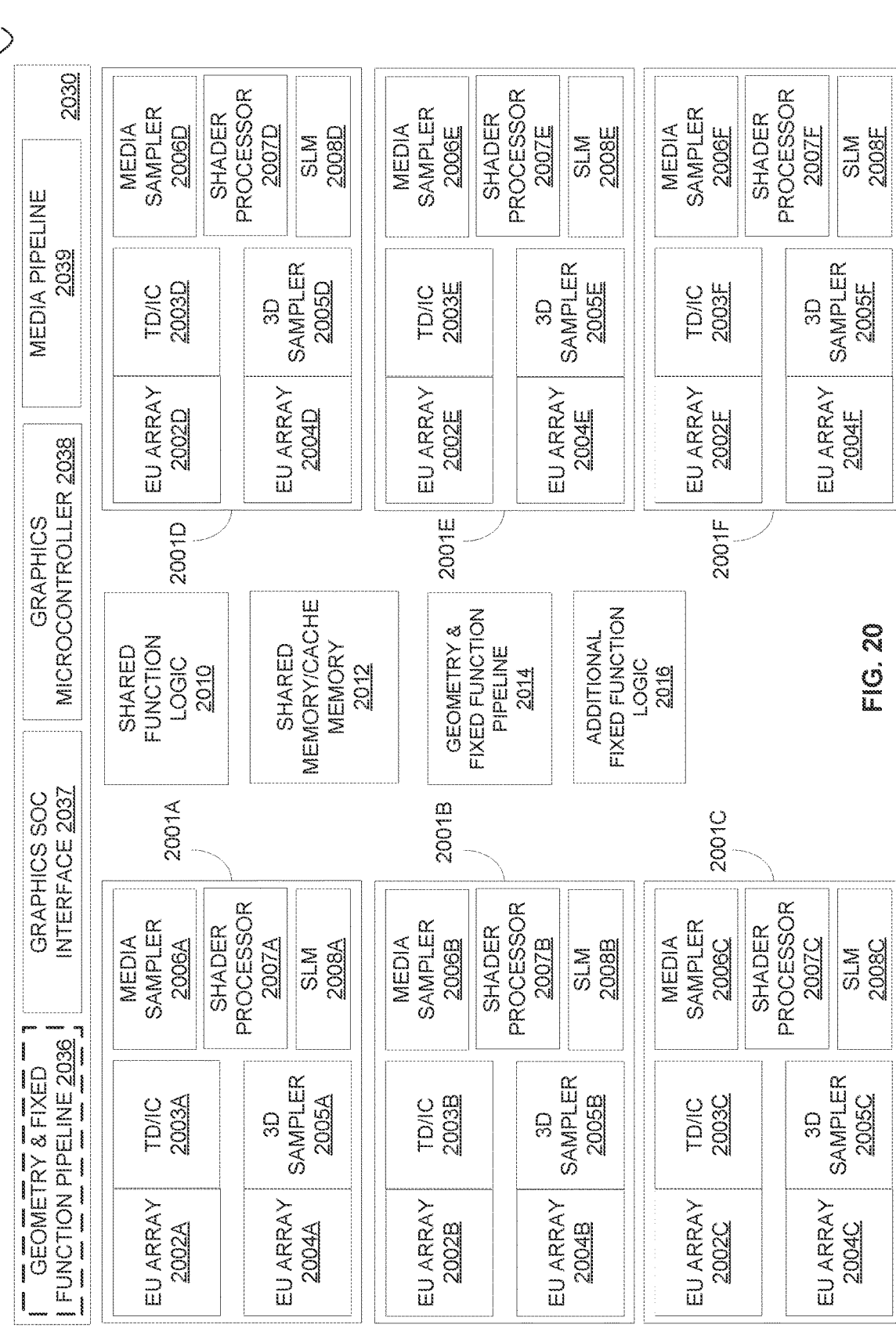
FIG. 20 illustrates a graphics processor core, in accordance with at least one embodiment.

FIG. 20 illustrates a graphics processor core 2000, in accordance with at least one embodiment described. In at least one embodiment, graphics processor core 2000 is included within a graphics core array. In at least one embodiment, graphics processor core 2000, sometimes referred to as a core slice, can be one or multiple graphics cores within a modular graphics processor. In at least one embodiment, graphics processor core 2000 is exemplary of one graphics core slice, and a graphics processor as described herein may include multiple graphics core slices based on target power and performance envelopes. In at least one embodiment, each graphics core 2000 can include a fixed function block 2030 coupled with multiple sub-cores 2001A-2001F, also referred to as sub-slices, that include modular blocks of general-purpose and fixed function logic.

In at least one embodiment, fixed function block 2030 includes a geometry/fixed function pipeline 2036 that can be shared by all sub-cores in graphics processor 2000, for example, in lower performance and/or lower power graphics processor implementations. In at least one embodiment, geometry/fixed function pipeline 2036 includes a 3D fixed function pipeline, a video front-end unit, a thread spawner and thread dispatcher, and a unified return buffer manager, which manages unified return buffers.

In at least one embodiment, fixed function block 2030 also includes a graphics SoC interface 2037, a graphics microcontroller 2038, and a media pipeline 2039. Graphics SoC interface 2037 provides an interface between graphics core 2000 and other processor cores within an SoC integrated circuit. In at least one embodiment, graphics microcontroller 2038 is a programmable sub-processor that is configurable to manage various functions of graphics processor 2000, including thread dispatch, scheduling, and pre-emption. In at least one embodiment, media pipeline 2039 includes logic to facilitate decoding, encoding, pre-processing, and/or post-processing of multimedia data, including image and video data. In at least one embodiment, media pipeline 2039 implements media operations via requests to compute or sampling logic within sub-cores 2001-2001F.

In at least one embodiment, SoC interface 2037 enables graphics core 2000 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2037 can also enable communication with fixed function devices within an SoC, such as camera imaging pipelines, and enables use of and/or implements global memory atomics that may be shared between graphics core 2000 and CPUs within an SoC. In at least one embodiment, SoC interface 2037 can also implement power management controls for graphics core 2000 and enable an interface between a clock domain of graphic core 2000 and other clock domains within an SoC. In at least one embodiment, SoC interface 2037 enables receipt of command buffers from a command streamer and global thread dispatcher that are configured to provide commands and instructions to each of one or more graphics cores within a graphics processor. In at least one embodiment, commands and instructions can be dispatched to media pipeline 2039, when media operations are to be performed, or a geometry and fixed function pipeline (e.g., geometry and fixed function pipeline 2036, geometry and fixed function pipeline 2014) when graphics processing operations are to be performed.

In at least one embodiment, graphics microcontroller 2038 can be configured to perform various scheduling and management tasks for graphics core 2000. In at least one embodiment, graphics microcontroller 2038 can perform graphics and/or compute workload scheduling on various graphics parallel engines within execution unit (EU) arrays 2002A-2002F, 2004A-2004F within sub-cores 2001A-2001F. In at least one embodiment, host software executing on a CPU core of an SoC including graphics core 2000 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2038 can also facilitate low-power or idle states for graphics core 2000, providing graphics core 2000 with an ability to save and restore registers within graphics core 2000 across low-power state transitions independently from an operating system and/or graphics driver software on a system.

In at least one embodiment, graphics core 2000 may have greater than or fewer than illustrated sub-cores 2001A-2001F, up to N modular sub-cores. For each set of N sub-cores, in at least one embodiment, graphics core 2000 can also include shared function logic 2010, shared and/or cache memory 2012, a geometry/fixed function pipeline 2014, as well as additional fixed function logic 2016 to accelerate various graphics and compute processing operations. In at least one embodiment, shared function logic 2010 can include logic units (e.g., sampler, math, and/or inter-thread communication logic) that can be shared by each N sub-cores within graphics core 2000. Shared and/or cache memory 2012 can be an LLC for N sub-cores 2001A-2001F within graphics core 2000 and can also serve as shared memory that is accessible by multiple sub-cores. In at least one embodiment, geometry/fixed function pipeline 2014 can be included instead of geometry/fixed function pipeline 2036 within fixed function block 2030 and can include same or similar logic units.

In at least one embodiment, graphics core 2000 includes additional fixed function logic 2016 that can include various fixed function acceleration logic for use by graphics core 2000. In at least one embodiment, additional fixed function logic 2016 includes an additional geometry pipeline for use in position only shading. In position-only shading, at least two geometry pipelines exist, whereas in a full geometry pipeline within geometry/fixed function pipeline 2016, 2036, and a cull pipeline, which is an additional geometry pipeline which may be included within additional fixed function logic 2016. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2016 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2016 can also include general purpose processing acceleration logic, such as fixed function matrix multiplication logic, for accelerating CUDA programs.

In at least one embodiment, each graphics sub-core 2001A-2001F includes a set of execution resources that may be used to perform graphics, media, and compute operations in response to requests by graphics pipeline, media pipeline, or shader programs. In at least one embodiment, graphics sub-cores 2001A-2001F include multiple EU arrays 2002A-2002F, 2004A-2004F, thread dispatch and inter-thread communication ("TD/IC") logic 2003A-2003F, a 3D (e.g., texture) sampler 2005A-2005F, a media sampler 2006A-2006F, a shader processor 2007A-2007F, and shared local memory ("SLM") 2008A-2008F. EU arrays 2002A-2002F, 2004A-2004F each include multiple execution units, which are GPGPUs capable of performing floating-point and integer/fixed-point logic operations in service of a graphics, media, or compute operation, including graphics, media, or compute shader programs. In at least one embodiment, TD/IC logic 2003A-2003F performs local thread dispatch and thread control operations for execution units within a sub-core and facilitate communication between threads executing on execution units of a sub-core. In at least one embodiment, 3D sampler 2005A-2005F can read texture or other 3D graphics related data into memory. In at least one embodiment, 3D sampler can read texture data differently based on a configured sample state and texture format associated with a given texture. In at least one embodiment, media sampler 2006A-2006F can perform similar read operations based on a type and format associated with media data. In at least one embodiment, each graphics sub-core 2001A-2001F can alternately include a unified 3D and media sampler. In at least one embodiment, threads executing on execution units within each of sub-cores 2001A-2001F can make use of shared local memory 2008A-2008F within each sub-core, to enable threads executing within a thread group to execute using a common pool of on-chip memory.

In at least one embodiment, one or more components of graphics core 2000 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 21:
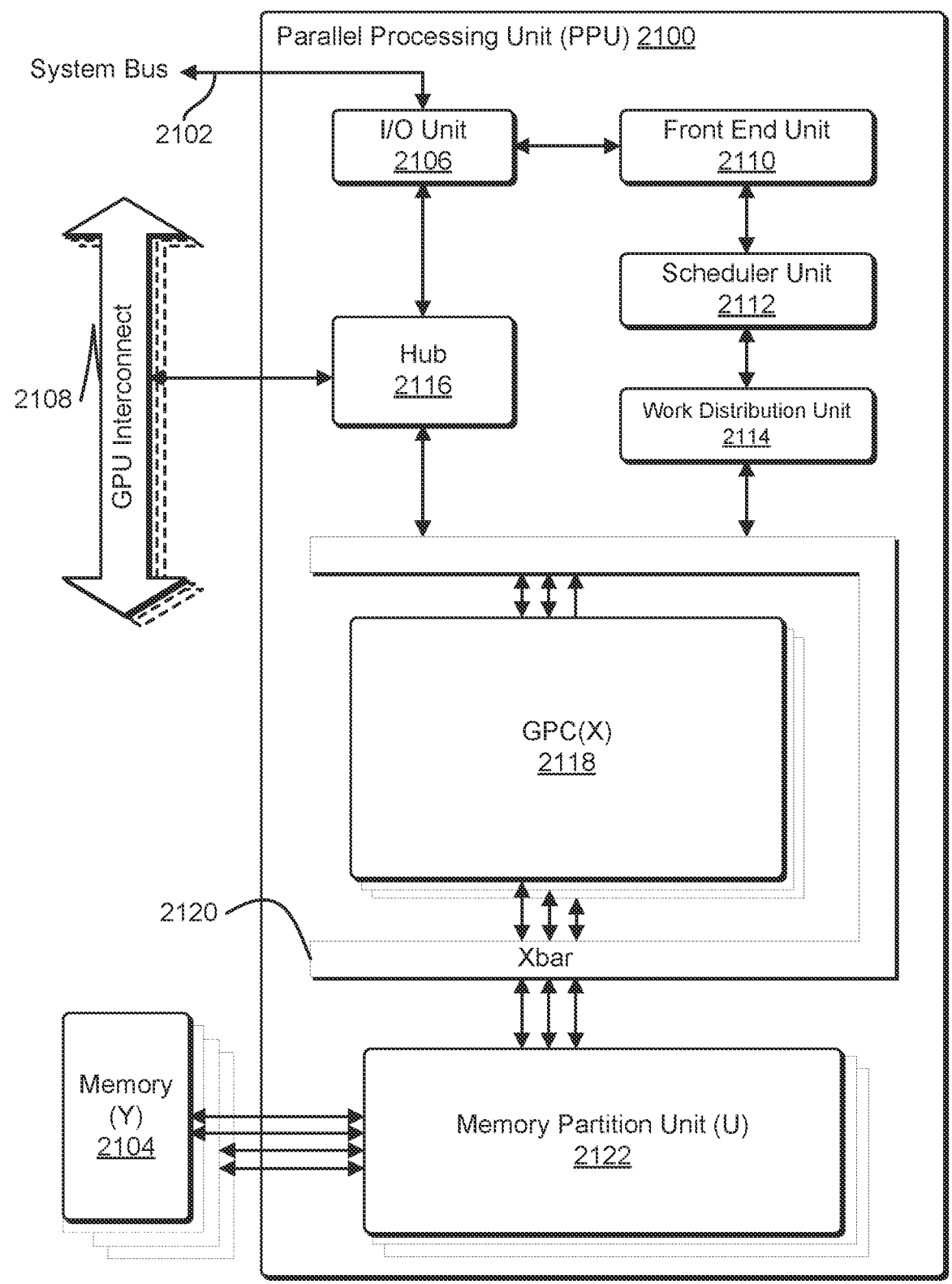
FIG. 21 illustrates a PPU, in accordance with at least one embodiment.

FIG. 21 illustrates a parallel processing unit ("PPU") 2100, in accordance with at least one embodiment. In at least one embodiment, PPU 2100 is configured with machine-readable code that, if executed by PPU 2100, causes PPU 2100 to perform some or all of processes and techniques described herein. In at least one embodiment, PPU 2100 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2100. In at least one embodiment, PPU 2100 is a GPU configured to implement a graphics rendering pipeline for processing three-dimensional ("3D") graphics data in order to generate two-dimensional ("2D") image data for display on a display device such as an LCD device. In at least one embodiment, PPU 2100 is utilized to perform computations such as linear algebra operations and machine-learning operations. FIG. 21 illustrates an example parallel processor for illustrative purposes only and should be construed as a non-limiting example of a processor architecture that may be implemented in at least one embodiment.

In at least one embodiment, one or more PPUs 2100 are configured to accelerate High Performance Computing ("HPC"), data center, and machine learning applications. In at least one embodiment, one or more PPUs 2100 are configured to accelerate CUDA programs. In at least one embodiment, PPU 2100 includes, without limitation, an I/O unit 2106, a front-end unit 2110, a scheduler unit 2112, a work distribution unit 2114, a hub 2116, a crossbar ("Xbar") 2120, one or more general processing clusters ("GPCs") 2118, and one or more partition units ("memory partition units") 2122. In at least one embodiment, PPU 2100 is connected to a host processor or other PPUs 2100 via one or more high-speed GPU interconnects ("GPU interconnects") 2108. In at least one embodiment, PPU 2100 is connected to a host processor or other peripheral devices via a system bus or interconnect 2102. In at least one embodiment, PPU 2100 is connected to a local memory comprising one or more memory devices ("memory") 2104. In at least one embodiment, memory devices 2104 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2108 may refer to a wire-based multi-lane communications link that is used by systems to scale and include one or more PPUs 2100 combined with one or more CPUs, supports cache coherence between PPUs 2100 and CPUs, and CPU mastering. In at least one embodiment, data and/or commands are transmitted by high-speed GPU interconnect 2108 through hub 2116 to/from other units of PPU 2100 such as one or more copy engines, video encoders, video decoders, power management units, and other components which may not be explicitly illustrated in FIG. 21.

In at least one embodiment, I/O unit 2106 is configured to transmit and receive communications (e.g., commands, data) from a host processor (not illustrated in FIG. 21) over system bus 2102. In at least one embodiment, I/O unit 2106 communicates with host processor directly via system bus 2102 or through one or more intermediate devices such as a memory bridge. In at least one embodiment, I/O unit 2106 may communicate with one or more other processors, such as one or more of PPUs 2100 via system bus 2102. In at least one embodiment, I/O unit 2106 implements a PCIe interface for communications over a PCIe bus. In at least one embodiment, I/O unit 2106 implements interfaces for communicating with external devices.

In at least one embodiment, I/O unit 2106 decodes packets received via system bus 2102. In at least one embodiment, at least some packets represent commands configured to cause PPU 2100 to perform various operations. In at least one embodiment, I/O unit 2106 transmits decoded commands to various other units of PPU 2100 as specified by commands. In at least one embodiment, commands are transmitted to front-end unit 2110 and/or transmitted to hub 2116 or other units of PPU 2100 such as one or more copy engines, a video encoder, a video decoder, a power management unit, etc. (not explicitly illustrated in FIG. 21). In at least one embodiment, I/O unit 2106 is configured to route communications between and among various logical units of PPU 2100.

In at least one embodiment, a program executed by host processor encodes a command stream in a buffer that provides workloads to PPU 2100 for processing. In at least one embodiment, a workload comprises instructions and data to be processed by those instructions. In at least one embodiment, buffer is a region in a memory that is accessible (e.g., read/write) by both a host processor and PPU 2100 a host interface unit may be configured to access buffer in a system memory connected to system bus 2102 via memory requests transmitted over system bus 2102 by I/O unit 2106. In at least one embodiment, a host processor writes a command stream to a buffer and then transmits a pointer to the start of the command stream to PPU 2100 such that front-end unit 2110 receives pointers to one or more command streams and manages one or more command streams, reading commands from command streams and forwarding commands to various units of PPU 2100.

In at least one embodiment, front-end unit 2110 is coupled to scheduler unit 2112 that configures various GPCs 2118 to process tasks defined by one or more command streams. In at least one embodiment, scheduler unit 2112 is configured to track state information related to various tasks managed by scheduler unit 2112 where state information may indicate which of GPCs 2118 a task is assigned to, whether task is active or inactive, a priority level associated with task, and so forth. In at least one embodiment, scheduler unit 2112 manages execution of a plurality of tasks on one or more of GPCs 2118.

In at least one embodiment, scheduler unit 2112 is coupled to work distribution unit 2114 that is configured to dispatch tasks for execution on GPCs 2118. In at least one embodiment, work distribution unit 2114 tracks a number of scheduled tasks received from scheduler unit 2112 and work distribution unit 2114 manages a pending task pool and an active task pool for each of GPCs 2118. In at least one embodiment, pending task pool comprises a number of slots (e.g., 32 slots) that contain tasks assigned to be processed by a particular GPC 2118; active task pool may comprise a number of slots (e.g., 4 slots) for tasks that are actively being processed by GPCs 2118 such that as one of GPCs 2118 completes execution of a task, that task is evicted from active task pool for GPC 2118 and one of other tasks from pending task pool is selected and scheduled for execution on GPC 2118. In at least one embodiment, if an active task is idle on GPC 2118, such as while waiting for a data dependency to be resolved, then the active task is evicted from GPC 2118 and returned to a pending task pool while another task in the pending task pool is selected and scheduled for execution on GPC 2118.

In at least one embodiment, work distribution unit 2114 communicates with one or more GPCs 2118 via XBar 2120. In at least one embodiment, XBar 2120 is an interconnect network that couples many units of PPU 2100 to other units of PPU 2100 and can be configured to couple work distribution unit 2114 to a particular GPC 2118. In at least one embodiment, one or more other units of PPU 2100 may also be connected to XBar 2120 via hub 2116.

In at least one embodiment, tasks are managed by scheduler unit 2112 and dispatched to one of GPCs 2118 by work distribution unit 2114. GPC 2118 is configured to process task and generate results. In at least one embodiment, results may be consumed by other tasks within GPC 2118, routed to a different GPC 2118 via XBar 2120, or stored in memory 2104. In at least one embodiment, results can be written to memory 2104 via partition units 2122, which implement a memory interface for reading and writing data to/from memory 2104. In at least one embodiment, results can be transmitted to another PPU 2104 or CPU via high-speed GPU interconnect 2108. In at least one embodiment, PPU 2100 includes, without limitation, a number U of partition units 2122 that is equal to number of separate and distinct memory devices 2104 coupled to PPU 2100.

In at least one embodiment, a host processor executes a driver kernel that implements an application programming interface ("API") that enables one or more applications executing on host processor to schedule operations for execution on PPU 2100. In at least one embodiment, multiple compute applications are simultaneously executed by PPU 2100 and PPU 2100 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2100 and the driver kernel outputs tasks to one or more streams being processed by PPU 2100. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

In at least one embodiment, one or more components of PPU 2100 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 22:
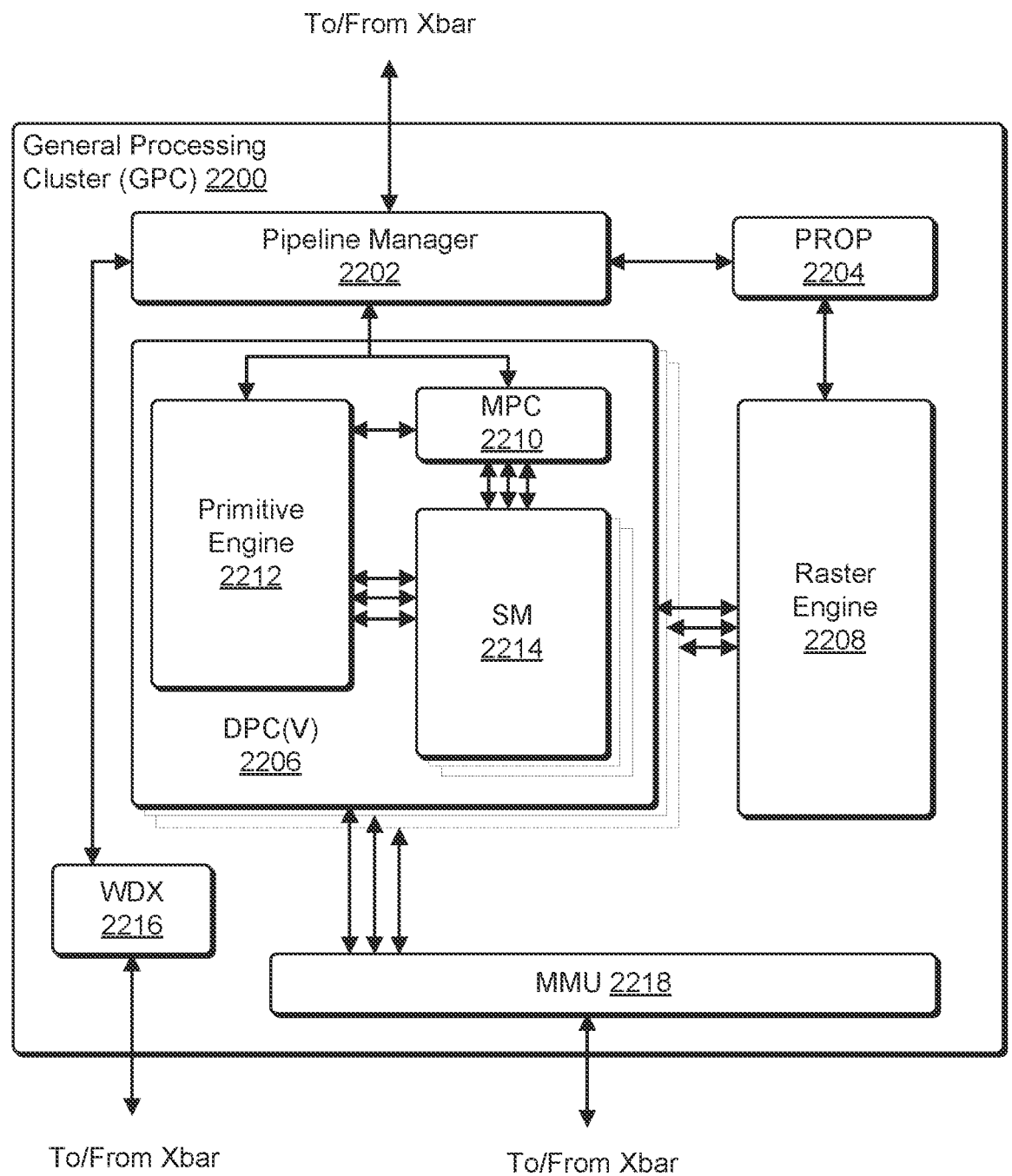
FIG. 22 illustrates a GPC, in accordance with at least one embodiment.

FIG. 22 illustrates a GPC 2200, in accordance with at least one embodiment. In at least one embodiment, GPC 2200 is GPC 2118 of FIG. 21. In at least one embodiment, each GPC 2200 includes, without limitation, a number of hardware units for processing tasks and each GPC 2200 includes, without limitation, a pipeline manager 2202, a pre-raster operations unit ("PROP") 2204, a raster engine 2208, a work distribution crossbar ("WDX") 2216, an MMU 2218, one or more Data Processing Clusters ("DPCs") 2206, and any suitable combination of parts.

In at least one embodiment, operation of GPC 2200 is controlled by pipeline manager 2202. In at least one embodiment, pipeline manager 2202 manages configuration of one or more DPCs 2206 for processing tasks allocated to GPC 2200. In at least one embodiment, pipeline manager 2202 configures at least one of one or more DPCs 2206 to implement at least a portion of a graphics rendering pipeline. In at least one embodiment, DPC 2206 is configured to execute a vertex shader program on a programmable streaming multiprocessor ("SM") 2214. In at least one embodiment, pipeline manager 2202 is configured to route packets received from a work distribution unit to appropriate logical units within GPC 2200 and, in at least one embodiment, some packets may be routed to fixed function hardware units in PROP 2204 and/or raster engine 2208 while other packets may be routed to DPCs 2206 for processing by a primitive engine 2212 or SM 2214. In at least one embodiment, pipeline manager 2202 configures at least one of DPCs 2206 to implement a computing pipeline. In at least one embodiment, pipeline manager 2202 configures at least one of DPCs 2206 to execute at least a portion of a CUDA program.

In at least one embodiment, PROP unit 2204 is configured to route data generated by raster engine 2208 and DPCs 2206 to a Raster Operations ("ROP") unit in a partition unit, such as memory partition unit 2122 described in more detail above in conjunction with FIG. 21. In at least one embodiment, PROP unit 2204 is configured to perform optimizations for color blending, organize pixel data, perform address translations, and more. In at least one embodiment, raster engine 2208 includes, without limitation, a number of fixed function hardware units configured to perform various raster operations and, in at least one embodiment, raster engine 2208 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2208 comprises fragments to be processed by any suitable entity such as by a fragment shader implemented within DPC 2206.

In at least one embodiment, each DPC 2206 included in GPC 2200 comprise, without limitation, an M-Pipe Controller ("MPC") 2210; primitive engine 2212; one or more SMs 2214; and any suitable combination thereof. In at least one embodiment, MPC 2210 controls operation of DPC 2206, routing packets received from pipeline manager 2202 to appropriate units in DPC 2206. In at least one embodiment, packets associated with a vertex are routed to primitive engine 2212, which is configured to fetch vertex attributes associated with vertex from memory; in contrast, packets associated with a shader program may be transmitted to SM 2214.

In at least one embodiment, SM 2214 comprises, without limitation, a programmable streaming processor that is configured to process tasks represented by a number of threads. In at least one embodiment, SM 2214 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 2214 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2214 is described in more detail in conjunction with FIG. 23.

In at least one embodiment, MMU 2218 provides an interface between GPC 2200 and a memory partition unit (e.g., partition unit 2122 of FIG. 21) and MMU 2218 provides translation of virtual addresses into physical addresses, memory protection, and arbitration of memory requests. In at least one embodiment, MMU 2218 provides one or more translation lookaside buffers (TLBs) for performing translation of virtual addresses into physical addresses in memory.

In at least one embodiment, one or more components of GPC 2200 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 23:
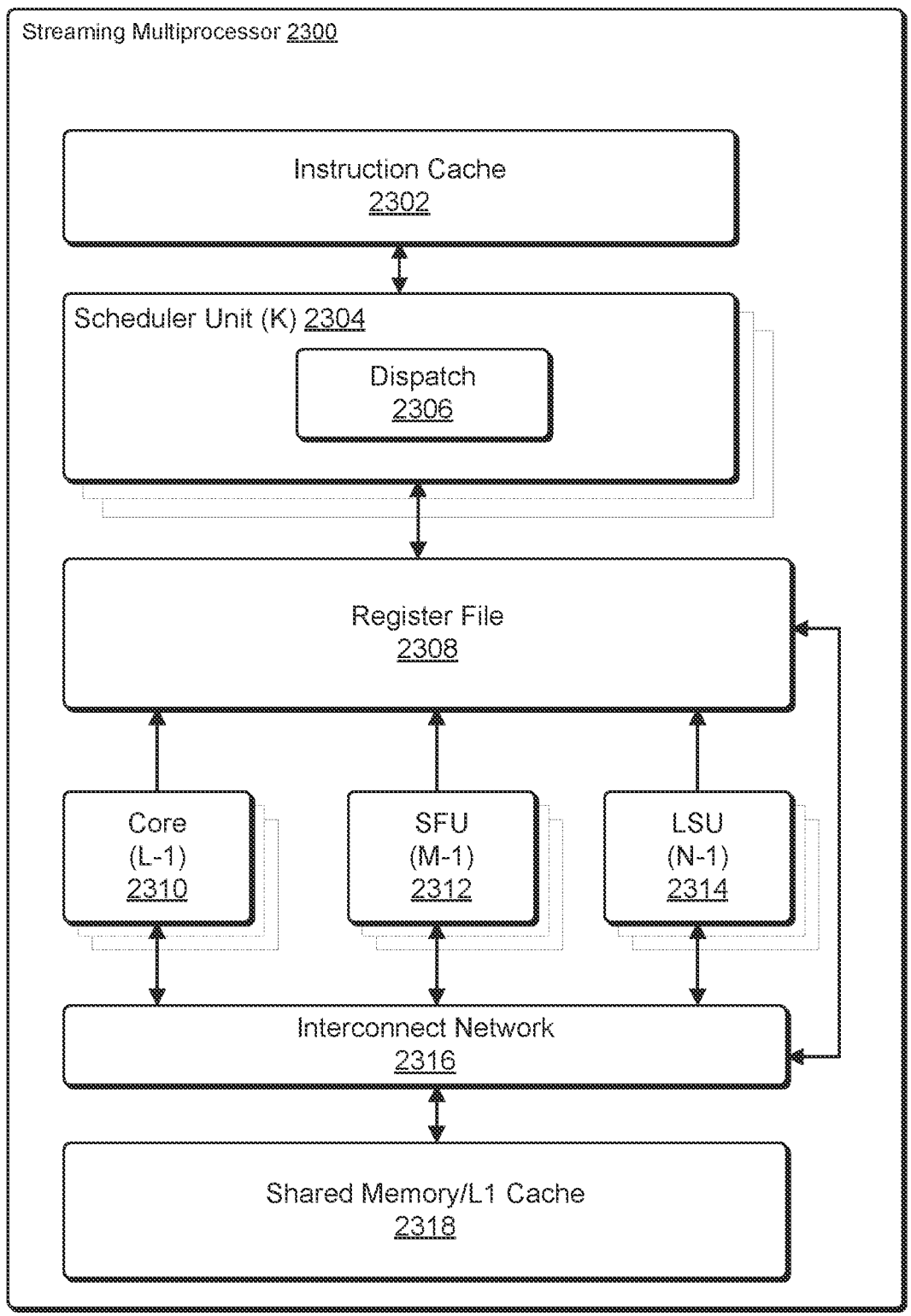
FIG. 23 illustrates a streaming multiprocessor, in accordance with at least one embodiment.

FIG. 23 illustrates a streaming multiprocessor ("SM") 2300, in accordance with at least one embodiment. In at least one embodiment, SM 2300 is SM 2214 of FIG. 22. In at least one embodiment, SM 2300 includes, without limitation, an instruction cache 2302; one or more scheduler units 2304; a register file 2308; one or more processing cores ("cores") 2310; one or more special function units ("SFUs") 2312; one or more LSUs 2314; an interconnect network 2316; a shared memory/L1 cache 2318; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 2300. In at least one embodiment, scheduler unit 2304 receives tasks from a work distribution unit and manages instruction scheduling for one or more thread blocks assigned to SM 2300. In at least one embodiment, scheduler unit 2304 schedules thread blocks for execution as warps of parallel threads, wherein each thread block is allocated at least one warp. In at least one embodiment, each warp executes threads. In at least one embodiment, scheduler unit 2304 manages a plurality of different thread blocks, allocating warps to different thread blocks and then dispatching instructions from a plurality of different cooperative groups to various functional units (e.g., processing cores 2310, SFUs 2312, and LSUs 2314) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 2306 is configured to transmit instructions to one or more of functional units and scheduler unit 2304 includes, without limitation, two dispatch units 2306 that enable two different instructions from same warp to be dispatched during each clock cycle. In at least one embodiment, each scheduler unit 2304 includes a single dispatch unit 2306 or additional dispatch units 2306.

In at least one embodiment, each SM 2300, in at least one embodiment, includes, without limitation, register file 2308 that provides a set of registers for functional units of SM 2300. In at least one embodiment, register file 2308 is divided between each of the functional units such that each functional unit is allocated a dedicated portion of register file 2308. In at least one embodiment, register file 2308 is divided between different warps being executed by SM 2300 and register file 2308 provides temporary storage for operands connected to data paths of functional units. In at least one embodiment, each SM 2300 comprises, without limitation, a plurality of L processing cores 2310. In at least one embodiment, SM 2300 includes, without limitation, a large number (e.g., 128 or more) of distinct processing cores 2310. In at least one embodiment, each processing core 2310 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2310 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 2310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D, are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program.

In at least one embodiment, at the CUDA level, a warp-level interface assumes 16×16 size matrices spanning all 32 threads of a warp.

In at least one embodiment, each SM 2300 comprises, without limitation, M SFUs 2312 that perform special functions (e.g., attribute evaluation, reciprocal square root, and like). In at least one embodiment, SFUs 2312 include, without limitation, a tree traversal unit configured to traverse a hierarchical tree data structure. In at least one embodiment, SFUs 2312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2300. In at least one embodiment, texture maps are stored in shared memory/L1 cache 2318. In at least one embodiment, texture units implement texture operations such as filtering operations using mip-maps (e.g., texture maps of varying levels of detail). In at least one embodiment, each SM 2300 includes, without limitation, two texture units.

In at least one embodiment, each SM 2300 comprises, without limitation, N LSUs 2314 that implement load and store operations between shared memory/L1 cache 2318 and register file 2308. In at least one embodiment, each SM 2300 includes, without limitation, interconnect network 2316 that connects each of the functional units to register file 2308 and LSU 2314 to register file 2308 and shared memory/L1 cache 2318. In at least one embodiment, interconnect network 2316 is a crossbar that can be configured to connect any of the functional units to any of the registers in register file 2308 and connect LSUs 2314 to register file 2308 and memory locations in shared memory/L1 cache 2318.

In at least one embodiment, shared memory/L1 cache 2318 is an array of on-chip memory that allows for data storage and communication between SM 2300 and a primitive engine and between threads in SM 2300. In at least one embodiment, shared memory/L1 cache 2318 comprises, without limitation, 128 KB of storage capacity and is in a path from SM 2300 to a partition unit. In at least one embodiment, shared memory/L1 cache 2318 is used to cache reads and writes. In at least one embodiment, one or more of shared memory/L1 cache 2318, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 2318 enables shared memory/L1 cache 2318 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 2300 to execute a program and perform calculations, shared memory/L1 cache 2318 to communicate between threads, and LSU 2314 to read and write global memory through shared memory/L1 cache 2318 and a memory partition unit. In at least one embodiment, when configured for general purpose parallel computation, SM 2300 writes commands that scheduler unit 2304 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

In at least one embodiment, one or more components of SM 2300 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Software Constructions for General-Purpose Computing

The following figures set forth, without limitation, exemplary software constructs for implementing at least one embodiment.

Figure 24:
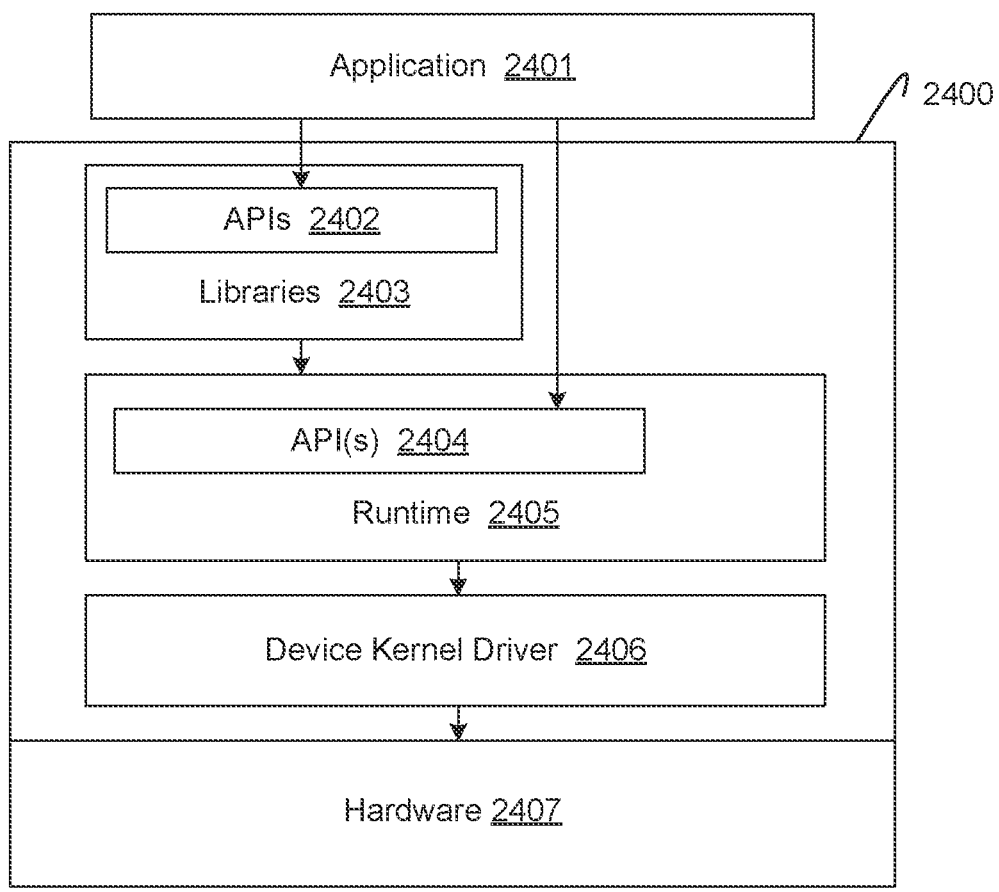
FIG. 24 illustrates a software stack of a programming platform, in accordance with at least one embodiment.

FIG. 24 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 2400 of a programming platform provides an execution environment for an application 2401. In at least one embodiment, application 2401 may include any computer software capable of being launched on software stack 2400. In at least one embodiment, application 2401 may include, but is not limited to, an artificial intelligence ("AI")/machine learning ("ML") application, a high performance computing ("HPC") application, a virtual desktop infrastructure ("VDI"), or a data center workload.

In at least one embodiment, application 2401 and software stack 2400 run on hardware 2407. Hardware 2407 may include one or more GPUs, CPUs, FPGAs, AI engines, and/or other types of compute devices that support a programming platform, in at least one embodiment. In at least one embodiment, such as with CUDA, software stack 2400 may be vendor specific and compatible with only devices from particular vendor(s). In at least one embodiment, such as in with OpenCL, software stack 2400 may be used with devices from different vendors. In at least one embodiment, hardware 2407 includes a host connected to one more devices that can be accessed to perform computational tasks via application programming interface ("API") calls. A device within hardware 2407 may include, but is not limited to, a GPU, FPGA, AI engine, or other compute device (but may also include a CPU) and its memory, as opposed to a host within hardware 2407 that may include, but is not limited to, a CPU (but may also include a compute device) and its memory, in at least one embodiment.

In at least one embodiment, software stack 2400 of a programming platform includes, without limitation, a number of libraries 2403, a runtime 2405, and a device kernel driver 2406. Each of libraries 2403 may include data and programming code that can be used by computer programs and leveraged during software development, in at least one embodiment. In at least one embodiment, libraries 2403 may include, but are not limited to, pre-written code and subroutines, classes, values, type specifications, configuration data, documentation, help data, and/or message templates. In at least one embodiment, libraries 2403 include functions that are optimized for execution on one or more types of devices. In at least one embodiment, libraries 2403 may include, but are not limited to, functions for performing mathematical, deep learning, and/or other types of operations on devices. In at least one embodiment, libraries 2403 are associated with corresponding APIs 2402, which may include one or more APIs, that expose functions implemented in libraries 2403.

In at least one embodiment, application 2401 is written as source code that is compiled into executable code, as discussed in greater detail below in conjunction with FIGS. 29-31. Executable code of application 2401 may run, at least in part, on an execution environment provided by software stack 2400, in at least one embodiment. In at least one embodiment, during execution of application 2401, code may be reached that needs to run on a device, as opposed to a host. In such a case, runtime 2405 may be called to load and launch requisite code on the device, in at least one embodiment. In at least one embodiment, runtime 2405 may include any technically feasible runtime system that is able to support execution of application S01.

In at least one embodiment, runtime 2405 is implemented as one or more runtime libraries associated with corresponding APIs, which are shown as API(s) 2404. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 2404 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 2406 is configured to facilitate communication with an underlying device. In at least one embodiment, device kernel driver 2406 may provide low-level functionalities upon which APIs, such as API(s) 2404, and/or other software relies. In at least one embodiment, device kernel driver 2406 may be configured to compile intermediate representation ("IR") code into binary code at runtime. For CUDA, device kernel driver 2406 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 2406 to compile IR code at runtime.

In at least one embodiment, one or more components of software stack 2400 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 25:
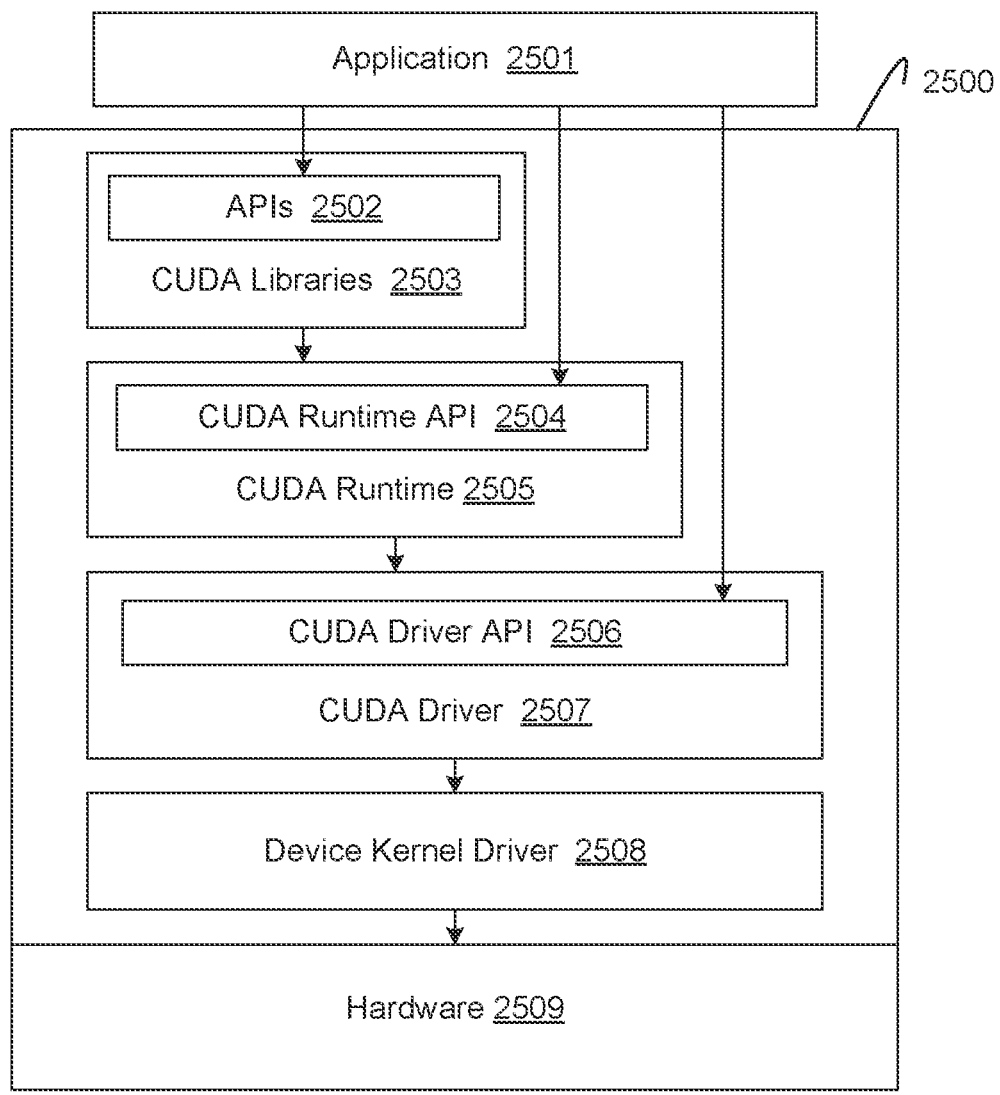
FIG. 25 illustrates a CUDA implementation of a software stack of FIG. 24, in accordance with at least one embodiment.

FIG. 25 illustrates a CUDA implementation of software stack 2400 of FIG. 24, in accordance with at least one embodiment. In at least one embodiment, a CUDA software stack 2500, on which an application 2501 may be launched, includes CUDA libraries 2503, a CUDA runtime 2505, a CUDA driver 2507, and a device kernel driver 2508. In at least one embodiment, CUDA software stack 2500 executes on hardware 2509, which may include a GPU that supports CUDA and is developed by NVIDIA Corporation of Santa Clara, CA.

In at least one embodiment, application 2501, CUDA runtime 2505, and device kernel driver 2508 may perform similar functionalities as application 2401, runtime 2405, and device kernel driver 2406, respectively, which are described above in conjunction with FIG. 24. In at least one embodiment, CUDA driver 2507 includes a library (libcuda.so) that implements a CUDA driver API 2506. Similar to a CUDA runtime API 2504 implemented by a CUDA runtime library (cudart), CUDA driver API 2506 may, without limitation, expose functions for memory management, execution control, device management, error handling, synchronization, and/or graphics interoperability, among other things, in at least one embodiment. In at least one embodiment, CUDA driver API 2506 differs from CUDA runtime API 2504 in that CUDA runtime API 2504 simplifies device code management by providing implicit initialization, context (analogous to a process) management, and module (analogous to dynamically loaded libraries) management. In contrast to high-level CUDA runtime API 2504, CUDA driver API 2506 is a low-level API providing more fine-grained control of the device, particularly with respect to contexts and module loading, in at least one embodiment. In at least one embodiment, CUDA driver API 2506 may expose functions for context management that are not exposed by CUDA runtime API 2504. In at least one embodiment, CUDA driver API 2506 is also language-independent and supports, e.g., OpenCL in addition to CUDA runtime API 2504. Further, in at least one embodiment, development libraries, including CUDA runtime 2505, may be considered as separate from driver components, including user-mode CUDA driver 2507 and kernel-mode device driver 2508 (also sometimes referred to as a "display" driver).

In at least one embodiment, CUDA libraries 2503 may include, but are not limited to, mathematical libraries, deep learning libraries, parallel algorithm libraries, and/or signal/image/video processing libraries, which parallel computing applications such as application 2501 may utilize. In at least one embodiment, CUDA libraries 2503 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 2503 may include deep learning libraries such as a cuDNN library of primitives for deep neural networks and a TensorRT platform for high-performance deep learning inference, among others.

In at least one embodiment, one or more components of stack 2500 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 26:
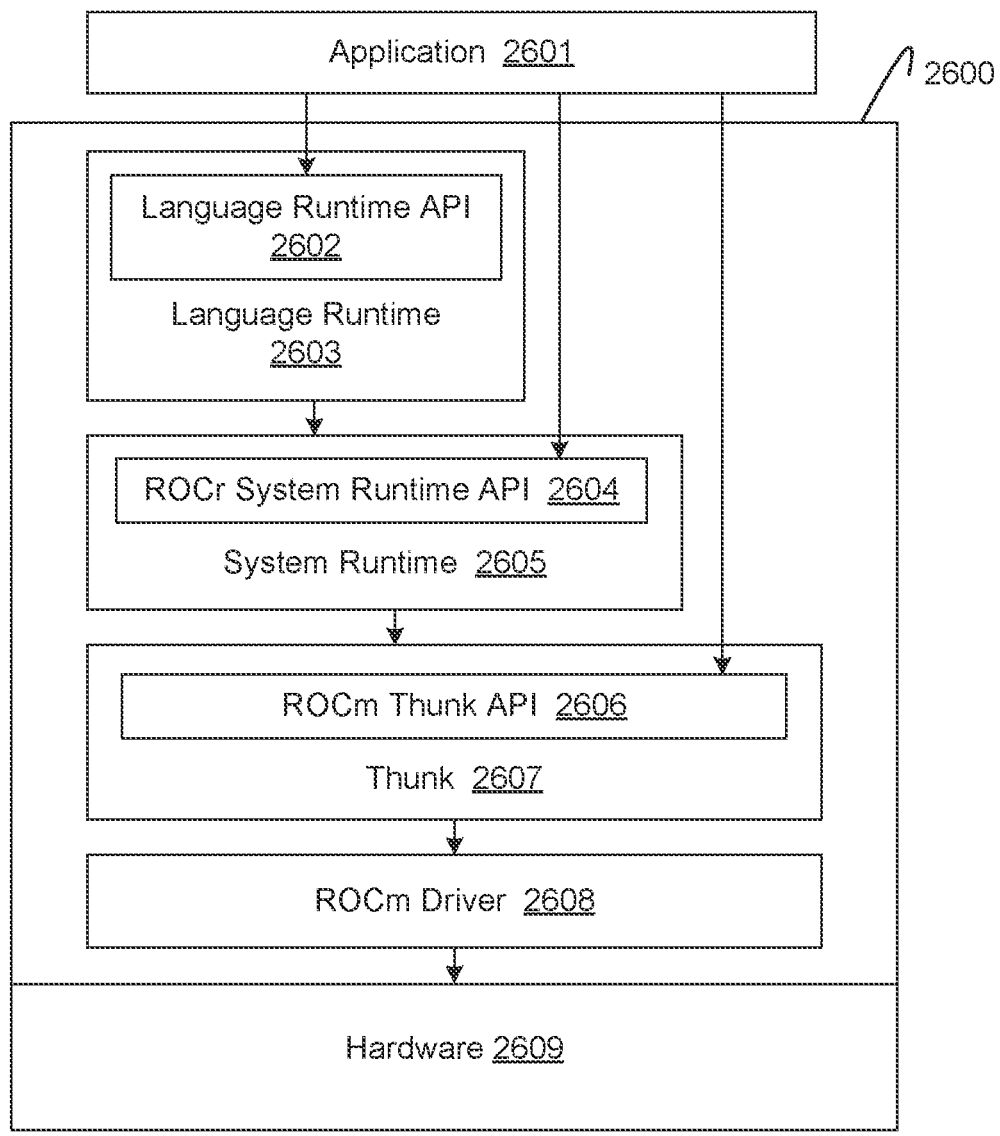
FIG. 26 illustrates a ROCm implementation of a software stack of FIG. 24, in accordance with at least one embodiment.

FIG. 26 illustrates a ROCm implementation of software stack 2400 of FIG. 24, in accordance with at least one embodiment. In at least one embodiment, a ROCm software stack 2600, on which an application 2601 may be launched, includes a language runtime 2603, a system runtime 2605, a thunk 2607, and a ROCm kernel driver 2608. In at least one embodiment, ROCm software stack 2600 executes on hardware 2609, which may include a GPU that supports ROCm and is developed by AMD Corporation of Santa Clara, CA.

In at least one embodiment, application 2601 may perform similar functionalities as application 2401 discussed above in conjunction with FIG. 24. In addition, language runtime 2603 and system runtime 2605 may perform similar functionalities as runtime 2405 discussed above in conjunction with FIG. 24, in at least one embodiment. In at least one embodiment, language runtime 2603 and system runtime 2605 differ in that system runtime 2605 is a language-independent runtime that implements a ROCr system runtime API 2604 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 2605, language runtime 2603 is an implementation of a language-specific runtime API 2602 layered on top of ROCr system runtime API 2604, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 2504 discussed above in conjunction with FIG. 25, such as functions for memory management, execution control, device management, error handling, and synchronization, among other things.

In at least one embodiment, thunk (ROCt) 2607 is an interface 2606 that can be used to interact with underlying ROCm driver 2608. In at least one embodiment, ROCm driver 2608 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 2406 discussed above in conjunction with FIG. 24. In at least one embodiment, HSA kernel driver is a driver permitting different types of processors to share system resources more effectively via hardware features.

In at least one embodiment, various libraries (not shown) may be included in ROCm software stack 2600 above language runtime 2603 and provide functionality similarity to CUDA libraries 2503, discussed above in conjunction with FIG. 25. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, one or more components of stack 2600 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 27:
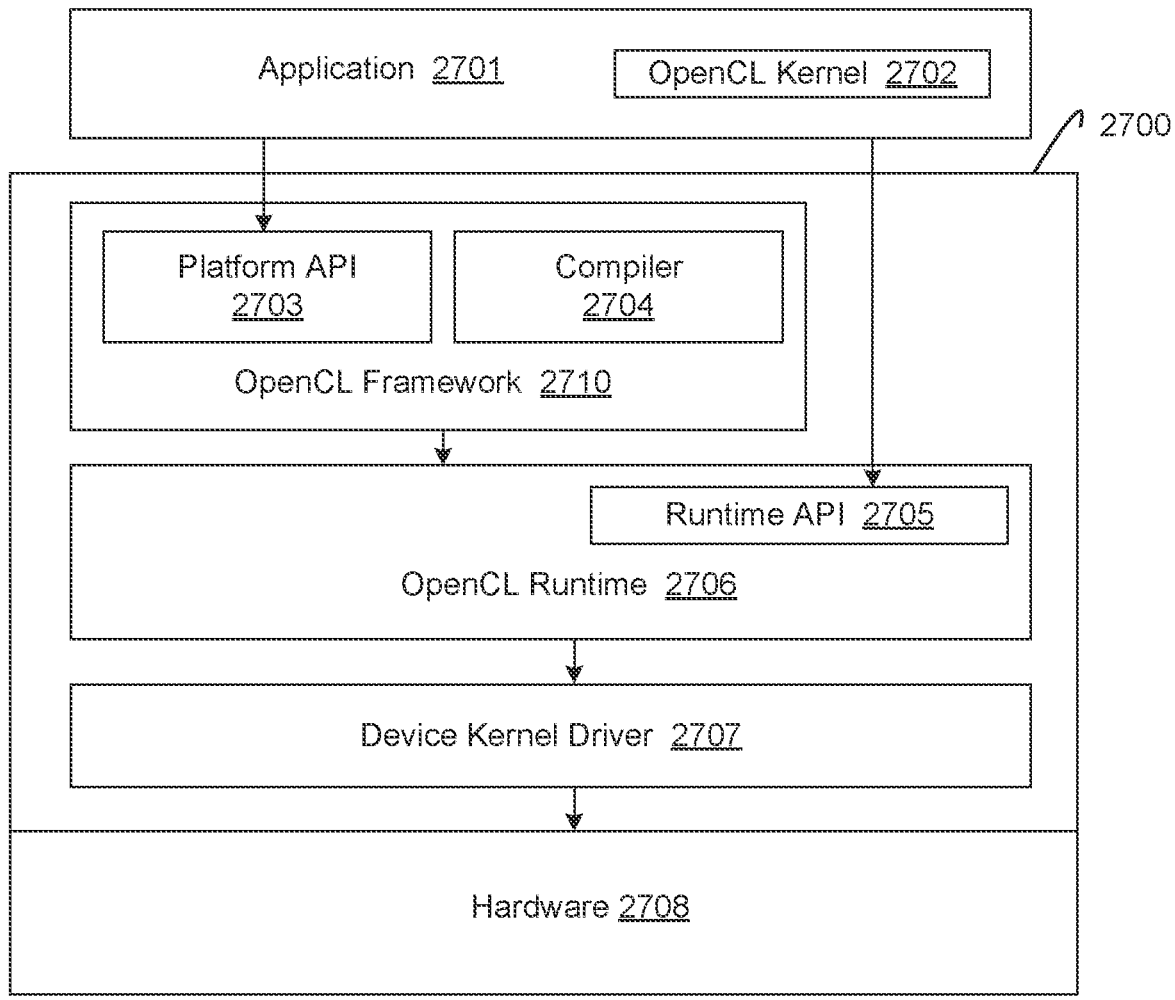
FIG. 27 illustrates an OpenCL implementation of a software stack of FIG. 24, in accordance with at least one embodiment.

FIG. 27 illustrates an OpenCL implementation of software stack 2400 of FIG. 24, in accordance with at least one embodiment. In at least one embodiment, an OpenCL software stack 2700, on which an application 2701 may be launched, includes an OpenCL framework 2710, an OpenCL runtime 2706, and a driver 2707. In at least one embodiment, OpenCL software stack 2700 executes on hardware 2509 that is not vendor-specific. As OpenCL is supported by devices developed by different vendors, specific OpenCL drivers may be required to interoperate with hardware from such vendors, in at least one embodiment.

In at least one embodiment, application 2701, OpenCL runtime 2706, device kernel driver 2707, and hardware 2708 may perform similar functionalities as application 2401, runtime 2405, device kernel driver 2406, and hardware 2407, respectively, that are discussed above in conjunction with FIG. 24. In at least one embodiment, application 2701 further includes an OpenCL kernel 2702 with code that is to be executed on a device.

In at least one embodiment, OpenCL defines a "platform" that allows a host to control devices connected to the host. In at least one embodiment, an OpenCL framework provides a platform layer API and a runtime API, shown as platform API 2703 and runtime API 2705. In at least one embodiment, runtime API 2705 uses contexts to manage execution of kernels on devices. In at least one embodiment, each identified device may be associated with a respective context, which runtime API 2705 may use to manage command queues, program objects, and kernel objects, share memory objects, among other things, for that device. In at least one embodiment, platform API 2703 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 2704 is also included in OpenCL frame-work 2710. Source code may be compiled offline prior to executing an application or online during execution of an application, in at least one embodiment. In contrast to CUDA and ROCm, OpenCL applications in at least one embodiment may be compiled online by compiler 2704, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, one or more components of stack 2700 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 28:
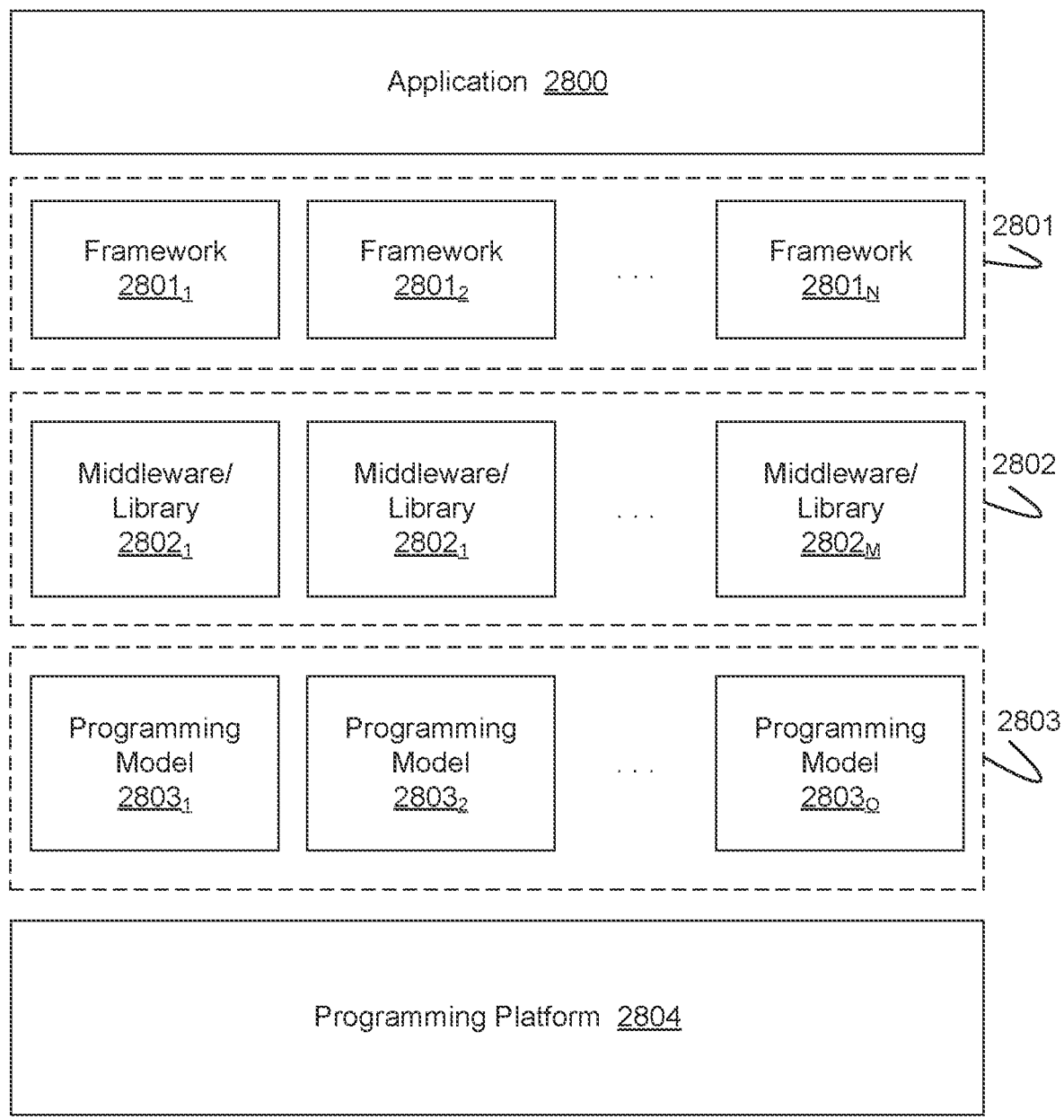
FIG. 28 illustrates software that is supported by a programming platform, in accordance with at least one embodiment.

FIG. 28 illustrates software that is supported by a programming platform, in accordance with at least one embodiment. In at least one embodiment, a programming platform 2804 is configured to support various programming models 2803, middlewares and/or libraries 2802, and frameworks 2801 that an application 2800 may rely upon. In at least one embodiment, application 2800 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 2804 may be one of a CUDA, ROCm, or OpenCL platform described above in conjunction with FIG. 25, FIG. 26, and FIG. 27, respectively. In at least one embodiment, programming platform 2804 supports multiple programming models 2803, which are abstractions of an underlying computing system permitting expressions of algorithms and data structures. Programming models 2803 may expose features of underlying hardware in order to improve performance, in at least one embodiment. In at least one embodiment, programming models 2803 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 2802 provide implementations of abstractions of programming models 2804. In at least one embodiment, such libraries include data and programming code that may be used by computer programs and leveraged during software development. In at least one embodiment, such middlewares include software that provides services to applications beyond those available from programming platform 2804. In at least one embodiment, libraries and/or middlewares 2802 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 2802 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 2801 depend on libraries and/or middlewares 2802. In at least one embodiment, each of application frameworks 2801 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

In at least one embodiment, one or more components of programming platform 2804 can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

Figure 29:
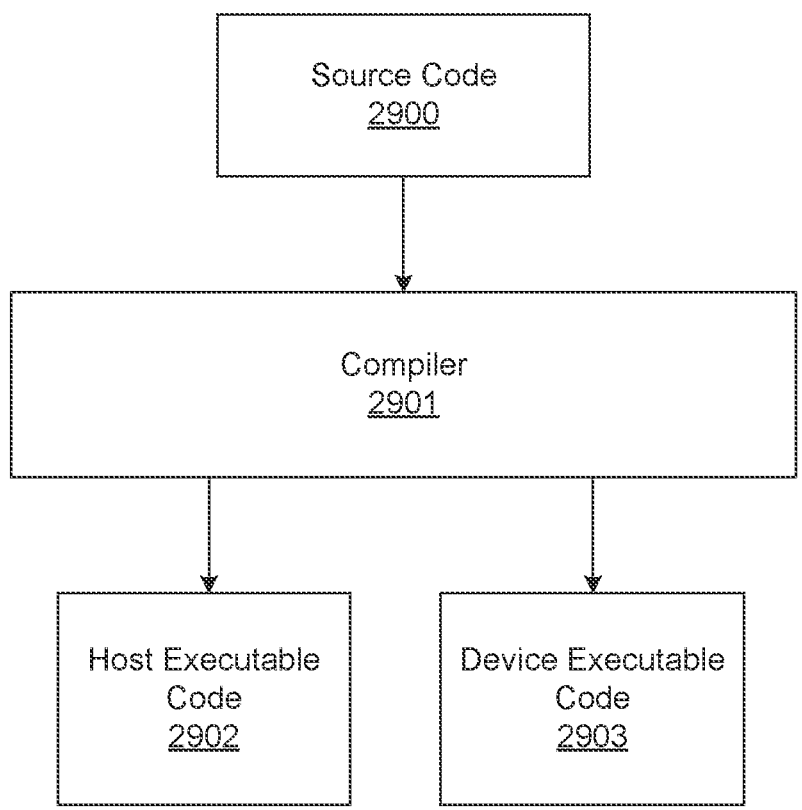
FIG. 29 illustrates compiling code to execute on programming platforms of FIGS. 24-27, in accordance with at least one embodiment.

FIG. 29 illustrates compiling code to execute on one of programming platforms of FIGS. 24-27, in accordance with at least one embodiment. In at least one embodiment, a compiler 2901 receives source code 2900 that includes both host code as well as device code. In at least one embodiment, complier 2901 is configured to convert source code 2900 into host executable code 2902 for execution on a host and device executable code 2903 for execution on a device. In at least one embodiment, source code 2900 may either be compiled offline prior to execution of an application, or online during execution of an application.

In at least one embodiment, source code 2900 may include code in any programming language supported by compiler 2901, such as C++, C, Fortran, etc. In at least one embodiment, source code 2900 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 2900 may include multiple source code files, rather than a single-source file, into which host code and device code are separated.

In at least one embodiment, compiler 2901 is configured to compile source code 2900 into host executable code 2902 for execution on a host and device executable code 2903 for execution on a device. In at least one embodiment, compiler 2901 performs operations including parsing source code 2900 into an abstract system tree (AST), performing optimizations, and generating executable code. In at least one embodiment in which source code 2900 includes a single-source file, compiler 2901 may separate device code from host code in such a single-source file, compile device code and host code into device executable code 2903 and host executable code 2902, respectively, and link device executable code 2903 and host executable code 2902 together in a single file, as discussed in greater detail below with respect to FIG. 30.

In at least one embodiment, host executable code 2902 and device executable code 2903 may be in any suitable format, such as binary code and/or IR code. In the case of CUDA, host executable code 2902 may include native object code and device executable code 2903 may include code in PTX intermediate representation, in at least one embodiment. In the case of ROCm, both host executable code 2902 and device executable code 2903 may include target binary code, in at least one embodiment.

Figure 30:
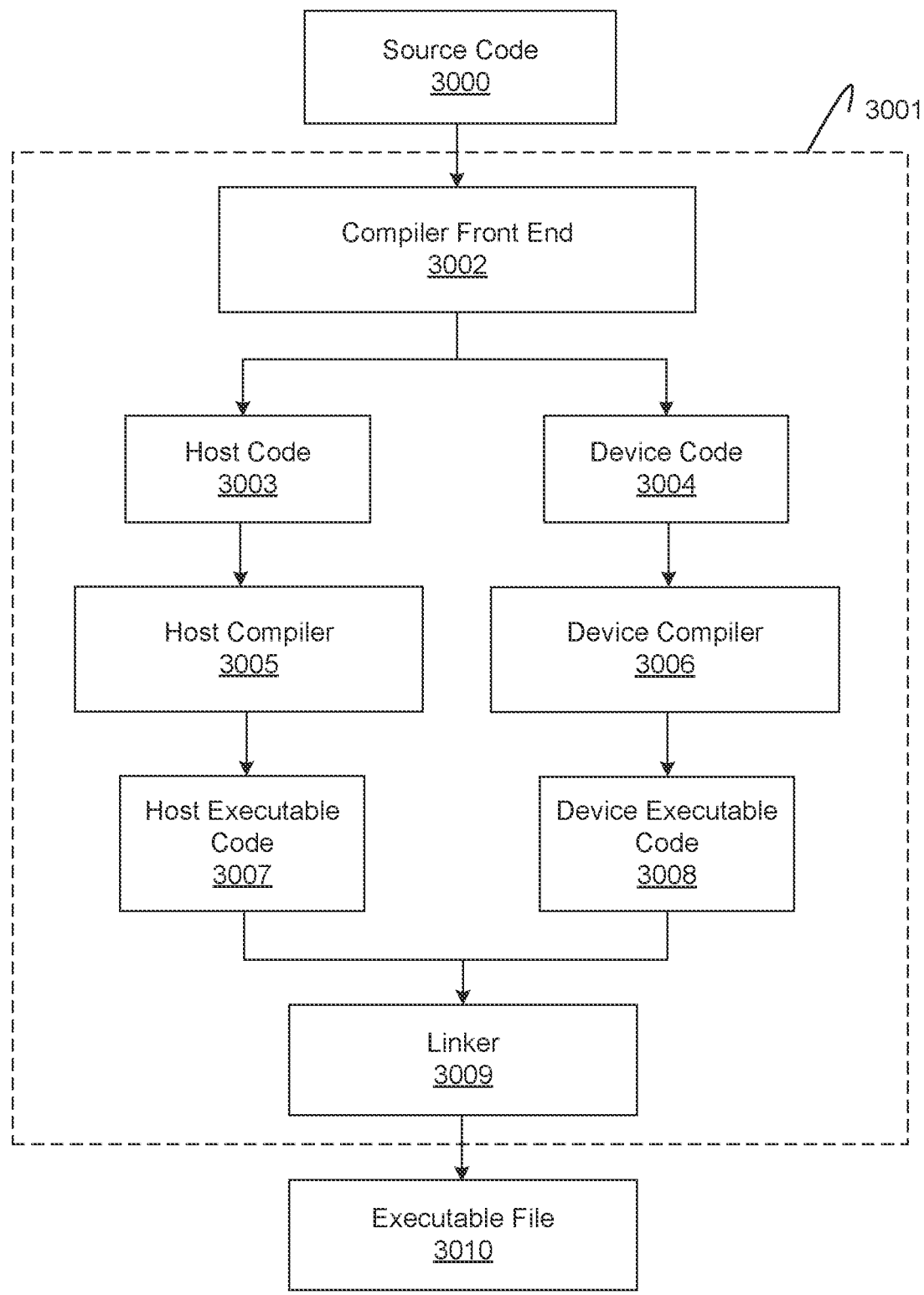
FIG. 30 illustrates in greater detail compiling code to execute on programming platforms of FIGS. 24-27, in accordance with at least one embodiment.

FIG. 30 is a more detailed illustration of compiling code to execute on one of programming platforms of FIGS. 24-27, in accordance with at least one embodiment. In at least one embodiment, a compiler 3001 is configured to receive source code 3000, compile source code 3000, and output an executable file 3010. In at least one embodiment, source code 3000 is a single-source file, such as a .cu file, a .hip.cpp file, or a file in another format, that includes both host and device code. In at least one embodiment, compiler 3001 may be, but is not limited to, an NVIDIA CUDA compiler ("NVCC") for compiling CUDA code in .cu files, or a HCC compiler for compiling HIP code in .hip.cpp files.

In at least one embodiment, compiler 3001 includes a compiler front end 3002, a host compiler 3005, a device compiler 3006, and a linker 3009. In at least one embodiment, compiler front end 3002 is configured to separate device code 3004 from host code 3003 in source code 3000. Device code 3004 is compiled by device compiler 3006 into device executable code 3008, which as described may include binary code or IR code, in at least one embodiment. Separately, host code 3003 is compiled by host compiler 3005 into host executable code 3007, in at least one embodiment. For NVCC, host compiler 3005 may be, but is not limited to, a general purpose C/C++ compiler that outputs native object code, while device compiler 3006 may be, but is not limited to, a Low Level Virtual Machine ("LLVM")-based compiler that forks a LLVM compiler infrastructure and outputs PTX code or binary code, in at least one embodiment. For HCC, both host compiler 3005 and device compiler 3006 may be, but are not limited to, LLVM-based compilers that output target binary code, in at least one embodiment.

Subsequent to compiling source code 3000 into host executable code 3007 and device executable code 3008, linker 3009 links host and device executable code 3007 and 3008 together in executable file 3010, in at least one embodiment. In at least one embodiment, native object code for a host and PTX or binary code for a device may be linked together in an Executable and Linkable Format ("ELF") file, which is a container format used to store object code.

Figure 31:
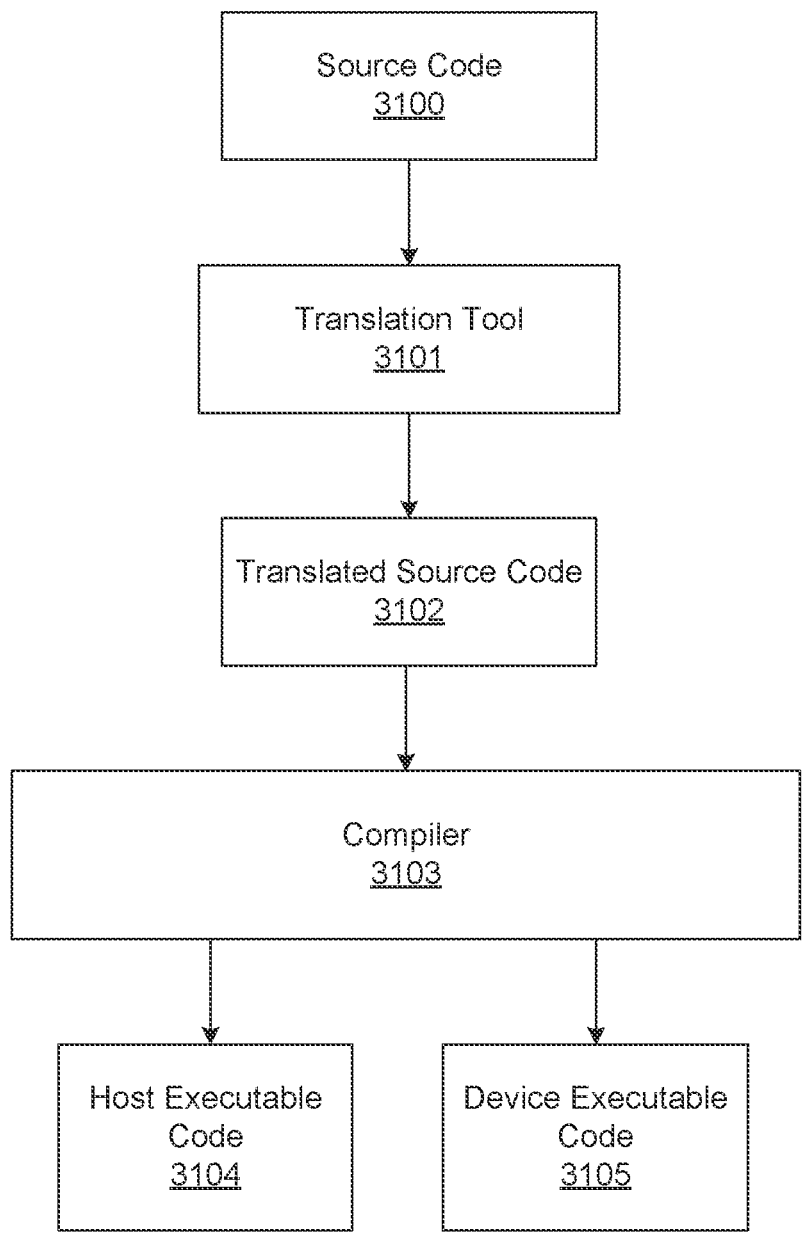
FIG. 31 illustrates translating source code prior to compiling source code, in accordance with at least one embodiment.

FIG. 31 illustrates translating source code prior to compiling source code, in accordance with at least one embodiment. In at least one embodiment, source code 3100 is passed through a translation tool 3101, which translates source code 3100 into translated source code 3102. In at least one embodiment, a compiler 3103 is used to compile translated source code 3102 into host executable code 3104 and device executable code 3105 in a process that is similar to compilation of source code 2900 by compiler 2901 into host executable code 2902 and device executable 2903, as discussed above in conjunction with FIG. 29.

In at least one embodiment, a translation performed by translation tool 3101 is used to port source 3100 for execution in a different environment than that in which it was originally intended to run. In at least one embodiment, translation tool 3101 may include, but is not limited to, a HIP translator that is used to "hipify" CUDA code intended for a CUDA platform into HIP code that can be compiled and executed on a ROCm platform. In at least one embodiment, translation of source code 3100 may include parsing source code 3100 and converting calls to API(s) provided by one programming model (e.g., CUDA) into corresponding calls to API(s) provided by another programming model (e.g., HIP), as discussed in greater detail below in conjunction with FIGS. 32A-33. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3101 may sometimes be incomplete, requiring additional, manual effort to fully port source code 3100.

Configuring GPUs for General-Purpose Computing

The following figures set forth, without limitation, exemplary architectures for compiling and executing compute source code, in accordance with at least one embodiment.

Figure 32A:
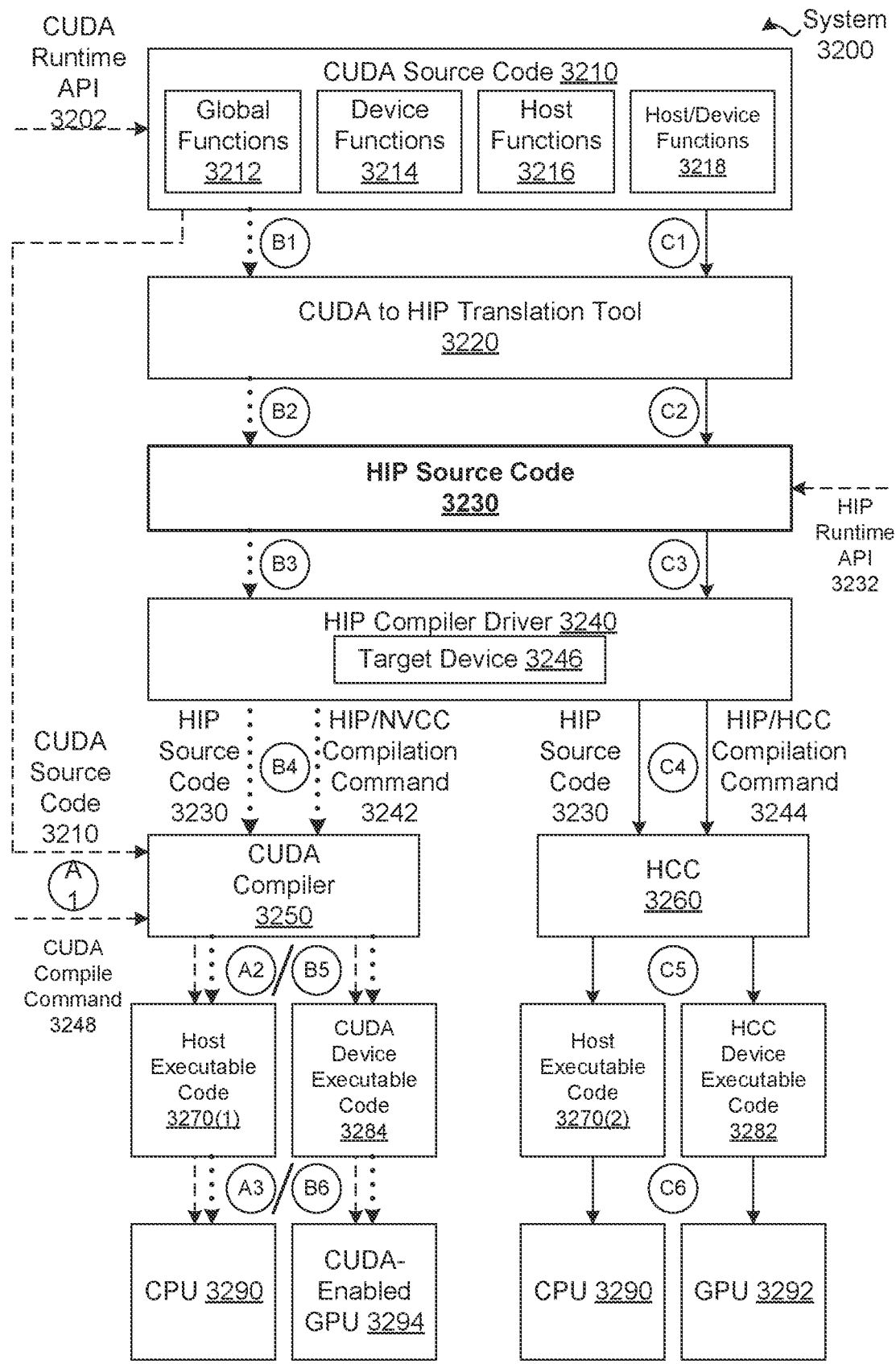
FIG. 32A illustrates a system configured to compile and execute CUDA source code using different types of processing units, in accordance with at least one embodiment.

FIG. 32A illustrates a system 32A00 configured to compile and execute CUDA source code 3210 using different types of processing units, in accordance with at least one embodiment. In at least one embodiment, system 32A00 includes, without limitation, CUDA source code 3210, a CUDA compiler 3250, host executable code 3270(1), host executable code 3270(2), CUDA device executable code 3284, a CPU 3290, a CUDA-enabled GPU 3294, a GPU 3292, a CUDA to HIP translation tool 3220, HIP source code 3230, a HIP compiler driver 3240, an HCC 3260, and HCC device executable code 3282.

In at least one embodiment, CUDA source code 3210 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3290, GPU 32192, or another GPGPU, etc. In at least one embodiment, host code is source code that, after compilation, is executable on a host. In at least one embodiment, a host is a processor that is optimized for sequential instruction processing, such as CPU 3290.

In at least one embodiment, CUDA source code 3210 includes, without limitation, any number (including zero) of global functions 3212, any number (including zero) of device functions 3214, any number (including zero) of host functions 3216, and any number (including zero) of host/device functions 3218. In at least one embodiment, global functions 3212, device functions 3214, host functions 3216, and host/device functions 3218 may be mixed in CUDA source code 3210. In at least one embodiment, each of global functions 3212 is executable on a device and callable from a host. In at least one embodiment, one or more of global functions 3212 may therefore act as entry points to a device. In at least one embodiment, each of global functions 3212 is a kernel. In at least one embodiment and in a technique known as dynamic parallelism, one or more of global functions 3212 defines a kernel that is executable on a device and callable from such a device. In at least one embodiment, a kernel is executed N (where N is any positive integer) times in parallel by N different threads on a device during execution.

In at least one embodiment, each of device functions 3214 is executed on a device and callable from such a device only. In at least one embodiment, each of host functions 3216 is executed on a host and callable from such a host only. In at least one embodiment, each of host/device functions 3216 defines both a host version of a function that is executable on a host and callable from such a host only and a device version of the function that is executable on a device and callable from such a device only.

In at least one embodiment, CUDA source code 3210 may also include, without limitation, any number of calls to any number of functions that are defined via a CUDA runtime API 3202. In at least one embodiment, CUDA runtime API 3202 may include, without limitation, any number of functions that execute on a host to allocate and deallocate device memory, transfer data between host memory and device memory, manage systems with multiple devices, etc. In at least one embodiment, CUDA source code 3210 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3202, a CUDA driver API, APIs for any number of CUDA libraries, etc. In at least one embodiment and relative to CUDA runtime API 3202, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3250 compiles input CUDA code (e.g., CUDA source code 3210) to generate host executable code 3270(1) and CUDA device executable code 3284. In at least one embodiment, CUDA compiler 3250 is NVCC. In at least one embodiment, host executable code 3270(1) is a compiled version of host code included in input source code that is executable on CPU 3290. In at least one embodiment, CPU 3290 may be any processor that is optimized for sequential instruction processing.

In at least one embodiment, CUDA device executable code 3284 is a compiled version of device code included in input source code that is executable on CUDA-enabled GPU 3294. In at least one embodiment, CUDA device executable code 3284 includes, without limitation, binary code. In at least one embodiment, CUDA device executable code 3284 includes, without limitation, IR code, such as PTX code, that is further compiled at runtime into binary code for a specific target device (e.g., CUDA-enabled GPU 3294) by a device driver. In at least one embodiment, CUDA-enabled GPU 3294 may be any processor that is optimized for parallel instruction processing and that supports CUDA. In at least one embodiment, CUDA-enabled GPU 3294 is developed by NVIDIA Corporation of Santa Clara, CA.

In at least one embodiment, CUDA to HIP translation tool 3220 is configured to translate CUDA source code 3210 to functionally similar HIP source code 3230. In a least one embodiment, HIP source code 3230 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3212, but such a HIP programming language may lack support for dynamic parallelism and therefore global functions 3212 defined in HIP code may be callable from a host only.

In at least one embodiment, HIP source code 3230 includes, without limitation, any number (including zero) of global functions 3212, any number (including zero) of device functions 3214, any number (including zero) of host functions 3216, and any number (including zero) of host/device functions 3218. In at least one embodiment, HIP source code 3230 may also include any number of calls to any number of functions that are specified in a HIP runtime API 3232. In at least one embodiment, HIP runtime API 3232 includes, without limitation, functionally similar versions of a subset of functions included in CUDA runtime API 3202. In at least one embodiment, HIP source code 3230 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3232, a HIP driver API, APIs for any number of HIP libraries, APIs for any number of ROCm libraries, etc.

In at least one embodiment, CUDA to HIP translation tool 3220 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3220 converts any number of calls to functions specified in CUDA runtime API 3202 to any number of calls to functions specified in HIP runtime API 3232.

In at least one embodiment, CUDA to HIP translation tool 3220 is a tool known as hipify-perl that executes a text-based translation process. In at least one embodiment, CUDA to HIP translation tool 3220 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3220.

In at least one embodiment, HIP compiler driver 3240 is a front end that determines a target device 3246 and then configures a compiler that is compatible with target device 3246 to compile HIP source code 3230. In at least one embodiment, target device 3246 is a processor that is optimized for parallel instruction processing. In at least one embodiment, HIP compiler driver 3240 may determine target device 3246 in any technically feasible fashion.

In at least one embodiment, if target device 3246 is compatible with CUDA (e.g., CUDA-enabled GPU 3294), then HIP compiler driver 3240 generates a HIP/NVCC compilation command 3242. In at least one embodiment and as described in greater detail in conjunction with FIG. 32B, HIP/NVCC compilation command 3242 configures CUDA compiler 3250 to compile HIP source code 3230 using, without limitation, a HIP to CUDA translation header and a CUDA runtime library. In at least one embodiment and in response to HIP/NVCC compilation command 3242, CUDA compiler 3250 generates host executable code 3270(1) and CUDA device executable code 3284.

In at least one embodiment, if target device 3246 is not compatible with CUDA, then HIP compiler driver 3240 generates a HIP/HCC compilation command 3244. In at least one embodiment and as described in greater detail in conjunction with FIG. 32C, HIP/HCC compilation command 3244 configures HCC 3260 to compile HIP source code 3230 using, without limitation, an HCC header and a HIP/HCC runtime library. In at least one embodiment and in response to HIP/HCC compilation command 3244, HCC 3260 generates host executable code 3270(2) and HCC device executable code 3282. In at least one embodiment, HCC device executable code 3282 is a compiled version of device code included in HIP source code 3230 that is executable on GPU 3292. In at least one embodiment, GPU 3292 may be any processor that is optimized for parallel instruction processing, is not compatible with CUDA, and is compatible with HCC. In at least one embodiment, GPU 3292 is developed by AMD Corporation of Santa Clara, CA. In at least one embodiment GPU, 3292 is a non-CUDA-enabled GPU 3292.

For explanatory purposes only, three different flows that may be implemented in at least one embodiment to compile CUDA source code 3210 for execution on CPU 3290 and different devices are depicted in FIG. 32A. In at least one embodiment, a direct CUDA flow compiles CUDA source code 3210 for execution on CPU 3290 and CUDA-enabled GPU 3294 without translating CUDA source code 3210 to HIP source code 3230. In at least one embodiment, an indirect CUDA flow translates CUDA source code 3210 to HIP source code 3230 and then compiles HIP source code 3230 for execution on CPU 3290 and CUDA-enabled GPU 3294. In at least one embodiment, a CUDA/HCC flow translates CUDA source code 3210 to HIP source code 3230 and then compiles HIP source code 3230 for execution on CPU 3290 and GPU 3292.

A direct CUDA flow that may be implemented in at least one embodiment is depicted via dashed lines and a series of bubbles annotated A1-A3. In at least one embodiment and as depicted with bubble annotated A1, CUDA compiler 3250 receives CUDA source code 3210 and a CUDA compile command 3248 that configures CUDA compiler 3250 to compile CUDA source code 3210. In at least one embodiment, CUDA source code 3210 used in a direct CUDA flow is written in a CUDA programming language that is based on a programming language other than C++ (e.g., C, Fortran, Python, Java, etc.). In at least one embodiment and in response to CUDA compile command 3248, CUDA compiler 3250 generates host executable code 3270(1) and CUDA device executable code 3284 (depicted with bubble annotated A2). In at least one embodiment and as depicted with bubble annotated A3, host executable code 3270(1) and CUDA device executable code 3284 may be executed on, respectively, CPU 3290 and CUDA-enabled GPU 3294. In at least one embodiment, CUDA device executable code 3284 includes, without limitation, binary code. In at least one embodiment, CUDA device executable code 3284 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3220 receives CUDA source code 3210. In at least one embodiment and as depicted with bubble annotated B2, CUDA to HIP translation tool 3220 translates CUDA source code 3210 to HIP source code 3230. In at least one embodiment and as depicted with bubble annotated B3, HIP compiler driver 3240 receives HIP source code 3230 and determines that target device 3246 is CUDA-enabled.

In at least one embodiment and as depicted with bubble annotated B4, HIP compiler driver 3240 generates HIP/NVCC compilation command 3242 and transmits both HIP/NVCC compilation command 3242 and HIP source code 3230 to CUDA compiler 3250. In at least one embodiment and as described in greater detail in conjunction with FIG. 32B, HIP/NVCC compilation command 3242 configures CUDA compiler 3250 to compile HIP source code 3230 using, without limitation, a HIP to CUDA translation header and a CUDA runtime library. In at least one embodiment and in response to HIP/NVCC compilation command 3242, CUDA compiler 3250 generates host executable code 3270(1) and CUDA device executable code 3284 (depicted with bubble annotated B5). In at least one embodiment and as depicted with bubble annotated B6, host executable code 3270(1) and CUDA device executable code 3284 may be executed on, respectively, CPU 3290 and CUDA-enabled GPU 3294. In at least one embodiment, CUDA device executable code 3284 includes, without limitation, binary code. In at least one embodiment, CUDA device executable code 3284 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3220 receives CUDA source code 3210. In at least one embodiment and as depicted with bubble annotated C2, CUDA to HIP translation tool 3220 translates CUDA source code 3210 to HIP source code 3230. In at least one embodiment and as depicted with bubble annotated C3, HIP compiler driver 3240 receives HIP source code 3230 and determines that target device 3246 is not CUDA-enabled.

In at least one embodiment, HIP compiler driver 3240 generates HIP/HCC compilation command 3244 and transmits both HIP/HCC compilation command 3244 and HIP source code 3230 to HCC 3260 (depicted with bubble annotated C4). In at least one embodiment and as described in greater detail in conjunction with FIG. 32C, HIP/HCC compilation command 3244 configures HCC 3260 to compile HIP source code 3230 using, without limitation, an HCC header and a HIP/HCC runtime library. In at least one embodiment and in response to HIP/HCC compilation command 3244, HCC 3260 generates host executable code 3270(2) and HCC device executable code 3282 (depicted with bubble annotated C5). In at least one embodiment and as depicted with bubble annotated C6, host executable code 3270(2) and HCC device executable code 3282 may be executed on, respectively, CPU 3290 and GPU 3292.

In at least one embodiment, after CUDA source code 3210 is translated to HIP source code 3230, HIP compiler driver 3240 may subsequently be used to generate executable code for either CUDA-enabled GPU 3294 or GPU 3292 without re-executing CUDA to HIP translation tool 3220. In at least one embodiment, CUDA to HIP translation tool 3220 translates CUDA source code 3210 to HIP source code 3230 that is then stored in memory. In at least one embodiment, HIP compiler driver 3240 then configures HCC 3260 to generate host executable code 3270(2) and HCC device executable code 3282 based on HIP source code 3230. In at least one embodiment, HIP compiler driver 3240 subsequently configures CUDA compiler 3250 to generate host executable code 3270(1) and CUDA device executable code 3284 based on stored HIP source code 3230.

Figure 32B:
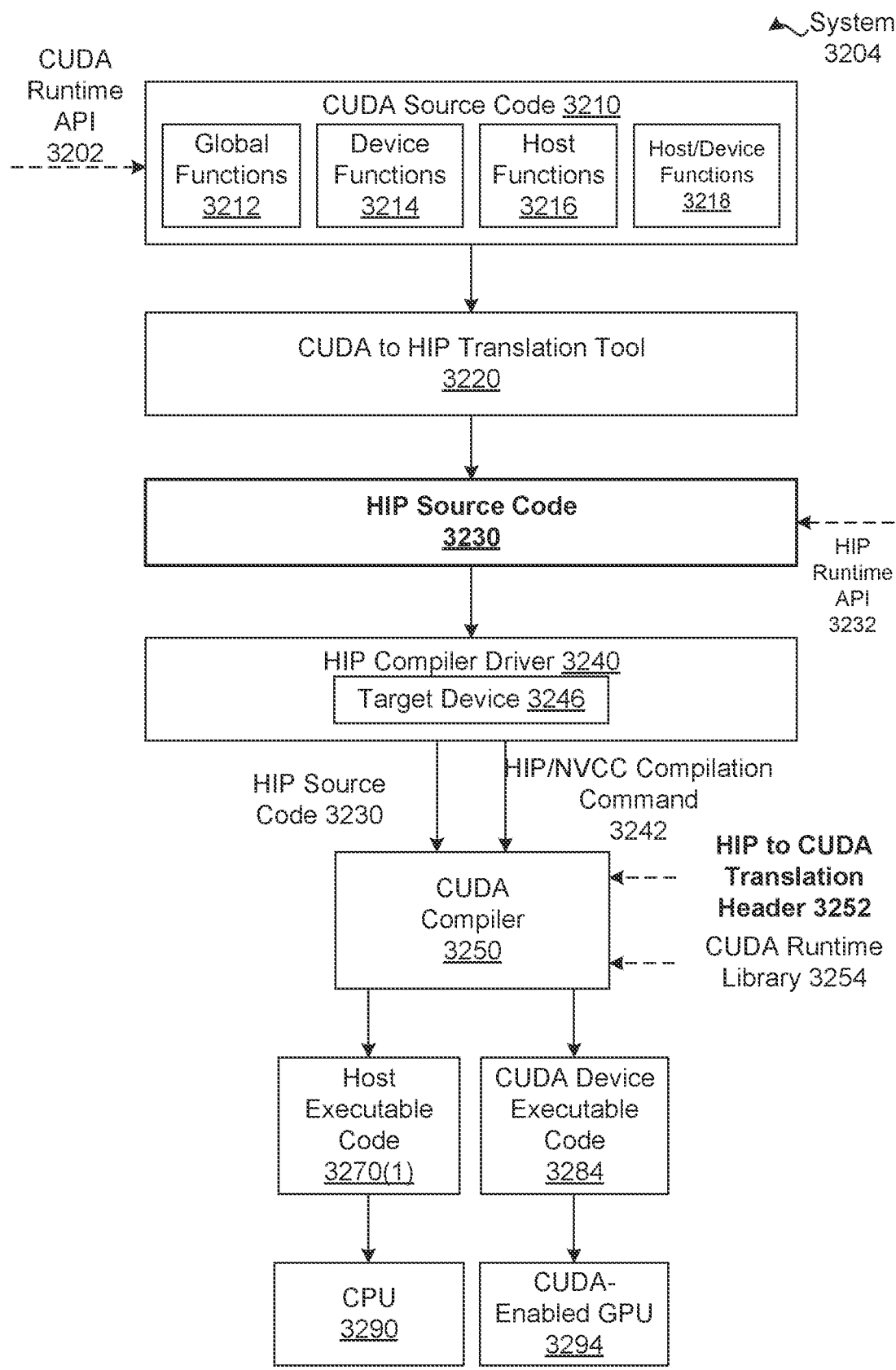
FIG. 32B illustrates a system configured to compile and execute CUDA source code of FIG. 32A using a CPU and a CUDA-enabled GPU, in accordance with at least one embodiment.

FIG. 32B illustrates a system 3204 configured to compile and execute CUDA source code 3210 of FIG. 32A using CPU 3290 and CUDA-enabled GPU 3294, in accordance with at least one embodiment. In at least one embodiment, system 3204 includes, without limitation, CUDA source code 3210, CUDA to HIP translation tool 3220, HIP source code 3230, HIP compiler driver 3240, CUDA compiler 3250, host executable code 3270(1), CUDA device executable code 3284, CPU 3290, and CUDA-enabled GPU 3294.

In at least one embodiment and as described previously herein in conjunction with FIG. 32A, CUDA source code 3210 includes, without limitation, any number (including zero) of global functions 3212, any number (including zero) of device functions 3214, any number (including zero) of host functions 3216, and any number (including zero) of host/device functions 3218. In at least one embodiment, CUDA source code 3210 also includes, without limitation, any number of calls to any number of functions that are specified in any number of CUDA APIs.

In at least one embodiment, CUDA to HIP translation tool 3220 translates CUDA source code 3210 to HIP source code 3230. In at least one embodiment, CUDA to HIP translation tool 3220 converts each kernel call in CUDA source code 3210 from a CUDA syntax to a HIP syntax and converts any number of other CUDA calls in CUDA source code 3210 to any number of other functionally similar HIP calls.

In at least one embodiment, HIP compiler driver 3240 determines that target device 3246 is CUDA-enabled and generates HIP/NVCC compilation command 3242. In at least one embodiment, HIP compiler driver 3240 then configures CUDA compiler 3250 via HIP/NVCC compilation command 3242 to compile HIP source code 3230. In at least one embodiment, HIP compiler driver 3240 provides access to a HIP to CUDA translation header 3252 as part of configuring CUDA compiler 3250. In at least one embodiment, HIP to CUDA translation header 3252 translates any number of mechanisms (e.g., functions) specified in any number of HIP APIs to any number of mechanisms specified in any number of CUDA APIs. In at least one embodiment, CUDA compiler 3250 uses HIP to CUDA translation header 3252 in conjunction with a CUDA runtime library 3254 corresponding to CUDA runtime API 3202 to generate host executable code 3270(1) and CUDA device executable code 3284. In at least one embodiment, host executable code 3270(1) and CUDA device executable code 3284 may then be executed on, respectively, CPU 3290 and CUDA-enabled GPU 3294. In at least one embodiment, CUDA device executable code 3284 includes, without limitation, binary code. In at least one embodiment, CUDA device executable code 3284 includes, without limitation, PTX code and is further compiled into binary code for a specific target device at runtime.

Figure 32C:
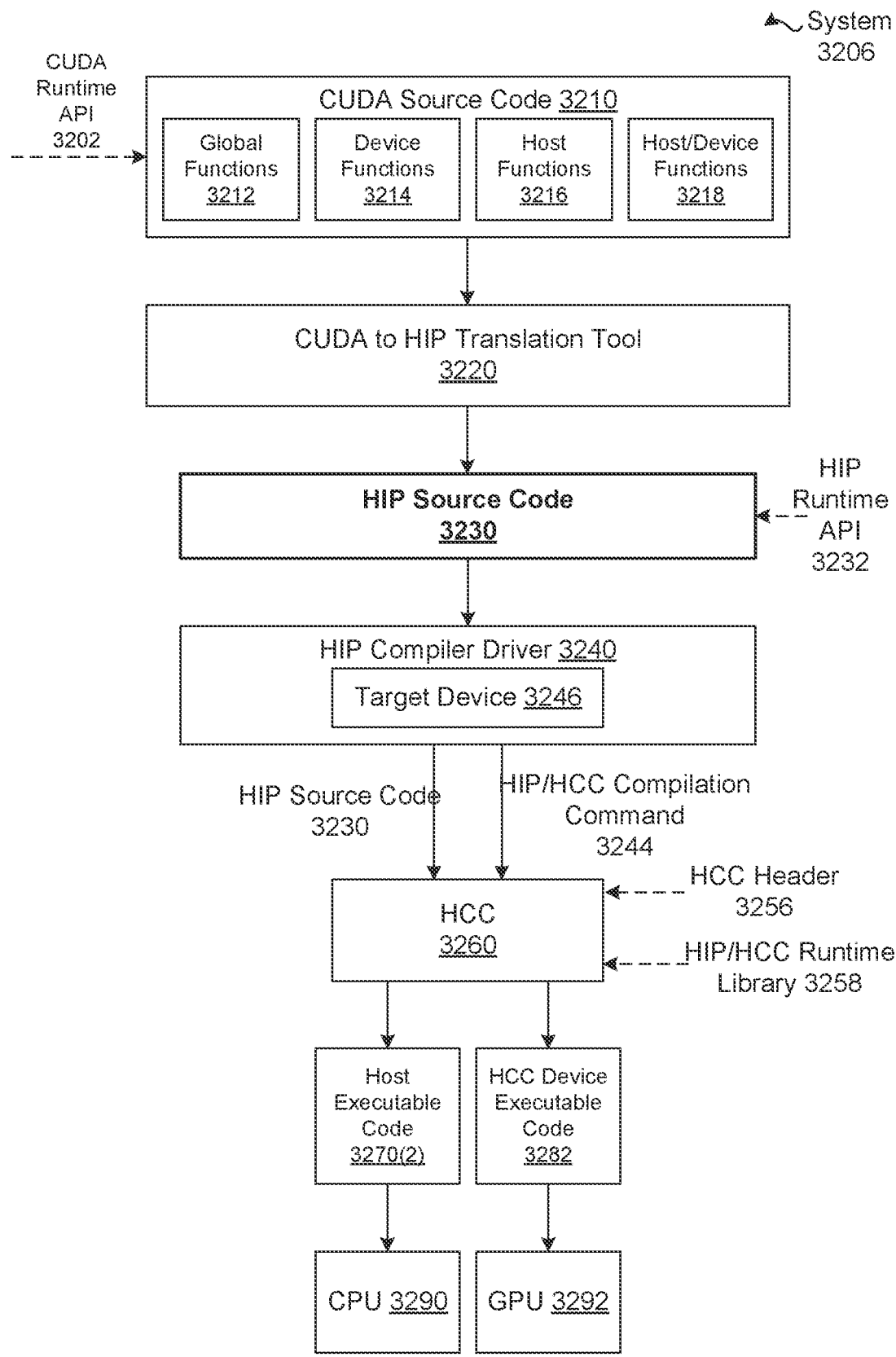
FIG. 32C illustrates a system configured to compile and execute CUDA source code of FIG. 32A using a CPU and a non-CUDA-enabled GPU, in accordance with at least one embodiment.

FIG. 32C illustrates a system 3206 configured to compile and execute CUDA source code 3210 of FIG. 32A using CPU 3290 and non-CUDA-enabled GPU 3292, in accordance with at least one embodiment. In at least one embodiment, system 3206 includes, without limitation, CUDA source code 3210, CUDA to HIP translation tool 3220, HIP source code 3230, HIP compiler driver 3240, HCC 3260, host executable code 3270(2), HCC device executable code 3282, CPU 3290, and GPU 3292.

In at least one embodiment and as described previously herein in conjunction with FIG. 32A, CUDA source code 3210 includes, without limitation, any number (including zero) of global functions 3212, any number (including zero) of device functions 3214, any number (including zero) of host functions 3216, and any number (including zero) of host/device functions 3218. In at least one embodiment, CUDA source code 3210 also includes, without limitation, any number of calls to any number of functions that are specified in any number of CUDA APIs.

In at least one embodiment, CUDA to HIP translation tool 3220 translates CUDA source code 3210 to HIP source code 3230. In at least one embodiment, CUDA to HIP translation tool 3220 converts each kernel call in CUDA source code 3210 from a CUDA syntax to a HIP syntax and converts any number of other CUDA calls in source code 3210 to any number of other functionally similar HIP calls.

In at least one embodiment, HIP compiler driver 3240 subsequently determines that target device 3246 is not CUDA-enabled and generates HIP/HCC compilation command 3244. In at least one embodiment, HIP compiler driver 3240 then configures HCC 3260 to execute HIP/HCC compilation command 3244 to compile HIP source code 3230. In at least one embodiment, HIP/HCC compilation command 3244 configures HCC 3260 to use, without limitation, a HIP/HCC runtime library 3258 and an HCC header 3256 to generate host executable code 3270(2) and HCC device executable code 3282. In at least one embodiment, HIP/HCC runtime library 3258 corresponds to HIP runtime API 3232. In at least one embodiment, HCC header 3256 includes, without limitation, any number and type of interoperability mechanisms for HIP and HCC. In at least one embodiment, host executable code 3270(2) and HCC device executable code 3282 may be executed on, respectively, CPU 3290 and GPU 3292.

Figure 33:
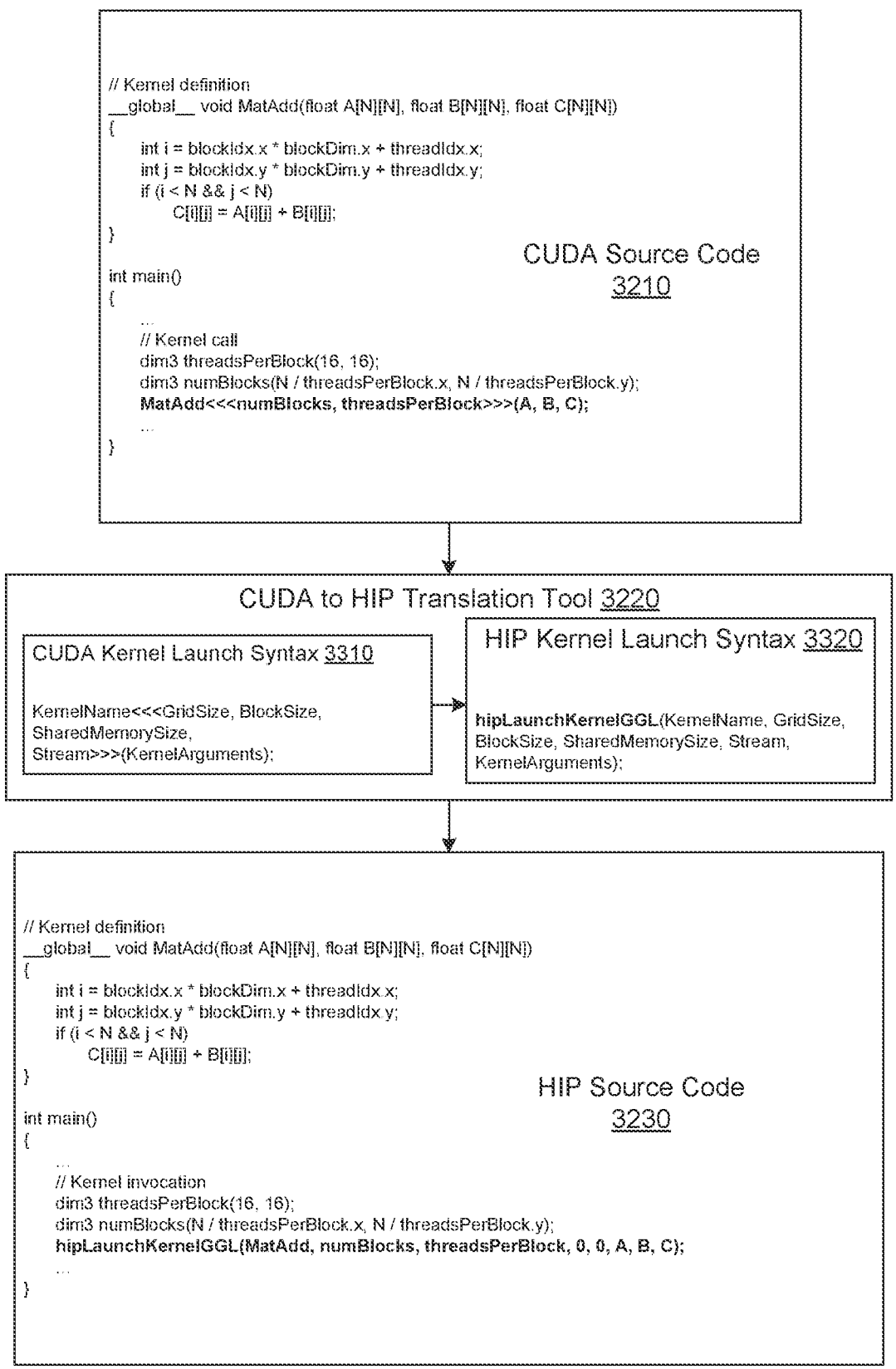
FIG. 33 illustrates an exemplary kernel translated by CUDA-to-HIP translation tool of FIG. 32C, in accordance with at least one embodiment.

FIG. 33 illustrates an exemplary kernel translated by CUDA-to-HIP translation tool 3220 of FIG. 32C, in accordance with at least one embodiment. In at least one embodiment, CUDA source code 3210 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3210 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 3310. In at least one embodiment, CUDA kernel launch syntax 3310 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 3310 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 3310, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 3310, SharedMemorySize defaults to zero. In at least one embodiment and with respect to CUDA kernel launch syntax 3310, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3210 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);".

In at least one embodiment and as per CUDA kernel launch syntax 3310, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3210 to HIP source code 3230, CUDA to HIP translation tool 3220 translates each kernel call in CUDA source code 3210 from CUDA kernel launch syntax 3310 to a HIP kernel launch syntax 3320 and converts any number of other CUDA calls in source code 3210 to any number of other functionally similar HIP calls. In at least one embodiment, HIP kernel launch syntax 3320 is specified as "hipLaunchKernelGGL(KernelName,GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 3320 as in CUDA kernel launch syntax 3310 (described previously herein). In at least one embodiment, arguments SharedMemorySize and Stream are required in HIP kernel launch syntax 3320 and are optional in CUDA kernel launch syntax 3310.

In at least one embodiment, a portion of HIP source code 3230 depicted in FIG. 33 is identical to a portion of CUDA source code 3210 depicted in FIG. 33 except for a kernel call that causes kernel MatAdd to execute on a device. In at least one embodiment, kernel MatAdd is defined in HIP source code 3230 with the same "_global_" declaration specifier with which kernel MatAdd is defined in CUDA source code 3210. In at least one embodiment, a kernel call in HIP source code 3230 is "hipLaunchKernelGGL(MatAdd, numBlocks, threadsPerBlock, 0, 0, A, B, C);", while a corresponding kernel call in CUDA source code 3210 is "MatAdd<<<numBlocks, threadsPerBlock>>>(A, B, C);".

Figure 34:
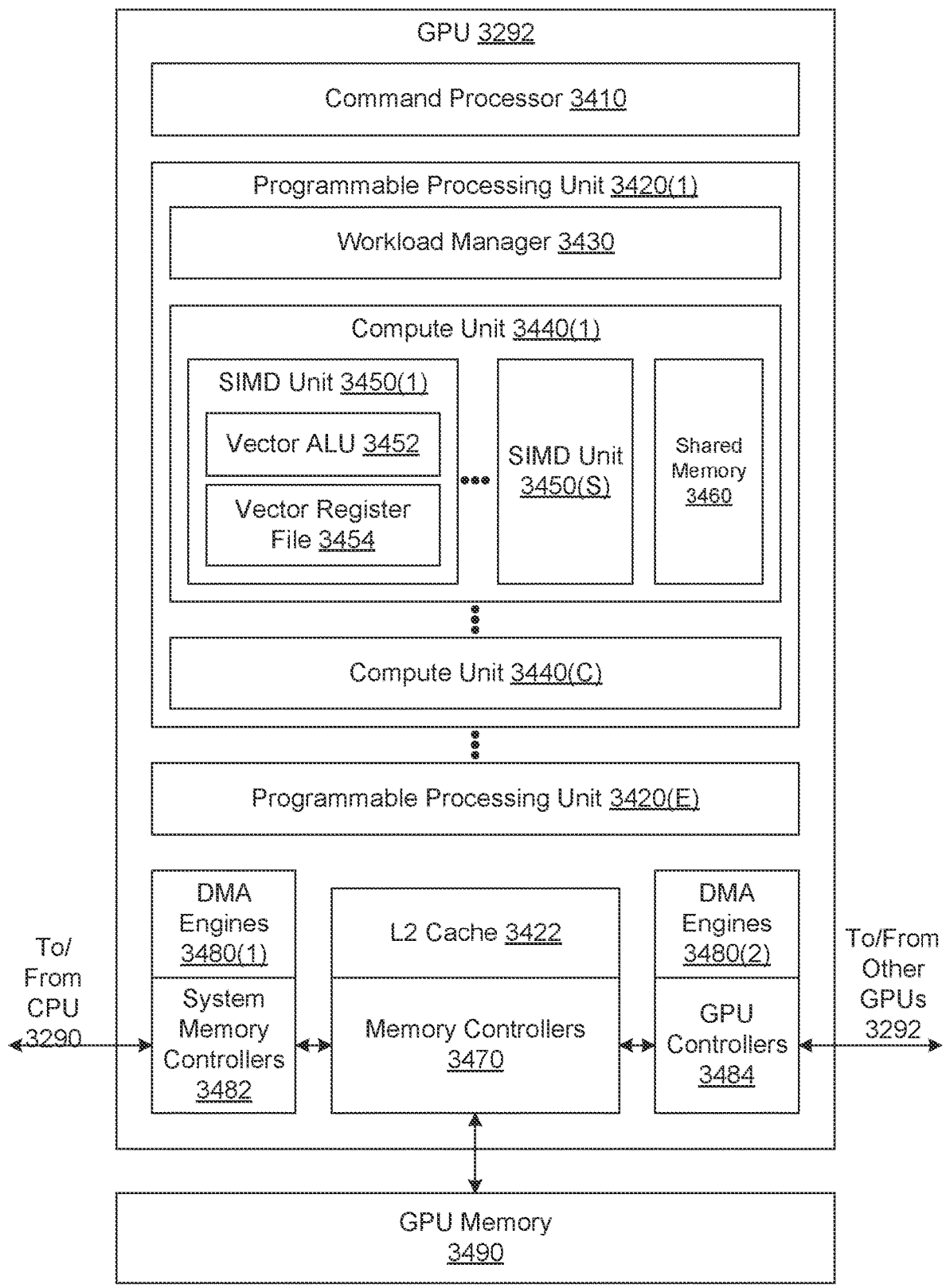
FIG. 34 illustrates non-CUDA-enabled GPU of FIG. 32C in greater detail, in accordance with at least one embodiment.

FIG. 34 illustrates non-CUDA-enabled GPU 3292 of FIG. 32C in greater detail, in accordance with at least one embodiment. In at least one embodiment, GPU 3292 is developed by AMD corporation of Santa Clara. In at least one embodiment, GPU 3292 can be configured to perform compute operations in a highly-parallel fashion. In at least one embodiment, GPU 3292 is configured to execute graphics pipeline operations such as draw commands, pixel operations, geometric computations, and other operations associated with rendering an image to a display. In at least one embodiment, GPU 3292 is configured to execute operations unrelated to graphics. In at least one embodiment, GPU 3292 is configured to execute both operations related to graphics and operations unrelated to graphics. In at least one embodiment, GPU 3292 can be configured to execute device code included in HIP source code 3230.

In at least one embodiment, GPU 3292 includes, without limitation, any number of programmable processing units 3420, a command processor 3410, an L2 cache 3422, memory controllers 3470, DMA engines 3480(1), system memory controllers 3482, DMA engines 3480(2), and GPU controllers 3484. In at least one embodiment, each programmable processing unit 3420 includes, without limitation, a workload manager 3430 and any number of compute units 3440. In at least one embodiment, command processor 3410 reads commands from one or more command queues (not shown) and distributes commands to workload managers 3430. In at least one embodiment, for each programmable processing unit 3420, associated workload manager 3430 distributes work to compute units 3440 included in programmable processing unit 3420. In at least one embodiment, each compute unit 3440 may execute any number of thread blocks, but each thread block executes on a single compute unit 3440. In at least one embodiment, a workgroup is a thread block.

In at least one embodiment, each compute unit 3440 includes, without limitation, any number of SIMD units 3450 and a shared memory 3460. In at least one embodiment, each SIMD unit 3450 implements a SIMD architecture and is configured to perform operations in parallel. In at least one embodiment, each SIMD unit 3450 includes, without limitation, a vector ALU 3452 and a vector register file 3454. In at least one embodiment, each SIMD unit 3450 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3460.

In at least one embodiment, programmable processing units 3420 are referred to as "shader engines." In at least one embodiment, each programmable processing unit 3420 includes, without limitation, any amount of dedicated graphics hardware in addition to compute units 3440. In at least one embodiment, each programmable processing unit 3420 includes, without limitation, any number (including zero) of geometry processors, any number (including zero) of rasterizers, any number (including zero) of render back ends, workload manager 3430, and any number of compute units 3440.

In at least one embodiment, compute units 3440 share L2 cache 3422. In at least one embodiment, L2 cache 3422 is partitioned. In at least one embodiment, a GPU memory 3490 is accessible by all compute units 3440 in GPU 3292. In at least one embodiment, memory controllers 3470 and system memory controllers 3482 facilitate data transfers between GPU 3292 and a host, and DMA engines 3480(1) enable asynchronous memory transfers between GPU 3292 and such a host. In at least one embodiment, memory controllers 3470 and GPU controllers 3484 facilitate data transfers between GPU 3292 and other GPUs 3292, and DMA engines 3480(2) enable asynchronous memory transfers between GPU 3292 and other GPUs 3292.

In at least one embodiment, GPU 3292 includes, without limitation, any amount and type of system interconnect that facilitates data and control transmissions across any number and type of directly or indirectly linked components that may be internal or external to GPU 3292. In at least one embodiment, GPU 3292 includes, without limitation, any number and type of I/O interfaces (e.g., PCIe) that are coupled to any number and type of peripheral devices. In at least one embodiment, GPU 3292 may include, without limitation, any number (including zero) of display engines and any number (including zero) of multimedia engines. In at least one embodiment, GPU 3292 implements a memory subsystem that includes, without limitation, any amount and type of memory controllers (e.g., memory controllers 3470 and system memory controllers 3482) and memory devices (e.g., shared memories 3460) that may be dedicated to one component or shared among multiple components. In at least one embodiment, GPU 3292 implements a cache subsystem that includes, without limitation, one or more cache memories (e.g., L2 cache 3422) that may each be private to or shared between any number of components (e.g., SIMD units 3450, compute units 3440, and programmable processing units 3420).

Figure 35:
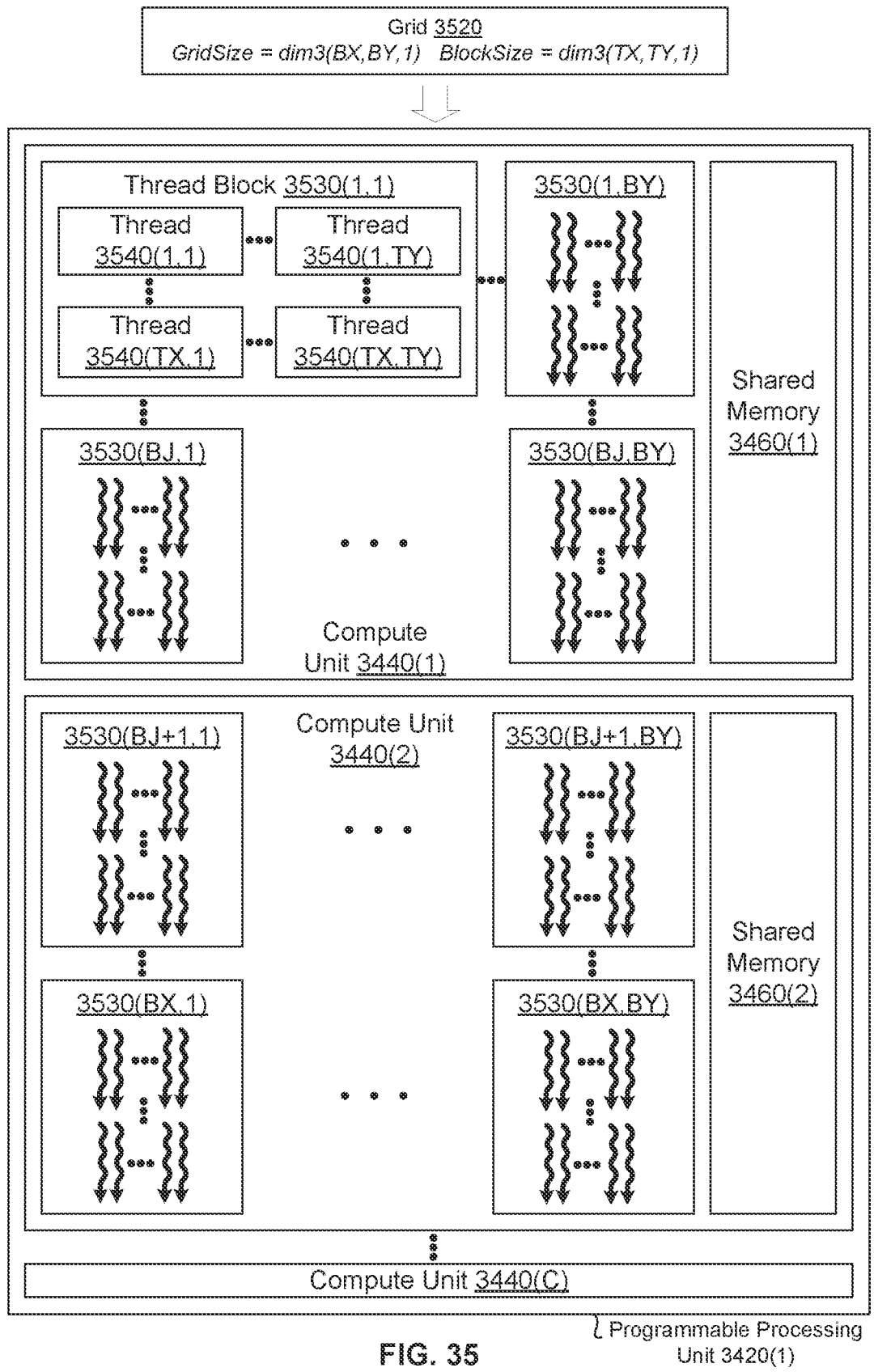
FIG. 35 illustrates how threads of an exemplary CUDA grid are mapped to different compute units of FIG. 34, in accordance with at least one embodiment.

FIG. 35 illustrates how threads of an exemplary CUDA grid 3520 are mapped to different compute units 3440 of FIG. 34, in accordance with at least one embodiment. In at least one embodiment and for explanatory purposes only, grid 3520 has a GridSize of BX by BY by 1 and a BlockSize of TX by TY by 1. In at least one embodiment, grid 3520 therefore includes, without limitation, (BX*BY) thread blocks 3530 and each thread block 3530 includes, without limitation, (TX*TY) threads 3540. Threads 3540 are depicted in FIG. 35 as squiggly arrows.

In at least one embodiment, grid 3520 is mapped to programmable processing unit 3420(1) that includes, without limitation, compute units 3440(1)-3440(C). In at least one embodiment and as shown, (BJ*BY) thread blocks 3530 are mapped to compute unit 3440(1), and the remaining thread blocks 3530 are mapped to compute unit 3440(2). In at least one embodiment, each thread block 3530 may include, without limitation, any number of warps, and each warp is mapped to a different SIMD unit 3450 of FIG. 34.

In at least one embodiment, warps in a given thread block 3530 may synchronize together and communicate through shared memory 3460 included in associated compute unit 3440. For example and in at least one embodiment, warps in thread block 3530(BJ,1) can synchronize together and communicate through shared memory 3460(1). For example and in at least one embodiment, warps in thread block 3530(BJ+1,1) can synchronize together and communicate through shared memory 3460(2).

Figure 36:
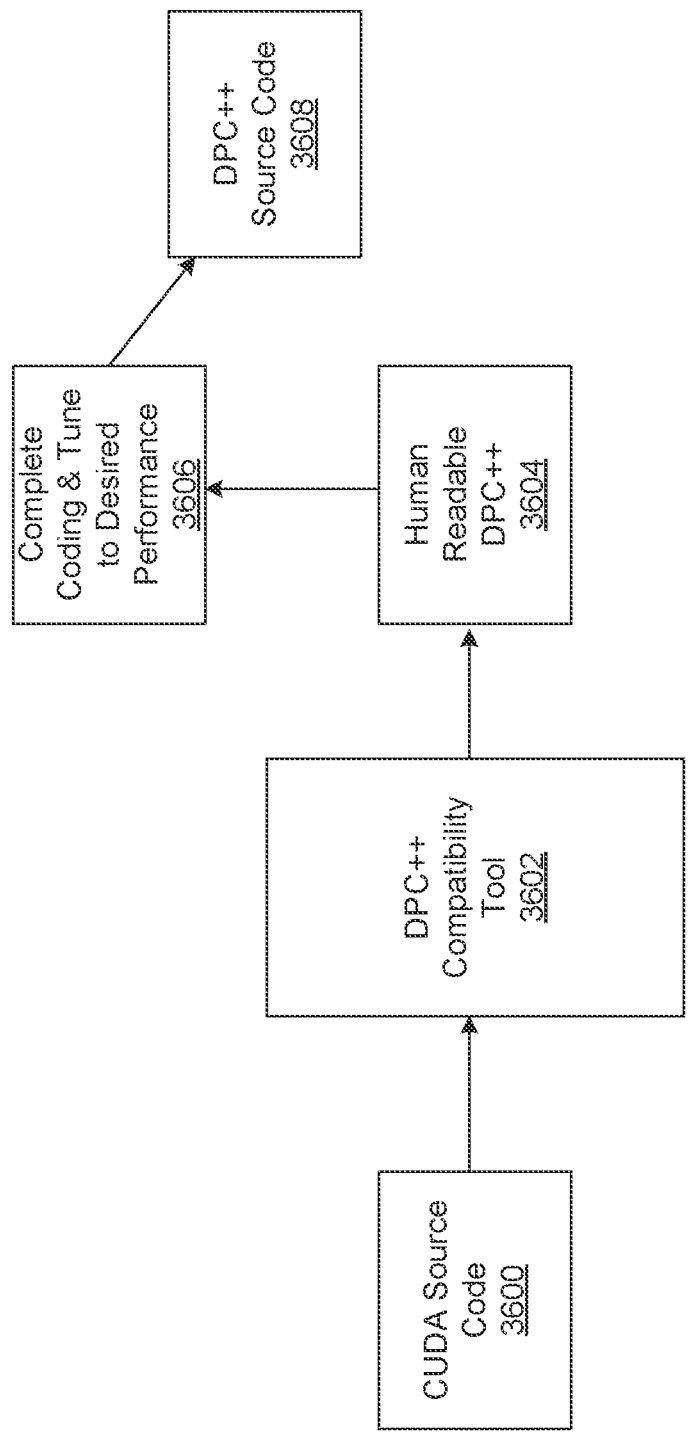
FIG. 36 illustrates how to migrate existing CUDA code to Data Parallel C++ code, in accordance with at least one embodiment.

FIG. 36 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multi-platform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 3600 is provided as an input to a DPC++ compatibility tool 3602 to generate human readable DPC++ 3604. In at least one embodiment, human readable DPC++ 3604 includes inline comments generated by DPC++ compatibility tool 3602 that guides a developer on how and/or where to modify DPC++ code to complete coding and tuning to desired performance 3606, thereby generating DPC++ source code 3608.

In at least one embodiment, CUDA source code 3600 is or includes a collection of human-readable source code in a CUDA programming language. In at least one embodiment, CUDA source code 3600 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 3600 described in connection with FIG. 36 may be in accordance with those discussed elsewhere in this document.

In at least one embodiment, DPC++ compatibility tool 3602 refers to an executable tool, program, application, or any other suitable type of tool that is used to facilitate migration of CUDA source code 3600 to DPC++ source code 3608. In at least one embodiment, DPC++ compatibility tool 3602 is a command-line-based code migration tool available as part of a DPC++ tool kit that is used to port existing CUDA sources to DPC++. In at least one embodiment, DPC++ compatibility tool 3602 converts some or all source code of a CUDA application from CUDA to DPC++ and generates a resulting file that is written at least partially in DPC++, referred to as human readable DPC++ 3604. In at least one embodiment, human readable DPC++ 3604 includes comments that are generated by DPC++ compatibility tool 3602 to indicate where user intervention may be necessary. In at least one embodiment, user intervention is necessary when CUDA source code 3600 calls a CUDA API that has no analogous DPC++ API; other examples where user intervention is required are discussed later in greater detail.

In at least one embodiment, a workflow for migrating CUDA source code 3600 (e.g., application or portion thereof) includes creating one or more compilation database files; migrating CUDA to DPC++ using a DPC++ compatibility tool 3602; completing migration and verifying correctness, thereby generating DPC++ source code 3608; and compiling DPC++ source code 3608 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 3602 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 3602 migrates CUDA code (e.g., applications) written in CUDA to DPC++ by generating DPC++ wherever possible. In at least one embodiment, DPC++ compatibility tool 3602 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 3602 to migrate CUDA code to DPC++. In at least one embodiment, non-CUDA C++ code and files are migrated as is. In at least one embodiment, DPC++ compatibility tool 3602 generates human readable DPC++ 3604 which may be DPC++ code that, as generated by DPC++ compatibility tool 3602, cannot be compiled by DPC++ compiler and requires additional plumbing for verifying portions of code that were not migrated correctly, and may involve manual intervention, such as by a developer. In at least one embodiment, DPC++ compatibility tool 3602 provides hints or tools embedded in code to help developers manually migrate additional code that could not be migrated automatically. In at least one embodiment, migration is a one-time activity for a source file, project, or application.

In at least one embodiment, DPC++ compatibility tool 36002 is able to successfully migrate all portions of CUDA code to DPC++ and there may simply be an optional step for manually verifying and tuning performance of DPC++ source code that was generated. In at least one embodiment, DPC++ compatibility tool 3602 directly generates DPC++ source code 3608 which is compiled by a DPC++ compiler without requiring or utilizing human intervention to modify DPC++ code generated by DPC++ compatibility tool 3602. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 3602. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global__ void VectorAddKernel(float* A, float* B, float* C)
{
    A[threadIdx.x] = threadIdx.x + 1.0f;
    B[threadIdx.x] = threadIdx.x + 1.0f;
    C[threadIdx.x] = A[threadIdx.x] + B[threadIdx.x];
}
int main( )
{
    float *d_A, *d_B, *d_C;
    cudaMalloc(&d_A, VECTOR_SIZE*sizeof(float));
    cudaMalloc(&d_B, VECTOR_SIZE*sizeof(float));
    cudaMalloc(&d_C, VECTOR_SIZE*sizeof(float));
    VectorAddKernel<<<1, VECTOR_SIZE>>>(d_A, d_B, d_C);
    float Result[VECTOR_SIZE] = { };
    cudaMemcpy(Result, d_C, VECTOR_SIZE*sizeof(float),
cudaMemcpyDeviceToHost);
    cudaFree(d_A);
    cudaFree(d_B);
    cudaFree(d_C);
    for (int i=0; i<VECTOR_SIZE; i++ {
        if (i % 16 == 0) {
            printf("\n");
        }
        printf("%f ", Result[i]);
    }
    return 0;
}
```

In at least one embodiment and in connection with CUDA source file presented above, DPC++ compatibility tool 3602 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 3602 converts CUDA thread IDs used to index work elements to SYCL standard addressing for work elements via a local ID as part of migrating CUDA code to DPC++ code. In at least one embodiment, DPC++ code generated by DPC++ compatibility tool 3602 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 3602. In at least one embodiment, DPC++ compatibility tool 3602 modify CUDA APIs for memory setup and/or host calls to execute kernel on the acceleration device. In at least one embodiment and in connection with CUDA source file presented above, a corresponding human readable DPC++ 3604 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
            sycl::nd_item<3> item_ct1)
{
   A[item_ct1.get_local_id(2)] = item_ct1.get_local_id(2) + 1.0f;
   B[item_ct1.get_local_id(2)] = item_ct1.get_local_id(2) + 1.0f;
   C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
        dpct::get_current_device( ),
        dpct::get_default_context( ));
  d_B = (float *)sycl::malloc_device(VECTOR_SIZE * sizeof(float),
        dpct::get_current_device( ),
        dpct::get_default_context( ));
  d_C = (float *)sycl::malloc_device(VECTOR_SIZE * sizeof(float),
        dpct::get_current_device( ),
        dpct::get_default_context( ));
  dpct::get_default_queue_wait( ).submit([&](sycl::handler &cgh) {
    cgh.parallel_for(
      sycl::nd_range<3>(sycl::range<3>(1, 1, 1) *
            sycl::range<3>(1, 1, VECTOR_SIZE) *
            sycl::range<3>(1, 1, VECTOR_SIZE)),
      [=](sycl::nd_items<3> item_ct1) {
          VectorAddKernel(d_A, d_B, d_C, item_ct1);
      });
  });
  float Result[VECTOR_SIZE] = { };
  dpct::get_default_queue_wait( )
    .memcpy(Result, d_C, VECTOR_SIZE * sizeof(float))
    .wait( );
  sycl::free(d_A, dpct::get_default_context( ));
  sycl::free(d_B, dpct::get_default_context( ));
  sycl::free(d_C, dpct::get_default_context( ));
  for (int i=0; i<VECTOR_SIZE; i++ {
    if (i % 16 == 0) {
        printf("\n");
    }
    printf("%f ", Result[i]);
  }
  return 0;
}
```

In at least one embodiment, human readable DPC++ 3604 refers to output generated by DPC++ compatibility tool 3602 and may be optimized in one manner or another. In at least one embodiment, human readable DPC++ 3604 generated by DPC++ compatibility tool 3602 can be manually edited by a developer after migration to make it more maintainable, performance, or other considerations. In at least one embodiment, DPC++ code generated by DPC++ compatibility tool 36002 such as DPC++ disclosed can be optimized by removing repeat calls to get_current_device( ) and/or get default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 3602 replace uses of unified shared memory with accessors. In at least one embodiment, DPC++ compatibility tool 3602 has an option to change how it migrates CUDA code to DPC++ code. In at least one embodiment, DPC++ compatibility tool 3602 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 3602; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

In at least one embodiment, one or more components of the figures referenced in the foregoing can adjust a frequency at which a processor operates based, at least in part, on different cores of processor performing one or more identical instructions. In at least one embodiment, adjusting frequency at which processor operates comprises increasing frequency at which processor operates based, at least in part, on different cores of processor performing one or more identical instructions. In at least one embodiment, adjusting frequency at which processor operates comprises increasing a frequency at which at least one of different cores operates based, at least in part, on different cores of processor performing one or more identical instructions. In at least one embodiment, adjusting the frequency at which processor operates based, at least in part, on different cores of processor performing one or more identical instructions comprises activating an error detection mode of a diagnostic engine, or the like, that causes different cores of the processor to perform one or more identical instructions. In at least one embodiment, adjusting the frequency at which the processor operates based, at least in part, on the different cores of the processor performing the one or more identical instructions comprises activating an error detection mode of a firmware engine, or the like, that compares output data of different cores to determine if output data from different cores match. In at least one embodiment, an additional adjustment of the frequency at which processor operates is performed based, at least in part, on comparing output data of different cores. In at least one embodiment, lockstep mode for processor is enabled to cause different cores of processor to perform one or more identical instructions. In at least one embodiment, lockstep mode is enabled by firmware engine, such as firmware engine of IC, processor, or other system.

At least one embodiment of the disclosure can be described in view of the following clauses:

Clause 1. A processor, comprising: one or more circuits to adjust a frequency at which a processor operates based, at least in part, on different cores of the processor performing one or more identical instructions.

Clause 2. The processor according to clause 1, wherein adjusting the frequency at which the processor operates comprises increasing the frequency at which the processor operates based, at least in part, on the different cores of the processor performing the one or more identical instructions.

Clause 3. The processor according to any of clauses 1-2, wherein adjusting the frequency at which the processor operates comprises increasing a frequency at which at least one of the different cores operates based, at least in part, on the different cores of the processor performing the one or more identical instructions.

Clause 4. The processor according to any of clauses 1-3, wherein adjusting the frequency at which the processor operates based, at least in part, on the different cores of the processor performing the one or more identical instructions comprises activating an error detection mode that causes the different cores of the processor to perform the one or more identical instructions.

Clause 5. The processor according to any of clauses 1-4, wherein adjusting the frequency at which the processor operates based, at least in part, on the different cores of the processor performing the one or more identical instructions comprises activating an error detection mode that compares output data of the different cores to determine if the output data from the different cores match.

Clause 6. The processor according to any of clauses 1-5, wherein the one or more circuits are further to perform an additional adjustment of the frequency at which the processor operates based, at least in part, on comparing output data of the different cores.

Clause 7. The processor according to any of clauses 1-6, wherein the one or more circuit are further to enable lockstep mode for the processor to cause the different cores of the processor to perform the one or more identical instructions.

Clause 8. A method, comprising: adjusting a frequency at which a processor operates based, at least in part, on different cores of the processor performing one or more identical instructions.

Clause 9. The method of clause 8, wherein adjusting the frequency at which the processor operates comprises increasing the frequency at which the processor operates based, at least in part, on the different cores of the processor performing the one or more identical instructions.

Clause 10. The method according to any of clauses 8-9, wherein adjusting the frequency at which the processor operates comprises increasing a frequency at which at least one of the different cores operates based, at least in part, on the different cores of the processor performing the one or more identical instructions.

Clause 11. The method according to any of clauses 8-10, wherein adjusting the frequency at which the processor operates based, at least in part, on the different cores of the processor performing the one or more identical instructions comprises activating an error detection mode that causes the different cores of the processor to perform the one or more identical instructions.

Clause 12. The method according to any of clauses 8-11, wherein adjusting the frequency at which the processor operates based, at least in part, on the different cores of the processor performing the one or more identical instructions comprises activating an error detection mode that compares output data of the different cores to determine if the output data from the different cores match.

Clause 13. The method according to any of clauses 8-12, further comprising performing an additional adjustment of the frequency at which the processor operates based, at least in part, on comparing output data of the different cores.

Clause 14. The method according to any of clauses 8-13, further comprising enabling lockstep mode for the processor to cause the different cores of the processor to perform the one or more identical instructions.

Clause 15. A system comprising: one or more processors to adjust a frequency at which a processor operates based, at least in part, on different cores of the processor performing one or more identical instructions.

Clause 16. The system of clause 15, wherein adjusting the frequency at which the processor operates comprises increasing the frequency at which the processor operates based, at least in part, on the different cores of the processor performing the one or more identical instructions.

Clause 17. The system according to any of clauses 15-16, wherein adjusting the frequency at which the processor operates comprises increasing a frequency at which at least one of the different cores operates based, at least in part, on the different cores of the processor performing the one or more identical instructions.

Clause 18. The system according to any of clauses 15-17, wherein adjusting the frequency at which the processor operates based, at least in part, on the different cores of the processor performing the one or more identical instructions comprises activating an error detection mode that causes the different cores of the processor to perform the one or more identical instructions.

Clause 19. The system according to any of clauses 15-18, wherein adjusting the frequency at which the processor operates based, at least in part, on the different cores of the processor performing the one or more identical instructions comprises activating an error detection mode that compares output data of the different cores to determine if the output data from the different cores match.

Clause 20. The system according to any of clauses 15-19, wherein the one or more processors are further to cause an additional adjustment of the frequency at which the processor operates based, at least in part, on comparing output data of the different cores.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
   one or more circuits to adjust a frequency at which a processor operates based, at least in part, on different cores of the processor performing one or more identical instructions, adjusting the frequency at which the processor operates performed by an error detection mode associated with the one or more circuits, wherein the error detection mode is performed by a firmware engine of the processor that causes the different cores to execute the one or more identical instructions and adjusts the frequency at which the processor operates.

2. The processor according to claim 1, wherein adjusting the frequency at which the processor operates comprises increasing the frequency at which the processor operates based, at least in part, on the different cores of the processor performing the one or more identical instructions.

3. The processor according to claim 1, wherein adjusting the frequency at which the processor operates comprises increasing a frequency at which at least one of the different cores operates based, at least in part, on the different cores of the processor performing the one or more identical instructions.

4. The processor according to claim 1, wherein adjusting the frequency at which the processor operates based, at least in part, on the different cores of the processor performing the one or more identical instructions comprises activating the error detection mode in firmware of the one or more circuits.

5. The processor according to claim 1, wherein the error detection mode compares output data of the different cores to determine if the output data from the different cores match.

6. The processor according to claim 1, wherein the one or more circuits are further to perform an additional adjustment of the frequency at which the processor operates based, at least in part, on comparing output data of the different cores.

7. A method, comprising:
   adjusting a frequency at which a processor operates based, at least in part, on different cores of the processor performing one or more identical instructions, adjusting the frequency further based, at least in part, on performing an error detection mode, associated with the processor, to allocate at least one core of the different cores, wherein the error detection mode is performed by a firmware engine of the processor.

8. The method of claim 7, wherein adjusting the frequency at which the processor operates comprises increasing the frequency at which the processor operates based, at least in part, on the different cores of the processor performing the one or more identical instructions.

9. The method of claim 7, wherein adjusting the frequency at which the processor operates comprises increasing a frequency at which at least one of the different cores operates based, at least in part, on the different cores of the processor performing the one or more identical instructions.

10. The method of claim 7, wherein adjusting the frequency at which the processor operates based, at least in part, on the different cores of the processor performing the one or more identical instructions comprises activating, by the firmware engine, the error detection mode that causes the different cores of the processor to perform the one or more identical instructions.

11. The method of claim 7, wherein adjusting the frequency at which the processor operates based, at least in part, on the different cores of the processor performing the one or more identical instructions comprises activating the error detection mode, by the firmware engine, that compares output data of the different cores to determine if the output data from the different cores match.

12. The method of claim 7, further comprising performing an additional adjustment of the frequency at which the processor operates based, at least in part, on comparing output data of the different cores.

13. The method of claim 7, further comprising enabling the error detection mode to cause the different cores of the processor to perform the one or more identical instructions.

14. A system comprising:
one or more processors to adjust a frequency at which a processor operates based, at least in part, on different cores of the processor performing one or more identical instructions, adjusting the frequency further based, at least in part, on performing an error detection mode, associated with the one or more processors, to allocate at least one core of the different cores, wherein the error detection mode is performed by a firmware engine of the processor that causes adjusting the frequency at which the processor operates.

15. The system of claim 14, wherein adjusting the frequency at which the processor operates comprises increasing the frequency at which the processor operates based, at least in part, on the different cores of the processor performing the one or more identical instructions.

16. The system of claim 14, wherein adjusting the frequency at which the processor operates comprises increasing a frequency at which at least one of the different cores operates based, at least in part, on the different cores of the processor performing the one or more identical instructions.

17. The system of claim 14, wherein adjusting the frequency at which the processor operates based, at least in part, on the different cores of the processor performing the one or more identical instructions comprises activating, by the firmware engine, the error detection mode.

18. The system of claim 14, wherein adjusting the frequency at which the processor operates based, at least in part, on the different cores of the processor performing the one or more identical instructions comprises activating, by the firmware engine, the error detection mode that compares output data of the different cores to determine if the output data from the different cores match.

19. The system of claim 14, wherein the one or more processors are further to cause an additional adjustment of the frequency at which the processor operates based, at least in part, on comparing output data of the different cores.

* * * * *